US012810579B2

(12) United States Patent
Ackerson et al.

(10) Patent No.: US 12,810,579 B2
(45) Date of Patent: Nov. 24, 2026

(54) USE OF RELIGHTABLE MATTER FIELDS WITH ARTIFICIAL INTELLIGENCE AND MACHINE LEARNING MODELS

(71) Applicant: Quidient, LLC, Easton, MD (US)

(72) Inventors: David Scott Ackerson, Easton, MD (US); John Leffingwell, Madison, AL (US); Alexandru Rablau, Columbia, MD (US); Stara Diamond, Albuquerque, NM (US); Brett-Michael Thomas Green, Alexandria, VA (US); Philip Anthony McBride, Earlysville, VA (US); Sakshi Madan Kakde, Columbia, MD (US)

(73) Assignee: Quidient, LLC, Easton, MD (US)

( * ) Notice: Subject to any disclaimer, the term of this patent is extended or adjusted under 35 U.S.C. 154(b) by 339 days.

(21) Appl. No.: 18/118,601

(22) Filed: Mar. 7, 2023

(65) Prior Publication Data

US 2023/0281955 A1 Sep. 7, 2023

Related U.S. Application Data

(60) Provisional application No. 63/317,330, filed on Mar. 7, 2022.

(51) Int. Cl.
*G06V 10/60* (2022.01)
*G06V 10/762* (2022.01)
(Continued)

(52) U.S. Cl.
CPC ............ *G06V 10/60* (2022.01); *G06V 10/762* (2022.01); *G06V 10/764* (2022.01); *G06V 10/82* (2022.01)

(58) Field of Classification Search
CPC .................. G06T 15/506; G06T 17/00; G06T 2207/10024; G06T 2207/30156;
(Continued)

(56) References Cited

U.S. PATENT DOCUMENTS 4,694,404 A 9/1987 Meagher
5,123,084 A 6/1992 Prevost et al.
(Continued)

FOREIGN PATENT DOCUMENTS

CN 1561505 A 1/2005
CN 102918466 A 2/2013
(Continued)

OTHER PUBLICATIONS

Leffingwell et al, "Generalized Scene Reconstruction", 2018 (Year: 2018).*
(Continued)

*Primary Examiner* — Ruiping Li
(74) *Attorney, Agent, or Firm* — Christensen, Fonder, Dardi & Busse PLLC; John P. Fonder

(57) ABSTRACT

Various embodiments of the disclosure are directed to a scene reconstruction and machine learning system. In embodiments, the system comprises a storage medium configured to store image data, one or more scene models, one or more relightable matter fields, and information related to a machine learning model. In one or more embodiments, the system comprises an input circuit configured to receive image data characterizing light in a scene. In embodiments the system includes a processor. In embodiments the processor configured to reconstruct a scene model representing the scene using the image data. In embodiments the processor is configured to extract a relightable matter field from the scene model representing the object, store the scene model and the relightable matter field representing the object in the
(Continued)

storage medium, apply the relightable matter field as an input to the machine learning model, and generate an output from the machine learning model.

32 Claims, 23 Drawing Sheets

(51) Int. Cl.
*G06V 10/764* (2022.01)
*G06V 10/82* (2022.01)

(58) Field of Classification Search
CPC ....... G06T 2207/30252; G06T 2210/61; G06T 7/557; G06V 10/60; G06V 10/762; G06V 10/764; G06V 10/82
See application file for complete search history.

(56) References Cited

U.S. PATENT DOCUMENTS

| | | | |
|---|---|---|---|
| 5,839,112 | A | 11/1998 | Schreitmueller et al. |
| 6,097,394 | A | 8/2000 | Levoy et al. |
| 6,123,733 | A | 9/2000 | Dalton |
| 6,185,540 | B1 | 2/2001 | Schreitmueller et al. |
| 6,259,452 | B1 | 7/2001 | Coorg et al. |
| 6,363,170 | B1 | 3/2002 | Seitz et al. |
| 6,373,487 | B1 | 4/2002 | Culbertson et al. |
| 6,677,957 | B2 | 1/2004 | Grzeszczuk et al. |
| 6,738,533 | B1 | 5/2004 | Shum et al. |
| 6,831,641 | B2 | 12/2004 | Matusik et al. |
| 6,831,643 | B2 | 12/2004 | Aliaga et al. |
| 6,879,946 | B2 | 4/2005 | Rong et al. |
| 6,940,653 | B2 | 9/2005 | Favalora et al. |
| 6,980,935 | B2 | 12/2005 | Lu et al. |
| 7,027,049 | B2 | 4/2006 | Aliaga et al. |
| 7,129,943 | B2 | 10/2006 | Zhang et al. |
| 7,283,308 | B2 | 10/2007 | Cossairt et al. |
| 7,286,143 | B2 | 10/2007 | Kang et al. |
| 7,633,511 | B2 | 12/2009 | Shum et al. |
| 7,843,449 | B2 | 11/2010 | Krah |
| 7,916,934 | B2 | 3/2011 | Vetro et al. |
| 8,237,708 | B2 | 8/2012 | Mantzel |
| 8,432,435 | B2 | 4/2013 | Ding et al. |
| 8,437,537 | B2 | 5/2013 | Chang et al. |
| 8,451,535 | B2 | 5/2013 | Nam et al. |
| 8,471,897 | B2 | 6/2013 | Rodriguez Ramos et al. |
| 8,497,934 | B2 | 7/2013 | Milnes et al. |
| 8,542,933 | B2 | 9/2013 | Venkataraman et al. |
| 8,547,374 | B1 | 10/2013 | Sadjadi et al. |
| 8,619,082 | B1 | 12/2013 | Ciurea et al. |
| 8,643,684 | B2 | 2/2014 | Ranieri et al. |
| 8,643,762 | B2 | 2/2014 | Suzuki et al. |
| 8,651,678 | B2 | 2/2014 | Lanman et al. |
| 8,659,597 | B2 | 2/2014 | Johnsson et al. |
| 8,730,240 | B2 | 5/2014 | Wang et al. |
| 8,736,670 | B2 | 5/2014 | Barbour et al. |
| 8,749,620 | B1 | 6/2014 | Knight et al. |
| 8,749,694 | B2 | 6/2014 | Georgiev et al. |
| 8,754,829 | B2 | 6/2014 | Lapstun |
| 8,780,113 | B1 | 7/2014 | Ciurea et al. |
| 8,805,057 | B2 | 8/2014 | Taguchi et al. |
| 8,817,015 | B2 | 8/2014 | Georgiev et al. |
| 8,831,367 | B2 | 9/2014 | Venkataraman et al. |
| 8,860,833 | B2 | 10/2014 | Georgiev et al. |
| 8,890,865 | B2 | 11/2014 | Park et al. |
| 8,933,862 | B2 | 1/2015 | Lapstun |
| 8,970,625 | B2 | 3/2015 | Chavez et al. |
| 8,988,317 | B1 | 3/2015 | Liang et al. |
| 9,025,894 | B2 | 5/2015 | Venkataraman et al. |
| 9,025,895 | B2 | 5/2015 | Venkataraman et al. |
| 9,031,335 | B2 | 5/2015 | Venkataraman et al. |
| 9,031,342 | B2 | 5/2015 | Venkataraman et al. |
| 9,031,343 | B2 | 5/2015 | Venkataraman et al. |
| 9,036,928 | B2 | 5/2015 | Venkataraman et al. |
| 9,036,931 | B2 | 5/2015 | Venkataraman et al. |
| 9,042,667 | B2 | 5/2015 | Venkataraman et al. |
| 9,092,890 | B2 | 7/2015 | Tosic et al. |
| 9,094,675 | B2 | 7/2015 | Lukk et al. |
| 9,100,639 | B2 | 8/2015 | Hiramoto et al. |
| 9,113,043 | B1 | 8/2015 | Kim et al. |
| 9,129,183 | B2 | 9/2015 | Venkataraman et al. |
| 9,143,678 | B2 | 9/2015 | Park et al. |
| 9,146,403 | B2 | 9/2015 | Lanman et al. |
| 9,165,401 | B1 | 10/2015 | Kim et al. |
| 9,172,949 | B2 | 10/2015 | Nam et al. |
| 9,179,126 | B2 | 11/2015 | El-Ghoroury et al. |
| 9,179,134 | B2 | 11/2015 | Ranieri et al. |
| 9,201,270 | B2 | 12/2015 | Fattal et al. |
| 9,201,568 | B2 | 12/2015 | Chavez et al. |
| 9,235,922 | B2 | 1/2016 | Alj et al. |
| 9,237,338 | B1 | 1/2016 | Maguire, Jr. |
| 9,270,981 | B2 | 2/2016 | Park et al. |
| 9,335,553 | B2 | 5/2016 | Lanman et al. |
| 9,372,349 | B2 | 6/2016 | Brug et al. |
| 9,383,587 | B2 | 7/2016 | Balogh |
| 9,390,505 | B2 | 7/2016 | Georgiev et al. |
| 9,392,257 | B2 | 7/2016 | Nagumo et al. |
| 9,405,124 | B2 | 8/2016 | Hirsch et al. |
| 9,412,172 | B2 | 8/2016 | Sorkine-Hornung |
| 9,456,116 | B2 | 9/2016 | Lapstun |
| 9,460,515 | B2 | 10/2016 | Tosic et al. |
| 9,478,036 | B2 | 10/2016 | Putraya et al. |
| 9,494,802 | B2 | 11/2016 | May et al. |
| 9,536,166 | B2 | 1/2017 | Venkataraman et al. |
| 9,536,320 | B1 | 1/2017 | Prince |
| 9,536,347 | B2 | 1/2017 | Nam et al. |
| 9,544,514 | B2 | 1/2017 | Namboodiri et al. |
| 9,557,741 | B1 | 1/2017 | Elie et al. |
| 9,569,853 | B2 | 2/2017 | Tosic et al. |
| 9,576,188 | B2 | 2/2017 | Yang |
| 9,576,399 | B2 | 2/2017 | Lo et al. |
| 9,619,886 | B2 | 4/2017 | Sawada et al. |
| 9,632,406 | B2 | 4/2017 | Wang |
| 9,646,399 | B2 | 5/2017 | Jeong et al. |
| 9,646,410 | B2 | 5/2017 | Collet Romea et al. |
| 9,667,846 | B2 | 5/2017 | Uliyar et al. |
| 9,681,069 | B2 | 6/2017 | El-Ghoroury et al. |
| 9,686,530 | B2 | 6/2017 | Horikawa |
| 9,691,149 | B2 | 6/2017 | Drazic et al. |
| 9,693,038 | B2 | 6/2017 | Mccloskey et al. |
| 9,712,764 | B2 | 7/2017 | El-Ghoroury et al. |
| 9,720,245 | B2 | 8/2017 | Kautz et al. |
| 9,741,163 | B2 | 8/2017 | Fest |
| 9,767,580 | B2 | 9/2017 | Lumsdaine et al. |
| 9,769,392 | B1 | 9/2017 | Colburn et al. |
| 9,774,800 | B2 | 9/2017 | El-Ghoroury et al. |
| 9,779,515 | B2 | 10/2017 | El-Ghoroury et al. |
| 9,786,062 | B2 | 10/2017 | Sorkine-Hornung et al. |
| 9,791,706 | B2 | 10/2017 | Ranieri et al. |
| 9,792,719 | B2 | 10/2017 | Hyllus et al. |
| 9,797,715 | B2 | 10/2017 | Bishop et al. |
| 9,797,716 | B2 | 10/2017 | Meng et al. |
| 9,798,894 | B2 | 10/2017 | Wilsher |
| 9,807,368 | B2 | 10/2017 | Vandame et al. |
| 9,809,218 | B2 | 11/2017 | Elie et al. |
| 9,811,753 | B2 | 11/2017 | Venkataraman et al. |
| 9,818,199 | B2 | 11/2017 | Seifi et al. |
| 9,832,376 | B2 | 11/2017 | Ueda |
| 9,836,885 | B1 | 12/2017 | Eraker et al. |
| 9,841,563 | B2 | 12/2017 | Lapstun |
| 9,843,776 | B2 | 12/2017 | Kim et al. |
| 9,843,787 | B2 | 12/2017 | Georgiev et al. |
| 9,857,470 | B2 | 1/2018 | Hilliges et al. |
| 9,857,604 | B2 | 1/2018 | Yang et al. |
| 9,860,522 | B2 | 1/2018 | Lapstun |
| 9,864,921 | B2 | 1/2018 | Venkataraman et al. |
| 9,880,325 | B2 | 1/2018 | Lanman et al. |
| 9,888,229 | B2 | 2/2018 | Meng et al. |
| 9,894,269 | B2 | 2/2018 | Chehade et al. |
| 9,906,759 | B2 | 2/2018 | Weiblen |
| 9,906,779 | B2 | 2/2018 | Huang |
| 9,930,272 | B2 | 3/2018 | El-Ghoroury et al. |
| 9,952,422 | B2 | 4/2018 | Vaziri et al. |

(56) References Cited

U.S. PATENT DOCUMENTS

| | | | |
|---|---|---|---|
| 9,955,861 | B2 | 5/2018 | Gao et al. |
| 9,965,471 | B2 | 5/2018 | Huston et al. |
| 9,965,982 | B2 | 5/2018 | Lapstun |
| 9,977,782 | B2 | 5/2018 | Huston et al. |
| 9,984,498 | B2 | 5/2018 | Loop |
| 9,990,738 | B2 | 6/2018 | Whiteford et al. |
| 10,008,141 | B2 | 6/2018 | Lapstun |
| 10,015,415 | B2 | 7/2018 | Lo |
| 10,019,816 | B2 | 7/2018 | Venkataraman et al. |
| 10,019,831 | B2 | 7/2018 | Champion et al. |
| 10,027,947 | B2 | 7/2018 | Ito et al. |
| 10,046,760 | B2 | 8/2018 | Elie et al. |
| 10,055,867 | B2 | 8/2018 | Law et al. |
| 10,070,115 | B2 | 9/2018 | Graziosi et al. |
| 10,120,442 | B2 | 11/2018 | Liu et al. |
| 10,122,988 | B2 | 11/2018 | Kitago |
| 10,122,994 | B2 | 11/2018 | Yücer et al. |
| 10,136,116 | B2 | 11/2018 | Tosic et al. |
| 10,169,910 | B2 | 1/2019 | Novak et al. |
| 10,176,592 | B2 | 1/2019 | Holzer et al. |
| 10,194,139 | B2 | 1/2019 | Gao et al. |
| 10,197,808 | B2 | 2/2019 | Du et al. |
| 10,217,292 | B2 | 2/2019 | Alvarez et al. |
| 10,230,911 | B1 | 3/2019 | Martinello |
| 10,230,940 | B2 | 3/2019 | Rodrguez Ramos et al. |
| 10,244,223 | B2 | 3/2019 | Graziosi et al. |
| 10,244,227 | B2 | 3/2019 | Erickson |
| 10,254,846 | B1 | 4/2019 | Kinstner et al. |
| 10,256,382 | B2 | 4/2019 | White et al. |
| 10,257,490 | B2 | 4/2019 | Khalid et al. |
| 10,262,451 | B1 | 4/2019 | Chou et al. |
| 10,269,130 | B2 | 4/2019 | Du et al. |
| 10,275,676 | B2 | 4/2019 | Venkataraman et al. |
| 10,275,935 | B2 | 4/2019 | Holzer et al. |
| 10,298,915 | B2 | 5/2019 | Huh et al. |
| 10,306,212 | B2 | 5/2019 | Luo |
| 10,311,768 | B2 | 6/2019 | Lapstun |
| 10,332,269 | B2 | 6/2019 | Kumar |
| 10,339,716 | B1 | 7/2019 | Powers et al. |
| 10,348,947 | B2 | 7/2019 | Vandame et al. |
| 10,354,451 | B2 | 7/2019 | Petkov et al. |
| 10,356,317 | B2 | 7/2019 | Schechner et al. |
| 10,371,932 | B2 | 8/2019 | Singer et al. |
| 10,373,366 | B2 | 8/2019 | Forutanpour et al. |
| 10,375,378 | B2 | 8/2019 | Wu |
| 10,382,676 | B2 | 8/2019 | Ueda |
| 10,388,323 | B2 | 8/2019 | Le Clerc et al. |
| 10,390,005 | B2 | 8/2019 | Nisenzon et al. |
| 10,397,541 | B2 | 8/2019 | Park et al. |
| 10,397,545 | B2 | 8/2019 | Yu et al. |
| 10,417,781 | B1 | 9/2019 | Konolige et al. |
| 10,424,106 | B1 | 9/2019 | Glazer |
| 10,429,639 | B2 | 10/2019 | Lapstun |
| 10,430,682 | B2 | 10/2019 | Venkataraman et al. |
| 10,430,995 | B2 | 10/2019 | Holzer et al. |
| 10,460,427 | B2 | 10/2019 | Sample et al. |
| 10,460,463 | B2 | 10/2019 | Whelan et al. |
| 10,467,800 | B2 | 11/2019 | Du et al. |
| 10,509,153 | B2 | 12/2019 | Urness et al. |
| 10,521,952 | B2 | 12/2019 | Ackerson et al. |
| 10,535,187 | B2 | 1/2020 | Dionne et al. |
| 10,893,262 | B2 | 1/2021 | Vetter et al. |
| 11,164,368 | B2 | 11/2021 | Vincent et al. |
| 11,508,115 | B2 | 11/2022 | Ackerson et al. |
| 2003/0001836 | A1 | 1/2003 | Ernst et al. |
| 2003/0128207 | A1 | 7/2003 | Sawada |
| 2004/0001059 | A1 | 1/2004 | Pfister et al. |
| 2008/0068372 | A1 | 3/2008 | Krah |
| 2009/0109220 | A1 | 4/2009 | Tomson et al. |
| 2011/0128412 | A1 | 6/2011 | Milnes et al. |
| 2012/0019533 | A1 | 1/2012 | Tabellion |
| 2013/0038696 | A1 | 2/2013 | Ding et al. |
| 2013/0128068 | A1 | 5/2013 | Georgiev et al. |
| 2013/0156297 | A1 | 6/2013 | Shotton et al. |
| 2014/0184749 | A1 | 7/2014 | Hilliges et al. |
| 2014/0201022 | A1 | 7/2014 | Balzer |
| 2014/0328535 | A1 | 11/2014 | Sorkine-Hornung |
| 2015/0146032 | A1 | 5/2015 | Rime et al. |
| 2015/0279085 | A1 | 10/2015 | Dell |
| 2015/0305612 | A1 | 10/2015 | Hunter et al. |
| 2015/0319424 | A1 | 11/2015 | Haimovitch-Yogev et al. |
| 2015/0373320 | A1 | 12/2015 | Ackerson et al. |
| 2016/0028935 | A1 | 1/2016 | El-Ghoroury et al. |
| 2018/0096527 | A1 | 4/2018 | Eraker et al. |
| 2018/0113200 | A1 | 4/2018 | Steinberg et al. |
| 2018/0144540 | A1 | 5/2018 | Novak et al. |
| 2018/0149791 | A1 | 5/2018 | Urness et al. |
| 2018/0227568 | A1 | 8/2018 | Vetter et al. |
| 2019/0011621 | A1 | 1/2019 | Karafin et al. |
| 2019/0072897 | A1 | 3/2019 | Jepsen et al. |
| 2019/0155835 | A1 | 5/2019 | Daugharthy et al. |
| 2021/0133929 | A1 * | 5/2021 | Ackerson .............. G06T 3/4076 |
| 2021/0335031 | A1 | 10/2021 | Hamilton |
| 2022/0058854 | A1 | 2/2022 | Cerny |

FOREIGN PATENT DOCUMENTS

| | | | |
|---|---|---|---|
| CN | 104463949 | A | 3/2015 |
| CN | 104509088 | A | 4/2015 |
| CN | 105190703 | A | 12/2015 |
| CN | 111796255 | A | 10/2020 |
| EP | 3144887 | A1 | 3/2017 |
| GB | 2535475 | A | 8/2016 |
| GB | 2535475 | B | 9/2019 |
| JP | 2003203220 | A | 7/2003 |
| JP | 2003331318 | A | 11/2003 |
| JP | 2004252935 | A | 9/2004 |
| JP | 2013537997 | A | 10/2013 |
| JP | 2021112809 | A | 8/2021 |
| WO | 2011066275 | A2 | 6/2011 |
| WO | 2018200316 | A2 | 11/2018 |
| WO | 2023172573 | A1 | 9/2023 |

OTHER PUBLICATIONS

Bi, S., et al., "Deep Relightable Appearance Models for Animatable Faces," ACM Trans. Graph., vol. 40, No. 4, Article 89, Aug. 2021, 15 pages.

Bonfort, T. et al., "Voxel Carving for Specular Surfaces," Proceedings of the Ninth IEEE International Conference on Computer Vision (ICCV), 2003, 6 pages.

Broadhurst, A., et al., "A Probabilistic Framework for Space Carving," Proc. of Int. Conference on Computer Vision, I, 6 pgs.

Broadhurst, A. et al., "A Statistical Consistency Check for the Space Carving Algorithm," Proceedings of the 11th British Machine Vision Conference, pp. 282-291, 2000.

Culbertson, W. et al, "Generalized Voxel Coloring," Seventh International Conference on Computer Vision, Sep. 1999, 16 pages.

Dyer, Charles R., "Volumetric Scene Reconstruction From Multiple Views," Foundations of Image Understanding, L.S. Davis, ed., Kluwer, Boston, Aug. 1, 2001, pp. 469-489.

Extended European Search Report, for Application No. 19796775.5, Dec. 6, 2021, 8 pages.

Extended European Search Report, for European Patent Application No. 17782971.0, Nov. 12, 2019, 9 pages.

EyeCue Vision Tech. "Qlone 3D Scanner." Apple App Store, Version 4.6.0 (2022) (available at https://apps.apple.com/us/app/qlone-3d-scanner/id1229460906), 3 pages.

Boyles, S. et al., "The Encoding of Arbitrary Two-Dimensional Geometric Configurations," International Journal of Computer and Information Sciences, vol. 10, No. 1, 1981, 25 pages.

Gaillard, M., et al., Voxel Carving Based 3D Reconstruction of Sorghum Identities Generic Determinants of Ration Interception Efficiency, bioRxiv preprint https://doi.org/10.1101/2020.04.06.028605, Apr. 7, 2020, 22 pages.

Leffingwell, John K. et al, "Generalized Scene Reconstruction", ArXiv, vol. abs/1803.08496, Mar. 2018, 14 pages.

International Search Report and Written Opinion, for PCT/US2017/026994, Jul. 6, 2017, 18 pages.

(56) References Cited

OTHER PUBLICATIONS

International Search Report and Written Opinion, for PCT/US2019/030483, Sep. 3, 2019, 127 pages.
Karras, T., et al., "A Style-Based Generator Architecture for Generative Adversarial Networks," CoRR 2018, vol. abs/1812.04948 (available at https://arxiv.org/abs/1812.04948), 2019, 12 pages.
Kutulakos, K., et al., "A Theory of Shape by Space Carving," U. of Rochester, 2000, pp. 1-34.
Lei, H., et al., "Octree guided CNN with Spherical Kernels for 3D Point Clouds," Computer Vision Foundation, date unknown, pp. 9631-9640.
Liu, J., et al., "RocNet: Recursive Octree Network for Efficient 3D Deep Representation," arXiv:2008.03875v1, Aug. 10, 2020, 32 pages.
Marschner, S. et. al., "Fundamentals of Computer Graphics", Third Edition, CRC Press, 2016, 785 pages.
Meka, A. et al., "Deep Relightable Textures," ACMTrans. Graph., vol. 39, No. 6, Article 259, 2020, 21 pages.
Mildenhall, B. et al., "NeRF: Representing Scenes as Neural Radiance Fields for View Synthesis," arxiv: 2003.08934v2, Aug. 3, 2020, 25 pages.
Morel, Oliver et al., "Active Lighting Applied to Three-Dimensional Reconstruction of Specular Metallic Surfaces by Polarization Imaging" Applied Optics. vol. 45, No. 17, Jun. 10, 2006, pp. 4062-4068.
International Search Report and Written Opinion, for PCT/US2023/014734, Aug. 7, 2023, 21 pages.
Munkberg, J. et al., "Extracting Triangular 3D Models, Materials, and Lighting From Images," arXiv:2111.12503, Nov. 24, 2021 (available at https://arxiv.org/abs/2111.12503v4), 21 pages.
Martin-Brualla, R. et al., "NeRF in the Wild: Neural Radiance Fields for Unconstrained Photo Collections," 2021 IEEE/CVF Conference on Computer Vision and Pattern Recognition (CVPR), 2020, pp. 1-15.
Riegler, G., et al., "OctNet: Learning Deep 3D Representations at High Resolutions," arXiv:1611.05009v4, Apr. 10, 2017, 21 pages.
Sainz, M., et al., "Hardware Accelerated Voxel Carving," Research Gate, publication 228917433, Dec. 17, 2013, 10 pages.
Samet, H., "The Design and Analysis of Spatial Data Structures," Addison-Wesley Series in Computer Science, 1989, 499 pages.
Scharr, H., et al., "Fast High Resolution Volume Carving for 3D Plant Shoot Reconstruction," Frontiers in Plant Science, Sep. 28, 2017, 12 pages.
Seitz, S., et al, "Photorealistic Scene Reconstruction by Voxel Coloring," Proceedings of the Computer Vision and Pattern Recognition Conference, 1997, pp. 1067-1073.
Seitz, S., et al, "Plenoptic Image Editing," Sixth International Conference on Computer Vision (IEEE Cat. No. 98CH36271), 1998, 29 pages.
Seitz, S., et al., "A Theory of Inverse Light Transport", MSR-TR-2005-66, available at https://www.microsoft.com/en-us/research/publication/a-theory-of-inverse-light-transport/, Mar. 2005, 8 pages.
Singh, R., et al., "3D convolutional neural network for object recognition: a review," Multimedia Tools and Applications, 2018, 45 pages.
Troccoli, A., et al, "Relighting Acquired Models of Outdoor Scenes," Proceedings of the 5th Int'l Conf. on 3-D Digital Imaging and Modeling, 2005, 8 pages.
Varma, M., et al, "A Statistical Approach to Texture Classification from single Images," International Journal of Computer Vision 62(½), 61-81m 2005, 34 pages.
Verbin, D., et al., "Ref-NeRF: Structured View-Dependent Appearance for Neural Radiance Fields," arXiv:2112.03907, Dec. 7, 2021 (available at https://arxiv.org/abs/2112.03907), 14 pages.
Wang, P., et al., "O-CNN: Octree-based Convolutional Neural Networks for 3D Shape Analysis," ACM Transactions on Graphics, vol. 36, No. 4, Article 72, Dec. 2017, 11 pages.
Wang, P., et al., "Adaptive O-CNN: A Patch-based Deep Representation of 3D Shapes," arXiv:1809.07917v1, Sep. 21, 2018, 12 pages.
Wang, P., et al., "Deep Octree-based CNNs with Output-Guided Skip Connections for 3D Shape and Scene Completion," Computer Vision Foundation, 2020, 8 pages.
Reigler, Gernot et al., "OctNetFusion: Learning Depth Fusion from Data", arXiv:1704.01047v3, Oct. 31, 2017, 10 pgs.
Yin, Jianfeng et al., "A New Photo Consistency Test for Voxel Coloring" Proceedings of the Second Canadian Conference on Computer and Robot Vision, May 9, 2005, pp. 566-570.
Yu, A., et al. "PlenOctrees for real-time rendering of neural radiance fields," arXiv:2103.14024, 2021, 18 pages.
Yu, A., et al., "Plenoxels: Radiance Fields without Neural Networks," arXiv:2112.05131v1, 2021, 21 pages.
Zeng, Ming et al., "A Memory-Efficient Kinect Fusion Using Octree," Intelligent Virtual Agent. IVA 2015. LINCS; [Lecture Notes in Computer Science; Lect. Notes Computer], Springer, Berlin, Hiedelberg, Nov. 8, 2012, pp. 234-240.
Zhang, J. et al., "NeILF++: Inter-reflectable Light Fields for Geometry and Material Estimation," arXiv:2303.17147, Mar. 30, 2023 (available at https://arxiv.org/abs/2303.17147), 15 pages.
Zhang, X., et al., "NeRFactor: Neural Factorization of Shape and Reflectance Under an Unknown Illumination," ACM|SIGGRAPH Asia 2021 Technical Papers, 2021, (available at https://dspace.mit.edu/handle/1721.1/146375), 19 pages.
Gao, Duan et al. "Deferred Neural Lighting", ACM Transaction on Graphics, ACM, vol. 39, No. 6, Nov. 26, 2020, pp. 1-15.
Morrison, J. Paul, "Flow-based Programming: A New Approach to Application Development", 2nd Edition, J.P. Morrison enterprises, 2010, 372 pages.

* cited by examiner

USE OF RELIGHTABLE MATTER FIELDS WITH ARTIFICIAL INTELLIGENCE AND MACHINE LEARNING MODELS

RELATED APPLICATIONS

This application claims priority to U.S. Provisional Application No. 63/317,330, filed Mar. 7, 2022, the contents of which are hereby incorporated by reference in their entirety.

FIELD OF THE INVENTION

The present invention relates to the fields of 3D imaging in general, and more particularly to tools for implementing various systems and methods relating to 3D model generation from images sometimes referred to as generalized scene reconstruction (GSR), volumetric scene reconstruction (VSR), or quotidian scene reconstruction (QSR), as well as systems and methods for light field reconstruction (LFR), as further described herein.

BACKGROUND OF THE INVENTION

There are myriad uses for 3D models of real-world scenes. Applications include use in global sectors including defense, security, entertainment, education, healthcare, infrastructure, manufacturing, and mobile. In the metaverse, applications include virtual real estate creation, NFT creation, and avatar creation. Various methods for capturing 3D images have been postulated or developed, some of which are capable of providing digital 3D models of real-world scenes with varying degrees of fidelity and for a variety of purposes, including visualization and information extraction. Such 3D images may be acquired by 3D imagers, which are variously referred to as 3D sensors, 3D cameras, 3D scanners, VR cameras, 360° cameras, RGBD cameras, and depth cameras.

Methods previously used to extract 3D information from a scene often involve active light sources such as lasers and have limitations such as high power consumption and limited range. A more ideal method is to use one or more images from inexpensive sensors, including cameras or devices that form images by sensing a light field using detectors, to generate detailed scene models. To increase the robustness of the extraction of scene models from images, an improved modeling of the transport of light is needed. This includes the characteristics of light interactions with matter, including transmission, reflection, refraction, scattering and so on. The thesis of Jarosz, "Efficient Monte Carlo Methods for Light Transport in Scattering Media" (2008) provides an in-depth analysis of the subject.

Earlier work has suggested a manner for creating 3D images and models using a process commonly known as Generalized Scene Reconstruction ("GSR"), which may alternatively be referred to as Volumetric Scene Reconstruction ("VSR"), or Quotidian Scene Reconstruction ("QSR). For example, U.S. Pat. No. 10,521,952 to Ackerson, et al., U.S. Pat. No. 11,508,115 to Ackerson, et al., and U.S. Patent Pub. No. 2021/0133929A1 to Ackerson, et al., and U.S. Provisional Patent Application No. 63/317,330 to Ackerson, et al., each of which are incorporated herein in their entirety by this reference, each variously describe systems and methods to accomplish aspects of GSR. In some situations, GSR may be accomplished using Scene Reconstruction Engines ("SREs") to create 3D scene models from digital images using a process called scene reconstruction. SREs may enable a category of components of devices-using-scene-reconstruction (DSRs), such as 3D mobile phones, tablets, computers, virtual reality (VR) and augmented reality (AR) glasses and other devices, drones and other autonomous, semi-autonomous, or controlled unmanned systems, and other digital hand-held or non-hand-held devices.

Certain of the advantages of GSR have been set forth in the above-referenced patents and patent applications. For example, FIGS. 4B and 10 of U.S. Patent Pub. No. 2021/0133929A1 are pictorial diagrams representative of a real-world scene, where the representation can be considered as an abstract scene model view of data comprised within a plenoptic scene database. FIG. 4B focuses on a larger scene where FIG. 10 focuses on a smaller scene. The abstract representation of the scene model for the two different types of scenes contains a plenoptic field comprising the matter field and light field of the scene. Light field interacts with any number of objects in the matter field, as well as other objects such as, for example, explained objects, unexplained regions, opaque objects, finely structured objects, distant objects, emissive objects, highly reflective objects, featureless objects, or partially transmissive objects. U.S. Patent Pub. No. 2021/0133929A1 teaches that an important aspect of GSR is the that matter field is identified by scene reconstruction sufficient for the differentiation between multiple types of objects, where then any individual type of object uniquely located in the model scene can be further processed, for example by using machine learning to perform object recognition and classification, altering various characteristics and properties to cause model presentation effects such as changes to visualization, object augmentation and tagging, and even object removal.

GSR may be implemented in certain embodiments by making use of a codec. Various codecs are well known in the art and in general are devices or programs that compresses data to enable faster transmission and decompresses received data. Exemplary types of codecs include video (e.g., MPEG, H.264), audio (e.g., MP3, ACC), image (e.g., JPEG, PNG), and data (e.g., PKZIP), where the type of codec encapsulates and is strongly coupled to the type of data. In many legacy applications, inherent with the strong coupling is a limited end user experience. Codecs are often implemented in an essentially "file-based" manner, where the file is a data representation of some real or synthetic pre-captured sensory experience, and where the file (such as a movie, song, or book) necessarily limits a user's experience to experience-paths chosen by the file creator. Hence, the user watches movies, listens to songs, and reads books in a substantially ordered experience confined by the creator.

In the context of GSR, use of a codec demands an increase in the types of data processed by such a codec, and particularly to perform GSR in which sensors such as cameras and range finding devices create scene models of the real-world scene. Challenges for accomplishing GSR include representing and organizing representations sufficiently to describe the complexities of real-world matter and light fields in an efficiently controllable and highly extensible manner, and where distribution is challenged in terms of managing active, even live, scene models across a multiplicity of interactive clients, each potentially requesting any of a virtually unlimited number of scene perspectives, detail, and data types.

In addition, Machine Learning (ML) and Artificial Intelligence (AI) systems have made great progress in recent years and have become useful and effective in many areas of application. Many such systems are used for object identification in a scene and for other useful purposes. ML and AI systems are often based on the processing of 2D images from camera systems. Such images are typically arrays of red, green, and blue (RGB) values. Such sensed information is composed of samples of the light field entering the camera lens and converging at the viewpoint. These light samples are the result of a complex series of interactions between light and matter in the scene and are governed by the laws of physics. While the "true" characteristics of an object such as actual color and reflective properties may be important for determining the type or nature of the matter in a scene, this information cannot, in general, be determined from a conventional photo.

The interaction of light rays from sources inside and outside the scene reflecting off and occluded by other matter in the scene contributes to a complex scene light field, effectively obscuring fundamental information about the matter in the scene. In addition to obvious examples, such as shadows, viewed color changes occur when light reflected off another object influences the light reflected from an object. Lambertian surfaces reflect light approximately equally in all directions. A major additional difficulty occurs when the surfaces of objects are non-Lambertian. Such surfaces have complex reflection characteristics that cannot be easily resolved in conventional systems. This difficulty includes subsurface scattering, specular reflection, transparency, and such. For example, subsurface scattering is a major component of the visual appearance of human skin.

Because of the difficulty of determining the fundamental characteristics of a material from reflected light in a scene as captured by a camera, supervised ML systems based on images typically require a large training set in order to be a reasonable representation of the light interaction situations that could be expected during operation. Such image training sets are typically classified manually by labeling images with identifying information for each object of interest (OOI) in each image. Depending on the use, training sets may have objects identified as "good" (where the image or part of the image contains the OOI) or "bad" (image does not contain OOI). Often, the good and bad objects are in approximately equal numbers.

In some cases, such as anomaly detection, only good or mostly good training examples are needed. If a production image is not identified as an OOI, an anomaly has been detected. If there are errors, even subtle errors, in the training sets, the quality of the results may suffer. For example, if the mix of good and bad training cases is substantially disadvantageous, there is a risk of overfitting, which is a situation where the system will correctly recognize the training objects but not reliably objects in production images.

In most cases, a correct error-free, labeled dataset for training and testing is the most important part of a machine learning system. Compiling such a dataset often requires thousands or even millions of manually labeled images, a substantial expense and major obstacle to widespread use. Such systems could be more effective and easier to train if the effects of the light field interactions in a scene could be modeled and the effects disentangled in camera images.

Various patents, patent applications, and other publications have considered how to perform GSR, other forms of 3D imaging or scene reconstruction, or component processes or systems of such activities. For example, the following documents reference various aspects of GSR and aspects of segmenting three dimensional spaces by media characteristics: Leffingwell, J., et al., "Generalized Scene Reconstruction," arXiv:1803.08496, 24 May 2018; Kutulakos, K., et al., "A Theory of Shape by Space Carving," U. of Rochester, 2000; Bonfort, T., and Sturm, P., "Voxel Carving for Specular Surfaces," Proceedings of the Ninth IEEE International Conference on Computer Vision (ICCV), 2003; Broadhurst, A., et al., "A Probabilistic Framework for Space Carving," Proc. of Int. Conference on Computer Vision, I, pp. 282-291, 2001; Broadhurst, A. and Cipolla, R., "A Statistical Consistency Check for the Space Carving Algorithm," Proceedings of the 11th British Machine Vision Conference, pp. 282-291, 2000; Gaillard, M., et al., "Voxel Carving Based 3D Reconstruction of Sorghum Identities Generic Determinants of Ration Interception Efficiency, bioRxiv preprint https://doi.org/10.1101/2020.04.06.028605, Apr. 7, 2020; Sainz, M., et al., "Hardware Accelerated Voxel Carving," Research Gate, publication 228917433; Scharr, H., et al., "Fast High Resolution Volume Carving for 3D Plant Shoot Reconstruction," Frontiers in Plant Science, Sep. 28, 2017; Seitz, S. and Dyer, C., "Photorealistic Scene Reconstruction by Voxel Coloring," Proceedings of the Computer Vision and Pattern Recognition Conference, pp. 1067-1073, 1997; Culbertson, W., Malzbender, T. and Slabaugh, G., "Generalized Voxel Coloring," Seventh International Conference on Computer Vision, September 1999; Dyer, C., "Volumetric Scene Reconstruction from Multiple Views," Foundations of Image Analysis, L. S. Davis, ed., Chapter 1, 2001; Seitz, S. and Kutulakos, K., "Plenoptic Image Editing," Sixth International Conference on Computer Vision (IEEE Cat. No. 98CH36271), 1998; Troccoli, A. and Allen, P., "Relighting Acquired Models of Outdoor Scenes," Proceedings of the $5^{th}$ Int'l Conf. on 3-D Digital Imaging and Modeling, 2005; Singh, R., et al., "3D convolutional neural network for object recognition: a review," Multimedia Tools and Applications, 2018; Riegler, G., et al., "OctNetFusion: Learning Depth Fusion from Data," arXiv:1704.01047v3, 31 Oct. 2017; Riegler, G., et al., "OctNet: Learning Deep 3D Representations at High Resolutions," arXiv:1611.05009v4, 10 Apr. 2017; Meka, A., et al., "Deep Relightable Textures," ACMTrans. Graph., Vol. 39, No. 6, Article 259, 2020; Liu, J., et al., "RocNet: Recursive Octree Network for Efficient 3D Deep Representation," arXiv:2008.03875v1, 10 Aug. 2020; Lei, H., et al., "Octree guided CNN with Spherical Kernels for 3D Point Clouds," Computer Vision Foundation, pp. 9631-40; Bi, S., et al., "Deep Relightable Appearance Models for Animatable Faces," ACM Trans. Graph., Vol. 40, No. 4, Article 89, August 2021; Wang, P., et al., "O-CNN: Octree-based Convolutional Neural Networks for 3D Shape Analysis," ACM Transactions on Graphics, Vol. 36, No. 4, Article 72, July 2017; Wang, P., et al., "Adaptive O-CNN: A Patch-based Deep Representation of 3D Shapes," arXiv:1809.07917v1, 21 Sep. 2018; Wang, P., et al., "Deep Octree-based CNNs with Output-Guided Skip Connections for 3D Shape and Scene Completion," Computer Vision Foundation, 2020; U.S. Pat. Nos. 4,694,404; 5,123,084; 6,123,733; 6,980,935; 6,831,641; 7,843,449; 8,432,435; 8,547,374; 8,749,620; 8,749,694; 9,179,126; 9,857,470; 10,169,910; 10,509,153; 10,893,262; 11,164,368; U.S. Pat. Pub. No. 20080068372; U.S. Pat. Pub. No. 20110128412; U.S. Pat. Pub. No. 20130038696; U.S. Pat. Pub. No. 20130156297; U.S. Pat. Pub. No. 20140184749; U.S. Pat. Pub. No. 20140201022; U.S. Pat. Pub. No. 20150146032; U.S. Pat. Pub. No. 20150305612; U.S. Pat. Pub. No. 20150373320; U.S. Pat. Pub. No. 20160028935; U.S. Pat. Pub. No. 20180113200; U.S. Pat. Pub. No. 20180144540; U.S. Pat. Pub. No. 20180149791; U.S. Pat. Pub. No. 20180227568; U.S. Pat. Pub. No. 20190011621; U.S. Pat. Pub. No. 20190072897; U.S. Pat. Pub. No. 20190155835; U.S. Pat. Pub. No. 20220058854; U.K. Pat. No. GB2535475B; E.P. Pat. App. No. EP3144887A1; PCT Pub. No.

WO2011066275A2; PCT Pub. No. 2018200316; PCT Pub. No. WO2018200316; PCT Pub. No. WO2019213450A1; New Zealand Pat. Pub. No. NZ743841A; Chinese Pat. Pub. No. CN111796255A. The following documents reference various aspects of GSR and aspects of nonparametric modeling: Freeman, H., "On the encoding of arbitrary geometric configurations," IRE Transactions on Electronic Computers EC-10, pages 260-268; Samet, H., "The Design and Analysis of Spatial Data Structures," Addison-Wesley Series in Computer Science, 1989; Marschner, S., Shirley, P., et. al., "Fundamentals of Computer Graphics," CRC Press, 2016; Varma, M., and Zisserman, A., "A Statistical Approach to Texture Classification from single Images," International Journal of Computer Vision 62(1/2), 61-81m 2005. The following documents reference various aspects of GSR and aspects of integral rendering: Mildenhall, B., et al., "NeRF: Representing Scenes as Neural Radiance Fields for View Synthesis," arxiv: 2003.08934v4, 3 Aug. 2020 (video: https://www.matthewtancik.com/nerf); Yu, Alex, et al. "PlenOctrees for real-time rendering of neural radiance fields," arXiv:2103.14024 (2021); Yu, A., et al., "Plenoxels: Radiance Fields without Neural Networks," arXiv:2112.05131v1 (2021); EyeCue Vision Tech. "Qlone 3D Scanner." Apple App Store, Version 4.6.0 (2022) (available at https://apps.apple.com/us/app/qlone-3d-scanner/id1229460906); J. Paul Morrison, "Flow-based Programming: A New Approach to Application Development," 2nd Edition, J.P. Morrison Enterprises, 2010; Karras, T., et al., "A Style-Based Generator Architecture for Generative Adversarial Networks," CoRR 2018, vol abs/1812.04948 (available at https://arxiv.org/abs/1812.04948); R. Martin-Brualla, et al., "NeRF in the Wild: Neural Radiance Fields for Unconstrained Photo Collections," 2021 IEEE/CVF Conference on Computer Vision and Pattern Recognition (CVPR), 7206-7215 (2020); Zhang, X., et al., "NeRFactor: Neural Factorization of Shape and Reflectance Under an Unknown Illumination," ACM|SIGGRAPH Asia 2021 Technical Papers (2021) (available at https://dspace.mit.edu/handle/1721.1/146375). Each of the foregoing documents and the disclosures therein are hereby incorporated herein in their entirety by this reference.

Accordingly, there is a need to overcome the drawbacks and deficiencies in the art by providing various systems and methods for accomplishing GSR and components thereof, and the many needs and opportunities of the marketplace.

SUMMARY OF EXAMPLE EMBODIMENTS OF THE INVENTION

The following simplified summary may provide a basic initial understanding of some aspects of the systems and/or methods discussed herein. This summary is not an extensive overview of the systems and/or methods discussed herein. It is not intended to identify all key/critical elements or to delineate the entire scope of such systems and/or methods. Its sole purpose is to present some concepts in a simplified form as a prelude to the more detailed description that is presented later.

In some embodiments, one or more objects in a scene may be reconstructed using a processor for processing digital scene data and an interface for receiving input related to a scene to be captured. In that embodiment, (i) the input comprises digital scene data in the form of image data representing a scene from a viewpoint, (ii) the processor processes the digital scene data and input to generate a three-dimensional model of at least part of the scene comprising matter comprising interacting media, (iii) the processor processes the image data by visiting one or more voxels in the matter field represented by the image data, and (iv) the processor processes the image data by determining if matter represented in each of the one or more voxels comprises interacting media. The image data may be captured by a camera and may be data related to electromagnetic radiation, such as radiance values for visible, infrared, polarized or unpolarized light, and/or radar. The orientation may include the pose of a camera and may include more than one pose or orientation in some embodiments. The three-dimensional model may be represented in a data structure. In some embodiments, the three-dimensional model is represented by a combination of a first data structure storing plenoptic data and a second data structure comprising the orientations of the digital scene data. Some embodiments of the invention may also store information related to a light field in the scene in the first data structure or in a third data structure. In some embodiments, the processor processes the image data from the at least two orientations sequentially. In some embodiments, the matter represented in a voxel is represented by a mediel, and data related to the mediel may be stored in the plenoptic data structure. Data related to the mediel may comprise an exitant light field and/or an incident light field, and such data may be represented by a radiel.

In some embodiments, the scene reconstruction may comprise processing the image data by postulating the orientation of the digital scene data. The processing of the image data may include (i) postulating that media exists in a voxel; (ii) postulating one or more of a surface normal, a light interaction property, an exitant radiance vector, an incident light field of the media, among other properties; (iii) calculating a cost for the existence of the media in the voxel based on the postulated one or more of a surface normal, a light interaction property (e.g., a refractive index, roughness, polarized diffuse coefficient, unpolarized diffuse coefficient, or extinction coefficient), an exitant radiance vector, and an incident light field of the media; (iv) comparing the cost to a cost threshold; and (iv) accepting media as existing at a voxel when the cost is below the cost threshold. In some embodiments, when the system has accepted media as existing at a voxel, the media remains in the scene in subsequent processing of the scene. Certain embodiments may update the postulation of a light field for one or more other voxels based on the accepted existence of the media. The system may perform the process iteratively for more than one voxel and/or more than one set of image data. In some embodiments, the results of the processing may be stored in a data structure, including in a hierarchical data structure. Processing may be accomplished by traversing the data structure hierarchically from a coarser level to a finer level, and finer levels of detail may be stored in the data structure by subdividing the data structure.

Certain embodiments of the invention comprise a method of training a machine learning model comprising providing image data to the machine learning model, wherein the image data comprises one or more objects of interest; processing the image data to generate a model, wherein such processing comprises analyzing the image data to generate one or more of a light field model of a scene or a reconstruction of one or more matter fields in a scene; selecting an object of interest in the model of the scene; extracting the object of interest in the model of the scene; and outputting a relightable matter field model of the object of interest in the scene. The image data may comprise relightable matter field data. In some embodiments, the image data comprises one or more of objects of interest in a plurality of scenes and objects of interest under a variety of conditions. The relightable matter field may be constructed from a plurality of images of two dimensions or higher. The relightable matter field model may comprise one or more of shape information, bidirectional light interaction function (BLIF) information, an emissive light field (if present; e.g., a light source in the scene itself), and incident and/or responsive light fields arising from an emissive light field. Further, the light field information may be used to compute the light interaction characteristics of locations in the matter field. In some embodiments, the method may further comprise varying BLIF and/or geometric information of a model; inputting the model with varied BLIF information into the machine learning model; and performing one or more of the foregoing steps on the model with varied BLIF information to further train the machine learning model.

Some embodiments of the invention comprise a method of using a machine learning model comprising identifying one or more objects of interest in a model of a scene; accessing a relightable matter field of the scene; selecting the portions of the matter field to be processed; processing the selected portions of the matter field to extract at least a portion of the relightable matter field; and outputting the extracted portions of the relightable matter field. The method may further comprise testing the utility of the portion of the relightable matter field output by the machine learning model.

In some embodiments, the invention comprises using a trained machine learning model to identify one or more objects or characteristics of interest in a scene and using such identification to provide an initial postulation for light field and/or matter field reconstruction. In such embodiments, the invention may provide for faster processing of image data to perform reconstruction of a scene or a part thereof. In some embodiments, the output of the trained machine learning model comprises one or more of the size, shape, and/or location of media in the scene and/or light interaction properties of media in the scene.

Some embodiment of the invention may use as additional input reconstructions of light and/or matter field properties as an input for scene reconstruction processes. For example, embodiments of the invention may use a point cloud provided by LiDAR or another matter and/or light field reconstruction provided by other technologies (e.g., multi-view stereo, photogrammetry, infrared, radar, etc.) to provide an initial or updated postulation of characteristics of media in the scene. Embodiments of the invention may then perform the scene reconstruction processes described herein to reconstruct a light field and/or matter field in the scene.

In some embodiments, the invention may provide for reconstructing one or more objects in a scene by means of a processor for processing digital scene data; an interface for receiving input related to a scene to be captured; wherein the processor processes the digital scene data and input to generate a three-dimensional model of at least part of the scene; wherein processor the input directs at least a portion of the processing of the digital scene data; and wherein the processor provides an output comprising the three-dimensional model of at least part of the scene. The input may comprise at least one of an approximation of at least a portion of the light field in the scene, an approximation of at least part of the matter field in the scene, one or more shapes present in the scene, one or more objects in the scene, or information related to one or more light sources in the scene. The input may control one or more sensing devices providing digital scene data. In some embodiments, the system may provide a feedback regarding one or more objects to be reconstructed within the scene, and the feedback may comprise a preview of one or more objects to be reconstructed within the scene. The system may update the preview as one or more objects are reconstructed with results from such reconstruction. The preview may further comprise one or more indications regarding one or more parameters of the reconstruction. The preview may comprise one or more masks representing data related to the generated model and information received from a digital scene data capture device. The feedback may comprise one or more of information related to a rate of capture of digital scene data, a position for capturing digital scene data, a sensor angle for capturing digital scene data, an aspect of a light field in the scene, or an aspect of the matter field in the scene. In some embodiments, the input is data that permits the alignment of the digital scene data with newly-received digital scene data. In some embodiments, the system may further include a set of instructions for accomplishing one or more goals for the generation of the three-dimensional model, wherein the one or more goals include one or more of a desired resolution of a light field, a desired resolution of a matter field, a desired certainty threshold for reconstruction, a threshold for elimination of gaps in captured digital scene information, and a trigger for an event encountered during capture of the digital scene information. In some embodiments, the trigger comprises one or more of a specified matter field structure, a specified light field structure, a passage of time, and a change in the level of uncertainty in the model. The system may be configured to take an action in response to the trigger, and the response may include one or more of altering a display configuration, adding an overlay to a display, providing an audio cue, providing a visual cue, changing a reconstruction goal, and altering a setting of a device connected to the system.

Certain embodiments of the invention may be configured to alter one or more features of a scene model. For example, the altering may include one or more of editing a light field reconstruction, editing a matter field reconstruction, transforming the model, deforming the model, relighting all or any portion of the model, altering one or more light interaction properties of BLIFs, assigning one or more BLIFS to different areas of a matter field, manipulating the model by dragging on anchor points, by typing keyboard shortcuts, or by sculpting and painting on the model using brush tools, inserting new matter fields, inserting new light fields, relighting one or more matter fields (in whole or in part), deleting a light field in whole or in part, and deleting a matter field in whole or in part. In some embodiments, the system may be configured to spatially search the model using a search query comprising one or more parameters. Such a spatial search may include obtaining one or more of a count, selection, or group of light field structures, or obtaining one or more of a count, selection, or group of matter field structures, matching the one or more parameters of the search query. The search query may be provided as a selected region of light, a selected region of matter, and/or a descriptive word generating a response based on machine learning. The parameters may include one or more of matter field shape, light field structure, radiometric intensity, size, and BLIF.

In some embodiments, the system further comprises a display used to capture digital scene information, wherein during capture information from a plurality of sources are spatially interlaced layers shown in three or more adjacent regions of the display. The regions of the display may include a live reconstruction preview, and all layers on the display may be substantially aligned to the same viewpoint. Moreover, all layers on the display may contain information about the scene. In some embodiments, one of the layers on the display is a pre-scene rendering (e.g., a priori scene and/or partially or fully initialized scene model) aligned to substantially the same viewpoint as the other layers. A display may be used during capture to indicate how many angles around a certain region of the scene have been captured already, and the indication may be provided by displaying a spherical or semispherical overlay centered on a selected mediel which includes the BLIF. At least one section of the spherical overlay may change in response to viewing the mediel from a variety of angles relative to the mediel's corresponding location in real space, and the change to the at least one section of the spherical overlay may comprise one or more of disappearing, changing color, or undergoing other visible alteration.

Although the example embodiments are expressed in the form of a system or method, those of skill in the art will recognize that these examples could be modified to include similar constructions at least as: (A) a machine apparatus in which claimed functionality resides, (B) performance of method steps that perform the processes described by a system, and/or (C) non-volatile computer program storage media containing executable program instructions which, when executed on a compatible digital processor, provide the functionality of a recited system or method.

Additional features and advantages of the example embodiments are described below.

BRIEF DESCRIPTION OF THE DRAWINGS

These and other features and advantages will be better and more completely understood by referring to the following detailed description of example non-limiting illustrative embodiments in conjunction with the following drawings.

DETAILED DESCRIPTION

Figure 1A:
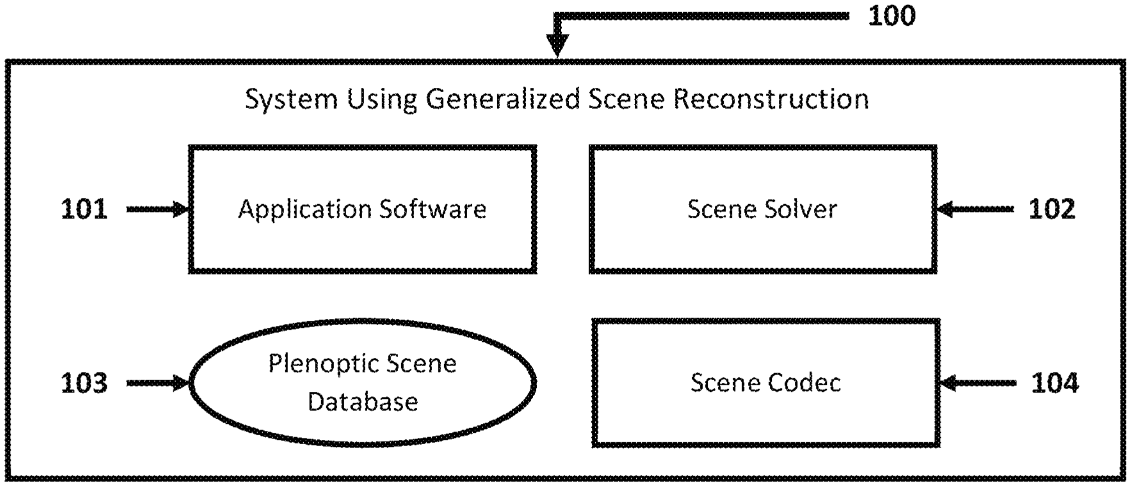
FIGS. 1A-1E illustrate an exemplary structure for a system using Generalized Scene Reconstruction (GSR), an exemplary configuration for capturing image data, and an exemplary scene, including a matter field and a light field.

As described in various embodiments herein, one aim of the present invention is to provide systems and methods for performing scene reconstruction, and particularly performing generalized scene reconstruction (GSR). In some embodiments, the result of GSR processes or systems may result in a reconstruction of a light field, a matter field (including a relightable matter field), characterization of camera poses, or any combination of the foregoing. The result of GSR processes may result in a model representing a scene based upon the reconstructed light field or matter field (including the relightable matter field) individually and separately, or of the two together, as may be desirable under the circumstances. As used herein, a scene may refer to the entire scope of the light and/or matter field represented in an image, any portion thereof, or any media therein. Although the terms subscene, portion of a scene, region of interest, object of interest, and other similar terminology may be used to refer to a portion of a larger scene, each of the foregoing is itself a scene.

In some embodiments, the invention may be configured to create a model of a scene using static data (i.e., data captured of the scene where the contents of the scene are not moving) or a dynamic scene (i.e., data captured of the scene where the contents of the scene are moving relative to each other and/or the image capture device). Similarly, the model may be configured to represent a scene, portion of a scene, or one or more objects in a scene in a static configuration (i.e., the reconstruction depicts the scene where the contents of the scene are not moving) or a dynamic configuration (i.e., where a portion of or all of the contents of the scene are in motion). In the case of a dynamic configuration, the model may be configured to represent dynamism in the matter field, in the light field, or both.

The invention described herein may provide advantages over conventional representations of dynamic scenes. For example, in some known systems for representing a scene (e.g., where the representation primarily regards the scene's light field rather than the scene's matter field), there may be challenges representing dynamism because the associated light characteristics are directly associated with media in the scene, causing a need to reinitialize and/or retrain large portions of the scene model for every time step where the matter field has changed configuration (e.g., changed shape or movement). In some embodiments hereof, when reconstructing a dynamic scene, the inventions described herein may calculate the interaction with the light field in the scene with the portions of the scene in motion, allowing for better understanding of the media comprising such objects. Similarly, when using a model to represent a dynamic scene, embodiments of the inventions described herein may more accurately present the portions of the scene in motion by understanding how such portions will interact with light in the modeled scene. In some embodiments, subscenes represented as a relightable matter field may use a kinematic model with optional deformation to represent the dynamism in a real matter field. Effects of dynamism on the light field, whether for rendering or another purpose, may then be more straightforwardly computable using light transport operations described herein.

A system using GSR 100 as described herein may comprise the components depicted in FIG. 1A. Specifically, the system 100 may comprise application software 101 for interfacing with the system, a scene solver configured to perform certain GSR functions 102, a plenoptic scene database configured to store information related to a reconstruction of the scene 103, and a scene codec for encoding and/or decoding information related to a reconstruction of the scene 104.

Figure 1B:
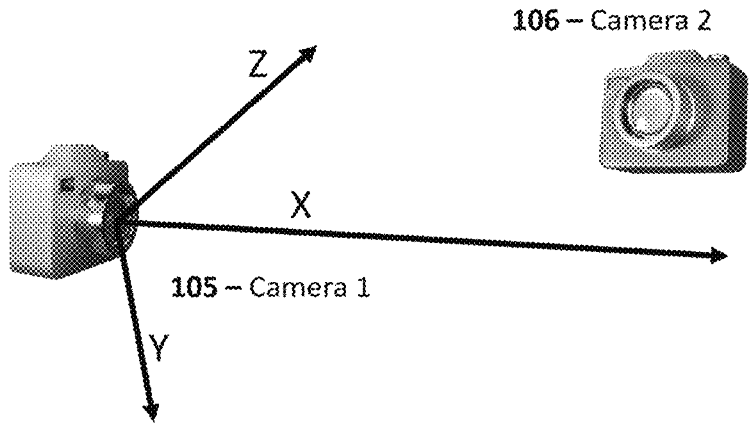
Figure 1C:
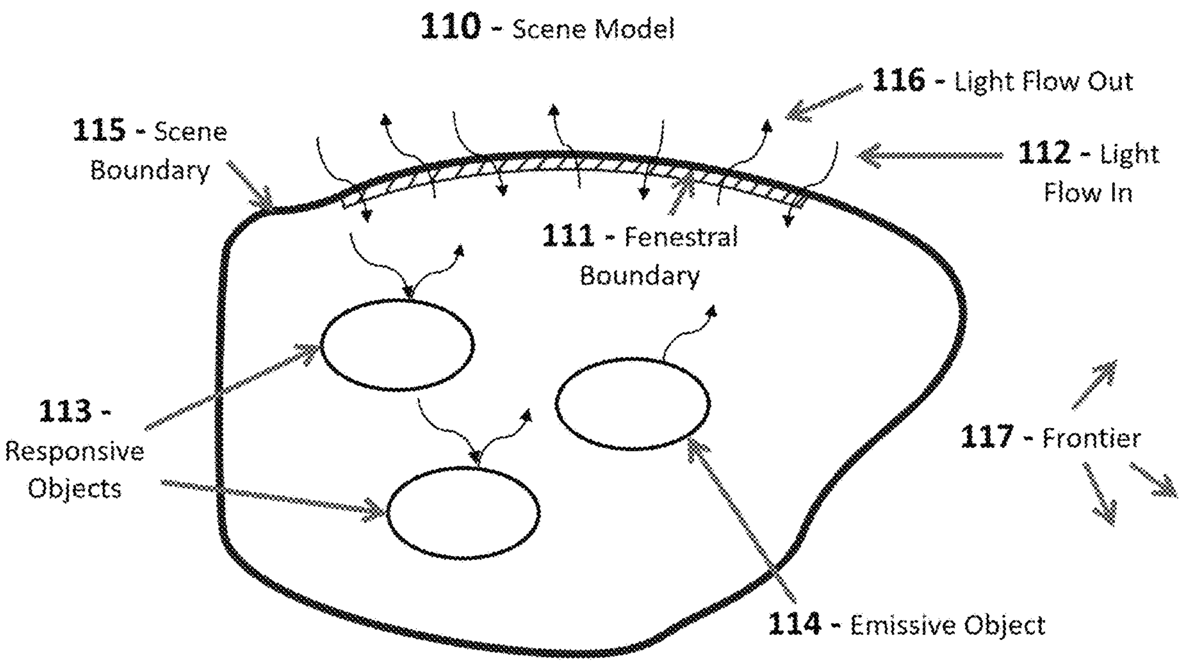
Figure 1D:
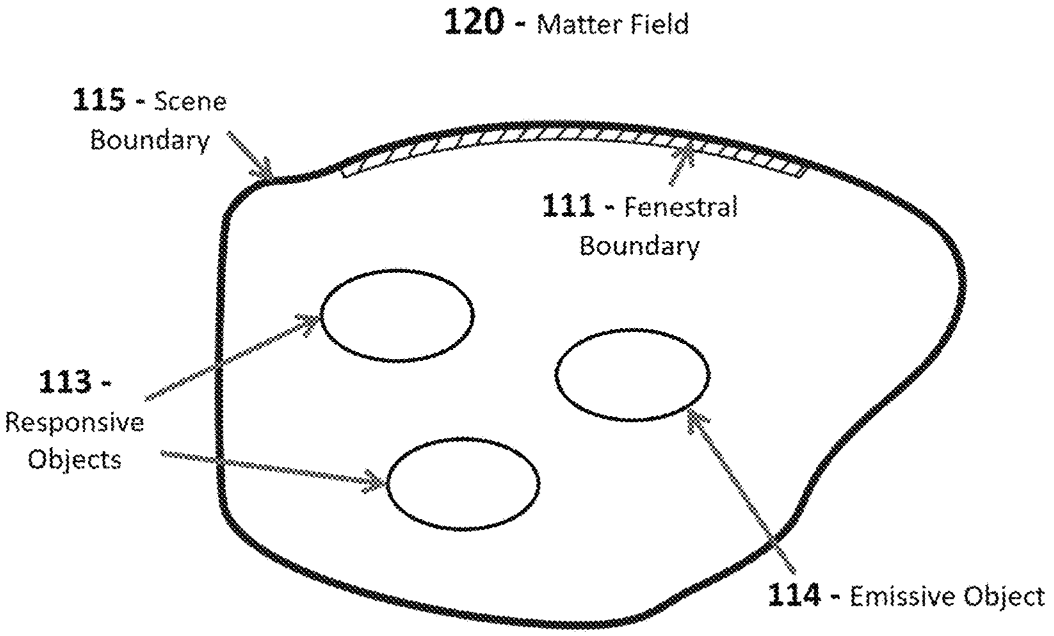
Figure 1E:
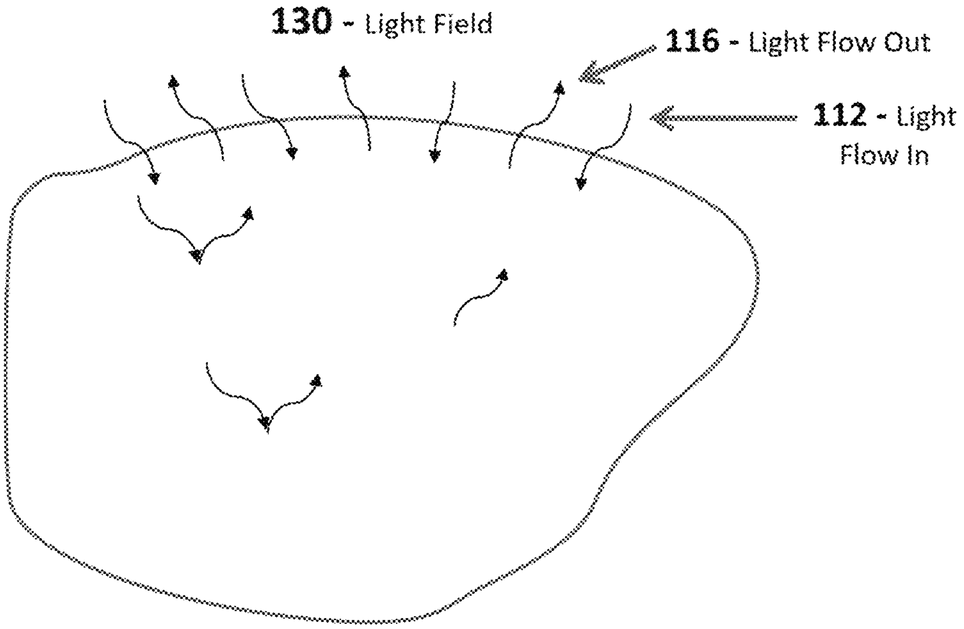

Various exemplary embodiments of scene models are depicted in FIGS. 1C-1E. A scene model 110 may comprise a matter field 120 and a light field 130, either in a single model, as depicted in FIG. 1C, or separate, as depicted in FIG. 1D (matter field) and FIG. 1E (light field). A scene may have external illumination 112 flowing into the scene and providing a source of light in the scene. A scene may also be a unitary scene, wherein there is no light flowing into the scene 112. A scene may have a boundary 115, which may optionally be defined by the system during reconstruction of the scene, by a physical boundary in the scene, by a user or other input, by some combination of the foregoing, or otherwise. Information beyond the boundary of a scene may be considered a frontier 117, and may not be represented in the scene. However, in some embodiments, the boundary 115 may comprise a fenestral boundary 111 in whole or in part. A fenestral boundary 111 may be a portion of a scene boundary 115 through which incident light 112 may flow into the scene and exitant light 116 may flow out of the scene. In some embodiments, portions of the frontier 117 may be represented, at least in part, at the fenestral boundary 111. By way of example, a fenestral boundary 111 may be defined based on a physical feature in the scene (e.g., a window or skylight in a wall or ceiling through which light can enter the scene), based on a scene parallax (e.g., a boundary based on a distance or lack of resolution of image data, such as for an outdoor night scene looking at the sky where there is very long range in the field of view), some combination of the two, or some other factor. The scene may include one or more objects, including responsive objects 113 and emissive objects 114. Emissive objects 114 may emit light independent of light incident to the object, whereas responsive objects may interact with incident light without emitting light themselves.

The systems and processes described herein may use image data. Image data may provide one or more characteristics of a light field at a moment in time (e.g., for a still image or frame of a video) or a series of moments in time (e.g., for a video or other data providing image information over time). Image data may be two dimensional, three dimensional, or higher dimensional in various embodiments. Image data optionally may include information on distances or positions associated with media in the scene, one or more measurements or characterizations of depth and/or range, polarimetric data, infrared data, hyperspectral data, or other data related to radiometric characteristics. Image data may include previously captured image data, image data captured from one or more cameras or other imaging devices concurrently with the processes discussed herein, synthetic or computer-generated image data, or any combination of the foregoing. In addition, the systems and processes described herein may use other types of data in performing GSR processes.

As depicted in FIG. 1B, embodiments of the invention may obtain one or more images of the scene, either in the form of images captured by a camera or other image sensing device 105, previously-stored images, or other image data representing the scene. In some embodiments, the image data may comprise data related to light, i.e., electromagnetic radiation, including, but not limited to, radiance values for visible light, infrared, radar, and/or polarized or unpolarized light. Such data may be represented on a pixel-by-pixel or other basis. Each image or set of image data may preferably represent an incident light field at the point from which the image data is or was captured. In some embodiments, the present invention may select an image, possibly the first image taken, to define the origin and orientation of the scene.

Certain embodiments of the invention provide for using information from a scene, including, for example, image information that may be represented in digital form, to create one or more models of a scene, a region of interest within a scene, or of an entire scene.

In some embodiments, a scene or portion thereof may be represented by one or more plenoptic elements or primitives that may be stored in a data structure. In some embodiments of the invention, spatial information in a scene is separated into plenoptic information and analytic information. In this embodiment, plenoptic elements may represent a scene in the model, and preferably may represent the elements in a scene more realistically than analytic elements. Some embodiments of the invention use at least one plenoptic element, one or more of which may be contained within a voxel, and/or a sad, or solid angle element.

A scene may contain one or more voxels, each of which may be the same size and shape, or may be selected from a range of sizes and/or shapes as determined by the user or the system. A voxel may contain a mediel, or media element, that may represent all or a portion of media sampled in the voxel. Media is a volumetric region that includes some or no matter in which light flows. Media can be homogeneous or heterogeneous. Examples of homogeneous media include: empty space, air and water. Examples of heterogeneous media include volumetric regions including the surface of a mirror (part air and part slivered glass), the surface of a pane of glass (part air and part transmissive glass) and the branch of a pine tree (part air and part organic material). Light flows in media by phenomena including absorption, reflection, transmission and scattering. Examples of media that is partially transmissive includes the branch of a pine tree and a pane of glass.

A sael may contain a radiel, or radiometric element, that may represent all or a portion of light flowing in one or more directions. Light includes electromagnetic waves at frequencies including visible, infrared, and ultraviolet bands. Certain embodiments of the invention may create, calculate, and/or store mediels and/or radiels contained by plenoptic elements using digital images, digital artistry, other processes, or some combination of the foregoing. Thus, in certain embodiments, plenoptic elements can be used to sample light and matter in a spatial scene, representing three dimensions of the matter field and two dimensions of light flowing in the scene (5D) in a manner that may be like how a pixel element can be used to sample light at a particular location in a scene. Analytic elements may include geometric entities like points, lines, planes, and CAD models.

A plenoptic element may have one or more features, or sets of characteristics, e.g., length, color, and/or shape. In some embodiments, a feature may be identified in and/or between segments in a scene. Features have one or more of descriptions and instances.

Certain plenoptic elements may comprise a mediel 201 that comprises a surface element or surfel 202. Such elements may represent an abrupt interface between two regions of homogeneous but different media. A surfel 202 is exemplarily depicted in FIG. 2, which depicts a planar surfel comprising vectors 204 and 205 as axes of the plane, and a normal direction 203 extending perpendicularly from the plane.

Figure 2A:
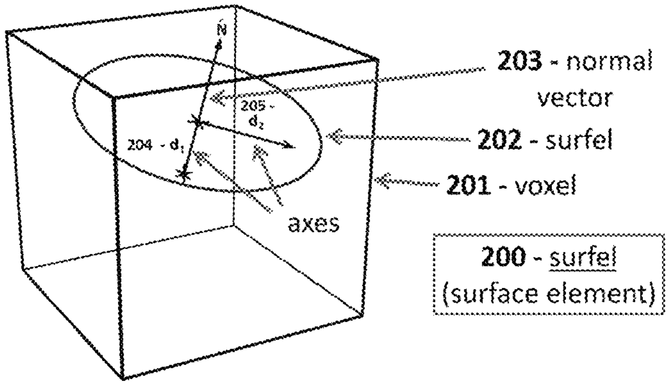
FIGS. 2A and 2B illustrate an example of a surfel and a mogel.
Figure 2B:
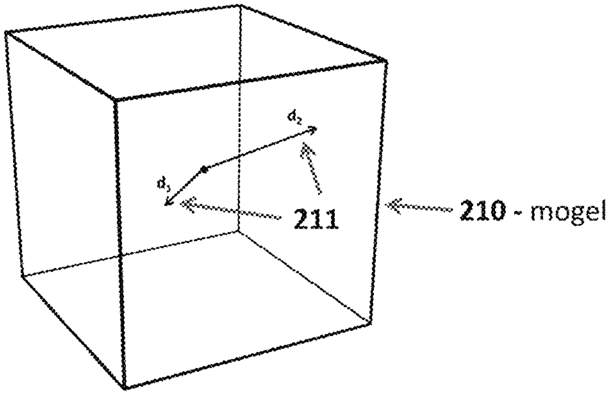

Some mediels may comprise a homogeneous element or "mogel" 210 that represents media that is of uniform composition throughout its bounding voxel. An exemplary mogel 210 is depicted in FIG. 2B, which depicts a coordinate frame with vectors 213 and 214 representing directional information about the contained media. A mogel 210 may be used to define material gradients, such as 3D "textures." A plenoptic element that is heterogeneous, not of uniform composition throughout its bounding voxel, may be referred to as a mixed element or "mixel."

Yet another type of mediel may comprise media sandwiched between one or more other types of media (usually, but not always, homogenous media) within a mediel, or a "sandel." A sandel occurs when, after solving for one or more surfels, the system determines that a mediel contains multiple surfels in an opposing or partially opposing orientation. An example of a sandel is a mediel containing all or a portion of the sides of a pane of glass. In the foregoing example, the surfaces of the glass represent interior surface elements within the sandel and the air on either side of the glass represents homogenous media on each side of the "sandwiched" glass surfels. Sandels may provide opportunities for data, power, or processing savings. For example, use of sandels may permit processing to complete at a coarser degree of mediel size than available with using only other types of mediels. Such savings may be accomplished during reconstruction of the scene by specifying the multiple surfaces within the mediel within a single mediel, rather than subdividing the mediel into separate surfels for each of the surfaces. Sandels may also allow for lower bandwidth, power, or processing during output and/or presentation of a reconstruction of the scene at a similar coarser degree of mediel size. For example, if the thickness of the exemplary glass was 0.25", a cube-shaped sandel sized at 0.5" could represent both the air on one side of the glass, the glass and both surfaces, and the air on the other side of the glass. If the system was instead configured only to use surfels, mogels, and mixels, the system may instead be need to subdivide the mediel at least one additional time, creating at least two additional mediels to represent the surface and homogenous media.

Figure 4:
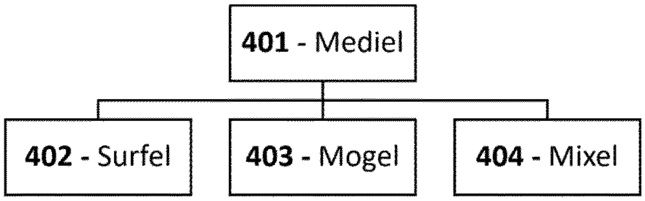
FIG. 4 illustrates an exemplary type hierarchy of a mediel.
Figure 5:
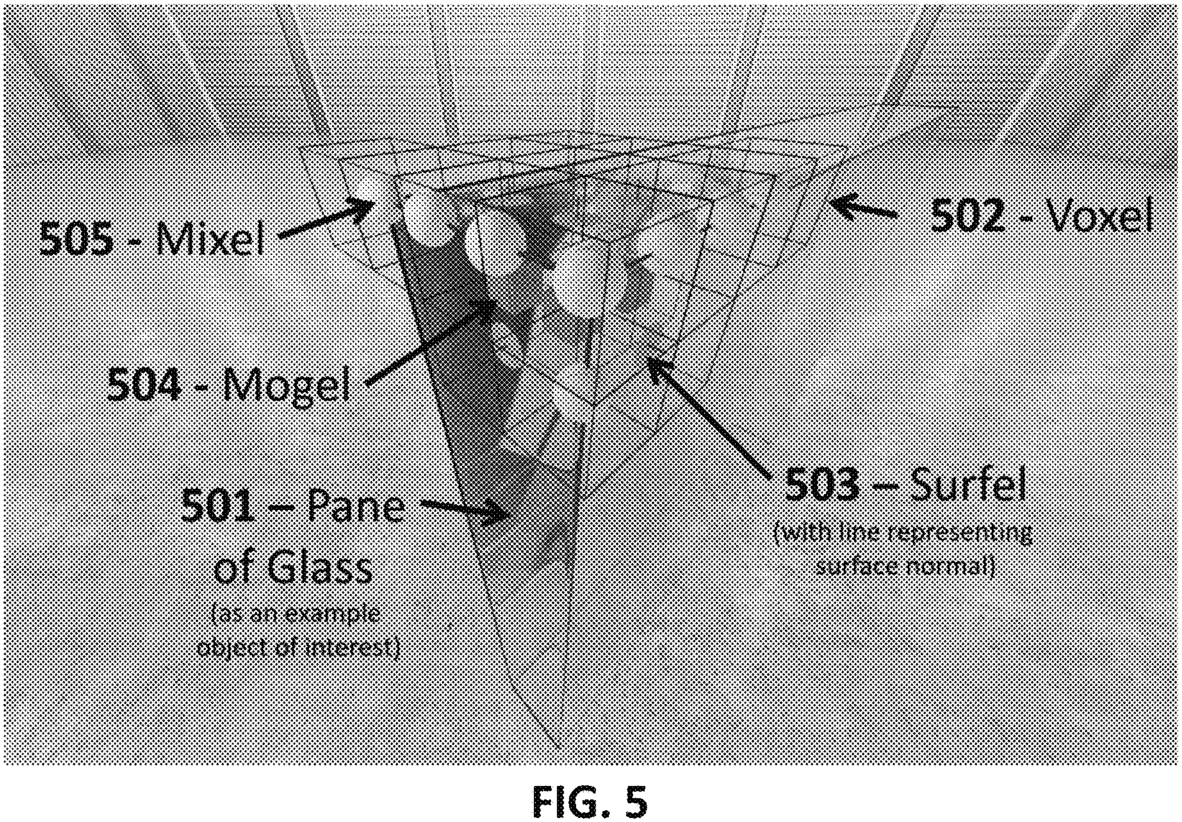
FIG. 5 illustrates an exemplary scene containing various mediels and other elements.

Three types of mediels and an example of their use are illustrated in FIGS. 4 and 5. FIG. 4 depicts a type hierarchy for an exemplary mediel 401, wherein the mediel could comprise a surfel 402, a mogel 403, and a mixel 404. Various embodiments of the invention may include all, any combination of, nor none of the foregoing elements. FIG. 5 depicts an exemplary pane of glass 501 represented by a set of voxels containing mediels 502, depicted as boxes in the figure. For visual clarity, the diagram shows only a small number of primitives in a small number of voxels. In a digital model of a typical real-world scene, primitives would exist densely throughout the scene and would occur at several different level of resolution in the data structure storing information related to the matter field.

As depicted in FIG. 5, a surfel 503 may contain more than one type of matter. In the diagram, the surfel 503 contains both glass and air with one surface separating them; a mogel 504 contains only glass; and a mixel 505 represents a corner of the pane and thus contains multiple surfaces. Mediels, in general, may contain various forms of property information. For example, surfels and mogels may contain BLIF values or other property information that can be used for relighting. In some cases, mixels may contain information to make them relightable.

Figure 10:
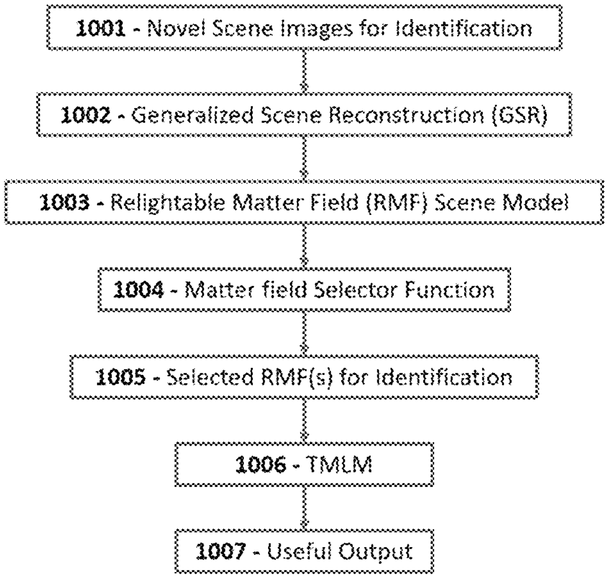
FIG. 10 illustrates an exemplary method for use of a trained machine learning model (TMLM).

Characteristics of a BLIF are described elsewhere, such as with regard to FIG. 10 of U.S. Pat. No. 10,521,952 to Ackerson, et al. A BLIF may characterize an incident light field, emissive light field, a responsive light field, and/or exitant light field. FIG. 10 of U.S. Pat. No. 10,521,952 depicts an exemplary model that may be used to represent the interaction that takes place at a single mediel, the mediel consisting of a voxel and an associated BLIF. Radiels of an incident light field enter the mediel. The BLIF operates on the incident light field and yields a responsive light field exiting the mediel. The total exitant light field is the union of the responsive light field and an (optional) emissive light field. The emissive light field is emitted by the mediel independent of stimulation by incident light.

In some embodiments, the inventions described herein may use non-plenoptic primitives, which may, for example, contain analytical information. Such non-plenoptic primitives may represent elements of a scene other than mediels and radiels, and typically do not contain information related to the interaction between light and matter in the scene. Examples of such non-plenoptic primitives include, but are not limited to computer assisted drawing (CAD) or similar structures representing spheres, cones, or other shapes that may have been fit to local groups of surfels, computer vision or other scale-invariant feature transform (SIFT) style features formed by a pattern of pixels in an image, or other information.

Each of the foregoing elements or parameters may optionally be configured to be expandable to become multiple finer parameters and/or collapsible or combinable to become a single parameter, a smaller set of parameters, and/or a coarser parameter. This configuration is optionally true of all types of elements or parameters, including plenoptic, analytic, sampled, and learned parameters and elements. For example, a voxel and/or sael may be subdivided or multiple voxels and/or saels may be combined. Similarly, an overall diffuse reflectivity may be subdivided to become a polarized diffuse reflectivity and an unpolarized diffuse reflectivity. Another example is where a Phong reflectance model may be expanded to become a set of sampled BLIF coefficients (e.g., ratios) stored in a hierarchical sael data structure of exitant-to-incident radiance ratios for pairs of directional saels. An example is discussed further herein with regard to FIG. 20, where an analytic BLIF may be expanded to become a coarse analytic plus a fine neural network for higher accuracy in predicting an exitant radiance.

Figure 3A:
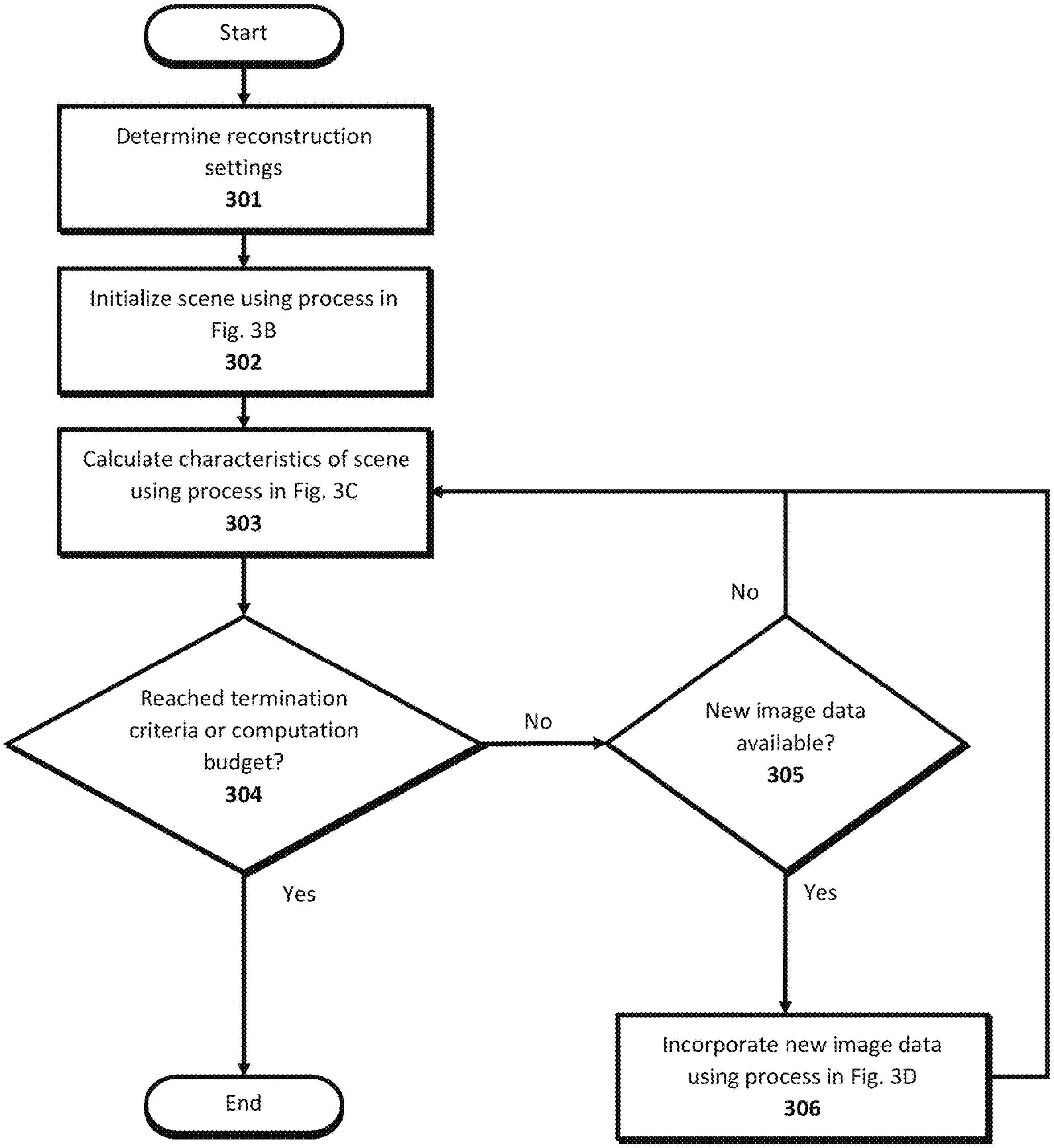
FIGS. 3A-3G illustrate an exemplary method for reconstructing a scene.

With reference to FIG. 3A, some embodiments of the invention are operable to reconstruct a plenoptic field, including using incremental processes, where the plenoptic field may represent an entire scene, a portion of a scene, or a particular object or region of interest in a scene. In some embodiments, the system may first determine settings for the reconstruction of the scene 301. For example, the system may access or set a working resolution, initial size, target accuracy, relightability characteristics, or other characteristics. In some embodiments of the invention, the system may give an initial size to the scene. The size of the scene could be, for example, on the scale of a human living space for an indoor scene, a different size for an outdoor scene, or another size defined by the system, user, or other factor that may be determined to be acceptable or advantageous. In some embodiments, including the exemplary embodiment depicted in FIG. 1B, the first camera 105 or set of image data may define the origin of the scene, and subsequent camera images, either captured by camera 105, a second camera or image sensing device 106, or otherwise, may be added to the scene and processed.

Figure 3B:
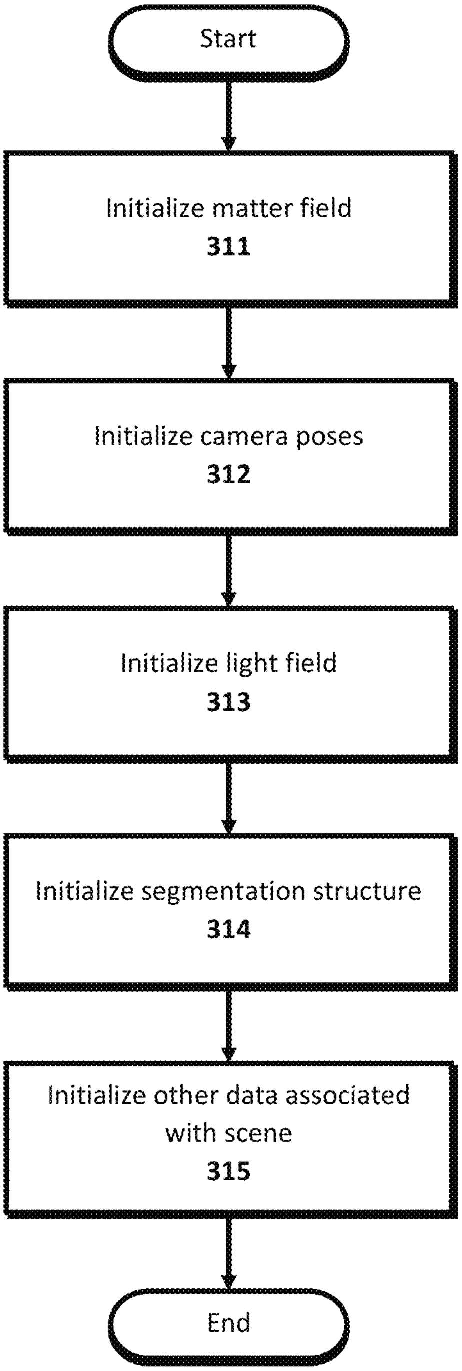

Some embodiments of the invention may then initialize a data structure for storing a scene 302, which may include a plenoptic field in some embodiments and is further described herein with reference to FIG. 3B and elsewhere. Some embodiments of the invention may begin storing data in the data structure at a coarse level of subdivision. Certain embodiments of the invention may store further data related to the scene in a data structure, including in iteratively finer levels of detail. Some embodiments of the invention may also be configured to calculate or refine characteristics of the scene 303, which may include calculating or refining characteristics of a plenoptic field and is further described herein with reference to FIG. 3C and elsewhere. In certain embodiments, the system may be configured to use a termination criteria, computation budget, or other factor to guide reconstruction activities 304. In embodiments with such termination criteria 304 where the criteria is met, the processing may end, and otherwise the system may determine if any new image data is available 305. If new image data is available, the system may be configured to incorporate the new data 306, which is further described herein with reference to FIG. 3D and elsewhere. After incorporating the new image data 306, or if there is no new image data available 305, the system may repeat the process beginning at step 303 until termination.

With reference to FIG. 3B, some embodiments of the system may store a matter field and/or light field related to the scene in a data structure. The data structure may take any number of forms known in the art, including in some embodiments, data structures that are one or more of hierarchical, multi-resolution, and/or spatially-sorted. Exemplary data structures include bounding volume hierarchies, tree structures, binary space portioning, or other structures that can store image data in an accessible manner In some embodiments, the data structure may be configured such that, if the scene is divided into one or more of the plenoptic elements discussed herein. Moreover, the data structure may be configured such that information associated with one aspect of the data structure (e.g., a matter field) may be associated with one or more other aspects of the data structure (e.g., one or more of a camera pose, characteristic of the light field, or a segment).

In some embodiments, particularly where the invention is configured to reconstruct and/or store a matter field, the invention may be configured to initialize the data structure to store a matter field in the scene 311. The initialization of the matter field may include preparing the data structure to store one or more of the size, shape, location, and/or light interaction properties associated with matter in the scene. In embodiments where the matter field is divided into one or more voxels or mediels, the data structure may be configured to store information related to each of the voxels or mediels. In some embodiments, the data structure may be initialized to assume a particular type of media associated with the mediel, which may be some homogenous media (e.g., air, water, fog, turbid water, or other homogenous media). Certain embodiments of the invention may access some a priori information related to the matter field, where such information may include one or more of information describing the geometry the scene or objects therein (e.g., an OBJ file characterizing a room and its contents), values of parameters in a low-dimensional parametric BLIF, values of parameters and/or coefficients in a higher-dimensional sampled BLIF, and/or any combination of geometry (position and/or orientation) and/or BLIF information for part or all of a scene. In embodiments where the invention is not configured to reconstruct and/or store a matter field, these processes may be unnecessary.

Certain embodiments of the invention may also be configured to initialize the data structure to store information related to one or more camera poses 312. In some embodiments, the data structure may store information regarding the postulated or known position of one or more images of the scene, and may be correlated with other aspects of the data structure, such as one or more of the voxels or mediels.

Some embodiments of the invention may also be configured to initialize the data structure to store information related to a light field in the scene 313. The data structure may be configured initially to store information related to both incident and exitant light associated with various points, locations, or voxels in space, including with relation to portions of the data structure related to the matter field. Such information may be represented as one or more radiels associated with each location or voxel/mediel. Certain embodiments of the invention may access some a priori information related to the light field, where such information may include one or more of information describing a quantification of an incident light field at a point in position space (e.g., a panoramic "environment map"); a surface light field quantifying the incident and/or exitant light field in one or more directions at one or more points in position space (e.g., a 4D light field), perhaps at palpable physical surfaces; a surface light field quantifying an isotropic (or nearly isotropic) incident and/or exitant light field at one or more points in position space (e.g., a 2D light field), perhaps at palpable physical surfaces; and/or any combination of incident and/or exitant light field information for part or all of the plenoptic space of a scene.

Embodiments of the invention may also be configured to initialize the data structure to store information related to one or more segments in the scene 314. Segments may represent one or more groups of media in the scene. In some embodiments, segments may represent media that has a specified likelihood of association (e.g., a suitably high confidence of association). For example, if the scene includes a vase with flowers, a segment may represent a leaf or petal of the flower, an entire flower, the vase, the vase containing the flowers, etc.

In some embodiments, the invention may also be configured to initialize the data structure to store other data associated with the scene 315. For example, such data may comprise non-plenoptic information, which may represent, for example, analytical information.

Although the foregoing steps may be performed in any order, certain embodiments of the invention may perform the steps in the order described herein. For example, initializing the data structure to store the matter field first may assist in associating radiels with a more relevant (or the most relevant) home mediel. Similarly, initiating the data structure to store information related to one or more camera poses before initiating the data structure to store information related to the light field may permit initiating radiels with more relevant (or the most relevant) position and/or direction information.

Figure 3C:
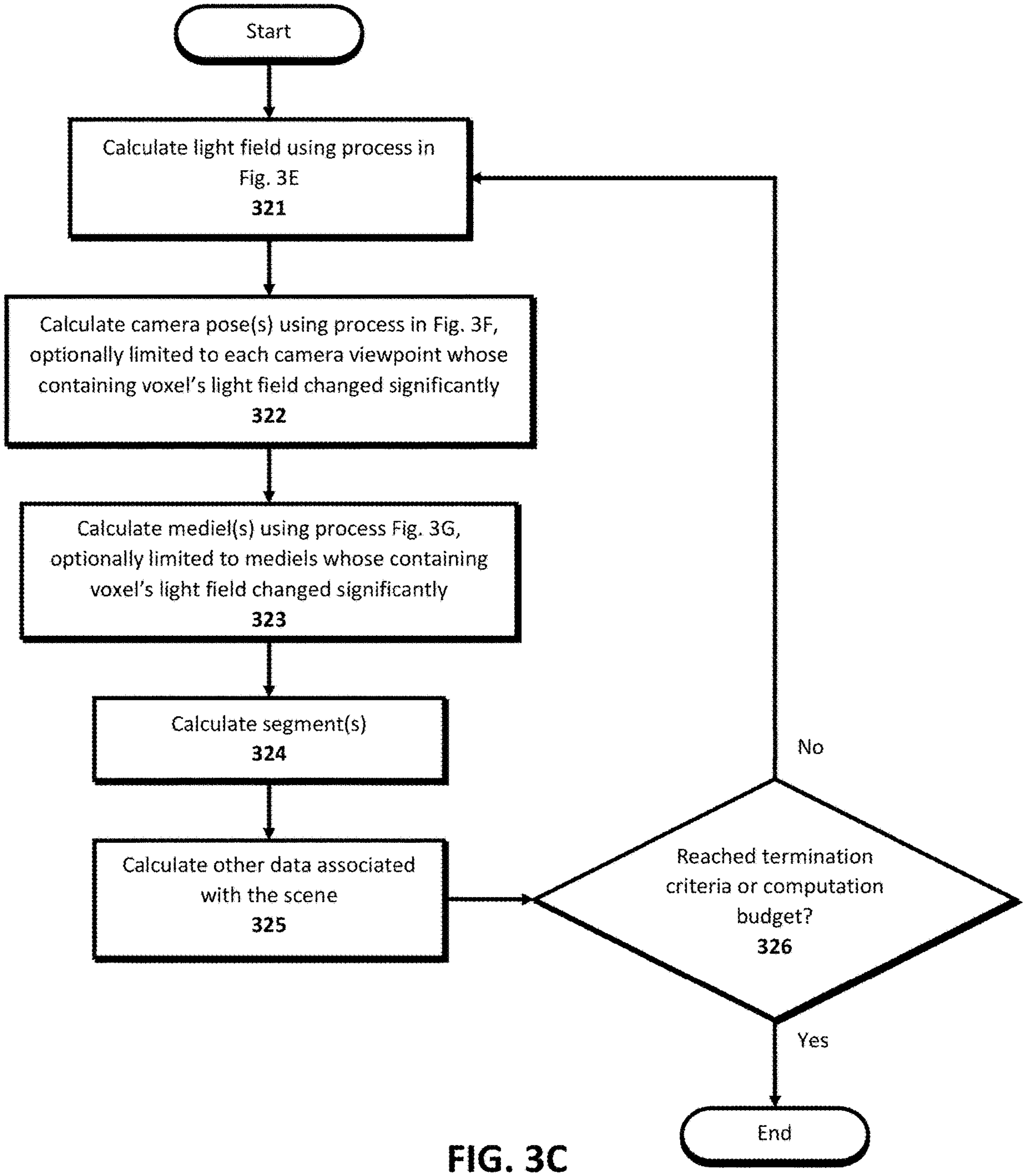

With reference to FIG. 3C, some embodiments of the invention may provide for calculating or refining one or more characteristics of the scene (e.g., a plenoptic field). Certain embodiments of the invention may process camera images or other image data sequentially, in parallel, or some combination of the two. In some embodiments, the system may calculate a light field in the scene 321 based on the image data, which is described with reference to FIG. 3E and elsewhere herein.

The system may calculate or refine information regarding one or more poses associated with image data 322, as described with reference to FIG. 3F and elsewhere. In some embodiments, the system may determine if one or more camera or image data viewpoints' containing voxel's light field has changed 322, which may optionally be determined based on some threshold of significance which could be preset or calculated by the system. This determination may be based, in part, on the system postulating or having other information indicating a camera image or set of image data exists at a voxel 201 in the data structure, as depicted in FIG. 2. In such embodiments, for each postulated position, the system may postulate an orientation in a coarse orientation space.

In some embodiments, particularly where the system is configured to reconstruct and/or store a matter field, the system may be configured to visit and test one or more (or all) mediels whose containing voxel's light field has changed 323. In some embodiments, if the light field associated with the mediel has changed by some amount (including a threshold set in the system or by a user or calculated by the system, the system may be configured to calculated or refine the mediel, which is described with regard to FIG. 3G and elsewhere. In some embodiments, the system may be configured to calculate one or more segments 324 in the scene. Some embodiments of the system may be configured to calculate or refine other data associated with the scene 325, such as non-plenoptic and/or analytic information. In embodiments where the invention is not configured to reconstruct and/or store a matter field, these processes may be unnecessary.

The system may also be configured to include a specific termination criteria, computation budget, or other threshold 326, including with regard to calculating or refining the plenoptic field. In such embodiments, the system may determine if the termination criteria, computation budget, or other threshold has been exceeded as discussed elsewhere herein. If the threshold has not been exceeded, the system may be configured to repeat the process, for example beginning at step 321. If the threshold has been exceeded, the system may complete the process.

Figure 3D:
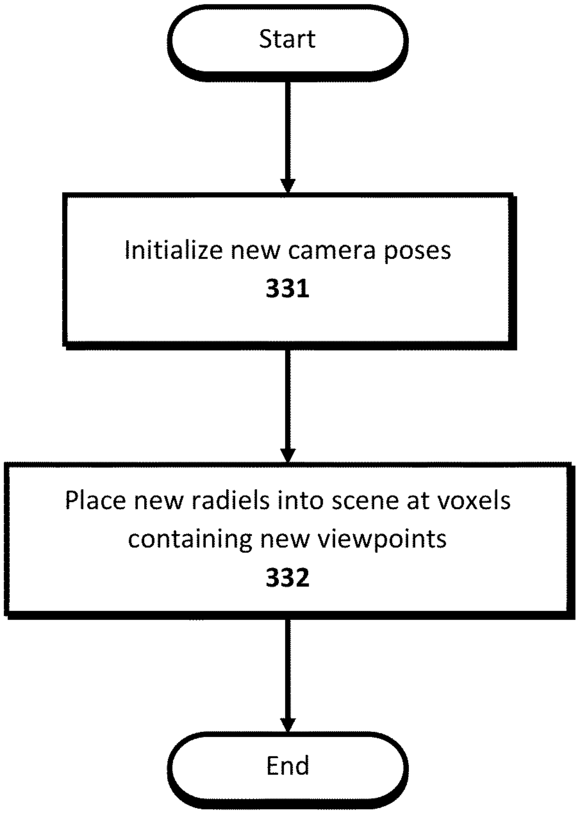
Figure 3E:
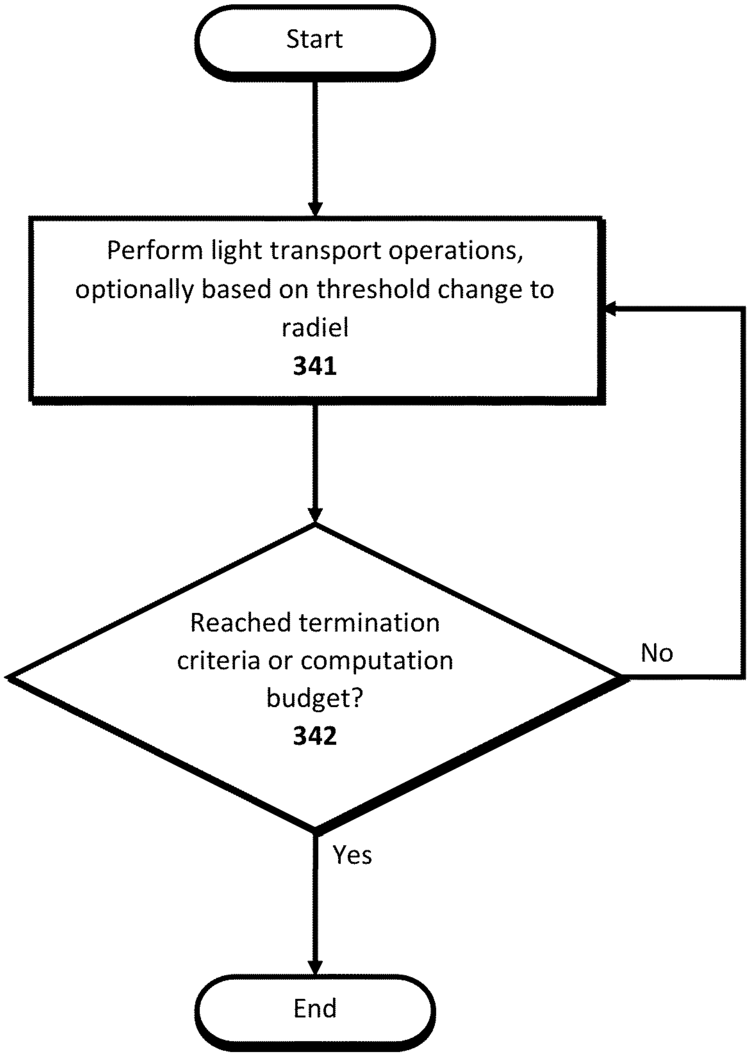

With reference to FIG. 3E, the system may be configured to calculate and/or refine a light field in the scene. Some embodiments of the invention may perform light transport operations 341 to calculate the light field. For example, the system may calculate a propagation of radiance through default media and/or pass incident radiance through a BLIF to yield exitant radiance. The light transport operations may be optionally limited to radiels exceeding a threshold change from a previous state. Light transport operations may be limited or up to a path length. The path length can be automatically determined, for example, by a confidence or change in confidence, and can run in some combination of downstream & upstream directions. Light transport operations may include any combination of downstream (forward in time) radiance propagation through default media, upstream (backward in time) radiance propagation through default media, incident radiance passing through a BLIF to yield exitant radiance (BLIF operation in downstream direction), and/or exitant radiance passing through a BLIF to yield incident radiance (BLIF operation in upstream direction).

For example, light transport may operate in a downstream direction with relation to a surfel of semigloss paint. In such a circumstance, an incident radiel may have an updated, higher-confidence radiance value in at least one of its color wavebands. The higher-confidence radiance value may prompt a downstream (forward-in-time) BLIF interaction that may yield one or more new radiance values in one or more radiels exitant from the surfel. By way of another example, light transport may operate in an upstream direction with relation to a surfel of shiny chrome. In such a circumstance, an exitant radiel may have an updated, higher-confidence value (e.g., a radiance value in at least one of its color wavebands). Such a circumstance could occur upon a new camera viewpoint being added that directly sees the chrome surfel. The new exitant radiance may prompt an upstream (backward-in-time) BLIF interaction that yields new radiance values for one or more radiels incident to the surfel. In other embodiments, light transport may occur in both time directions, such as after providing image data representing a new image at some viewpoint in a room. Pixels of the new image may be resampled into high-confidence incident radiels at a voxel containing the viewpoint. That incident radiance may propagate upstream to alter lower-confidence exitant radiance at surfels in the scene, e.g. on a wall the camera sees in its field of view. In addition, the incident radiance at the camera viewpoint voxel may optionally be calculated to become an antipodal exitant radiance, which may then be propagated downstream to alter lower-confidence incident radiance at surfels in the scene, such as on surfels on a wall behind the camera.

Although light field (radiel) and matter field (mediel) calculation, refinement, and/or updating may be separate steps, this configuration may optionally be modified. In some embodiments, such a structure may lead to undesired avoidance of the globally optimal (deepest) solution in the overall cost function space of the (sub)scene being reconstructed. For example, certain calculations may reach a certain degree of solution accuracy, but no longer approach an optimal solution (e.g., a globally optimal solution). This situation may occur, for example, upon iterating between "light field only" and "matter field only" search directions which in a multidimensional cost function space could avoid optimal parameter step directions where light field and matter field parameters both change simultaneously. An exemplary solution to this problem that is optionally implemented by the system is to use a recognition that the postulated scene model is revisiting the same states in a limit cycle, which could happen at any subscene level within the overall scene. Upon recognizing the presence of a limit cycle, the system may revert to an earlier and/or coarser visited state and proceed after altering one or more controlling parameters of the search, for example, a next region of parameter space to visit, and/or a step size in each or a particular parameter dimension. The system may thereafter follow any known method to escape a limit cycle.

Such operation may optionally use an actual value and/or change in value of a radiance, other radiel characteristic(s), and/or a confidence (consistency) of radiel characteristics to decide when to terminate that sequence of ops. For example, the system may also be configured to include a specific termination criteria, computation budget, or other threshold 342, including with regard to a light transport depth reflecting an iterative and/or recursive set of calculations. In such embodiments, the system may determine if the termination criteria, computation budget, or other threshold has been exceeded as discussed elsewhere herein. If the threshold has not been exceeded, the system may be configured to repeat the process, for example beginning at step 341. If the threshold has been exceeded, the system may complete the process.

Figure 3F:
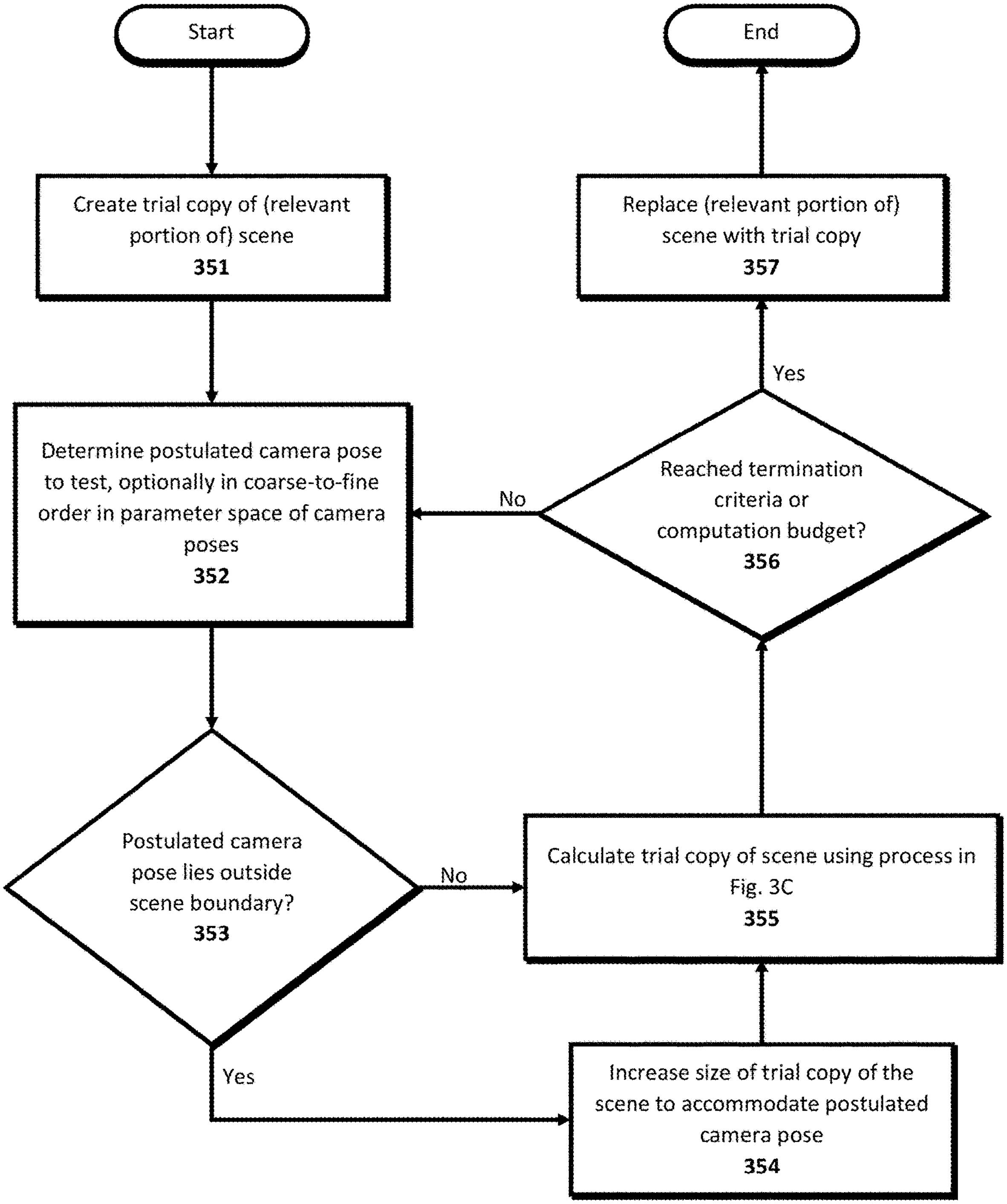

With reference to FIG. 3F, the system may be configured to calculate or refine a camera pose associated with certain image data. In some embodiments, the system may be configured to create a trial copy of the scene or a relevant portion thereof 351. The system may determine a postulated camera pose 352. In some embodiments, the determination of the postulated camera pose may be in a coarse-to-fine order in a parameter space that defines potential camera poses. The system may determine whether the postulated camera pose lies outside the scene boundary 353. If the postulated pose lies outside of the scene boundary, the system may increase the size of the trial copy of the scene to accommodate the postulated camera pose 354.

If the postulated pose lies within the scene boundary, or after the scene boundary has been increased, the system may calculate or refine trial copy of the scene 355, such as by using the process described with reference to FIG. 3C at step 322 and elsewhere. Such calculation may be performed with modest computation budget and/or skip recursive camera pose refinement.

In some embodiments, the accuracy of a camera pose can have an outsize impact on scene accuracy. The system may be configured to represent a camera pose analytically to higher precision than a discrete spatial element containing the camera viewpoint. For example, a camera pose at a given viewpoint may be represented as floating-point rather than by subdividing the viewpoint's containing voxel to many levels finer in a positional hierarchy. Similarly, the orientation of a camera may be represented using a floating-point containing parameter such as yaw, pitch, and roll rather than using a discrete sad data structure to represent those features.

The system may also be configured to include a specific termination criteria, computation budget, or other threshold 356, including with regard to information related to the camera pose. In such embodiments, the system may determine if the termination criteria, computation budget, or other threshold has been exceeded as discussed elsewhere herein. If the threshold has been exceeded, the system may replace the plenoptic field or relevant portion thereof with the trial copy 357, complete the process, or both. If the threshold has not been exceeded, the system may be configured to repeat the process, for example beginning at step 352.

In some embodiments, the system may perform calculations to determine if there is measurable parallax. A measurable parallax calculation may be calculated based on a change in received light, and may further depend on camera or image data resolution and positional separation between viewpoints. In some embodiments, the preceding two quantities can set a practical parallax boundary distance in different directions outward from the camera/image data workspace or envelope of camera viewpoints. The parallax boundary is often directional, meaning the boundary may be a different distance in different directions depending on the shape of the camera/image data workspace. For example, a wide separation between viewpoints in a given direction may push the parallax boundary further outward in the plane of directions perpendicular to that viewpoint separation vector.

In some embodiments, the system may use a parallax boundary to set a size of the scene (e.g., the scene's outer boundary). In some embodiments, the parallax boundary may be a bounding voxel that circumscribes an envelope of directional parallax boundary distances. In some embodiments, the camera/image data workspace may grow and push the parallax boundary outward, for example, as new image data is accessed. The system may increase the size of the scene and/or an associated plenoptic field in response to extensions of the parallax boundary.

In some embodiments, the system may represent scene information beyond the parallax boundary in a two dimensional nature. For example, such information may be represented as a two dimensional map and/or multiresolution grid of quantities. As an illustration, the night sky may be represented as a two-dimensional light field. An airplane flying high above the ground could also exist in a two-dimensional layer beyond parallax boundary, depending on the size of the scene. Information beyond the parallax boundary need not contain only light, but could also have other associated properties. For example, in the instance of the night sky, the moon could be represented as moon dust in a two-dimensional matter field with an associated BLIF. Moreover, any number of layers may be stacked in some order based on a known distance or other precedence. In some embodiments, light field and/or matter field information or data in such layers can be temporally dynamic in the same manner that information within the parallax boundary is temporally dynamic.

Figure 3G:
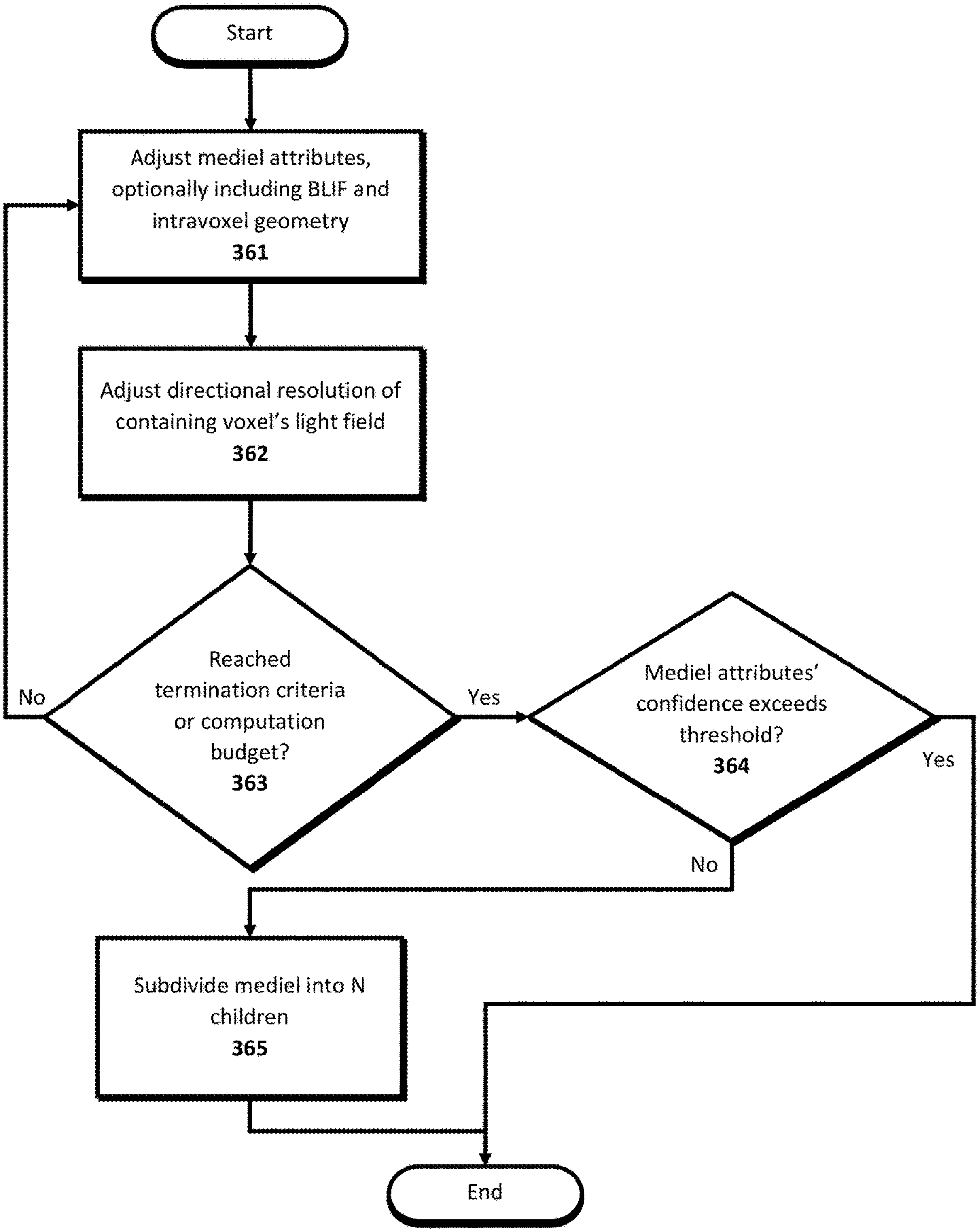

With regard to FIG. 3G, the system may be configured to calculate attributes of one or more mediels. The system may first use image data to calculate mediel attributes 361. In some embodiments, the system may be configured to calculate mediel attributes such that adjustments are done in the direction of raising an overall confidence metric calculated on the mediel (e.g., associated radiels with lower current confidence may be updated by higher-confidence radiels). For example, an overall confidence metric for a mediel may be calculated by taking a newly predicted exitant radiance in one or a plurality of directions of interest (e.g., toward direct camera viewpoints), subtract pre-existing reference and/or observed exitant radiance from the predicted radiance, and calculating some variation of an average over the predicted-minus-reference radiance deviation to yield a scalar cost and/or error. In such an embodiment, the confidence may be considered some inverse of cost (e.g., 1−cost or 1/cost).

In some embodiments, the system may postulate or otherwise determine that a surface exists within the mediel. Mediels containing a surface may be referred to as a surface element or surfel. In such embodiments, the system may be configured to search for geometric parameters associated with the surface. For example, the system may calculate a surface normal vector, a BLIF, or other dimensions or parameters associated with the surfel.

In embodiments where the system tests a voxel in the data structure for being a surfel, the system may calculate the exitant light at the voxel from the one or more of cameras 105 and 106 or other image data that contain the voxel in the field of view captured by the cameras or represented in the data. In some embodiments, each camera may observe the voxel or each set of image data may represent the voxel from a different angle and may observe a certain radiance coming out of that location in space in a specific direction. The system may use one or more of these observations to determine an observed exitant light field for that location in space, or voxel. Similarly, the system may calculate an incident light field at a location in space, or voxel, from one or more of the cameras or sets of image data that observe light that travels into that point in space, or voxel.

In some embodiments, the system may be configured to calculate properties associated with the light field of a mediel, such as a directional resolution of the containing voxel's light field 362. For example, if the directional resolution of the containing voxel's light field is calculated and/or adjusted, the system may split and/or merge radiels associated with the voxel or neighboring voxels. Certain embodiments of the invention may also adaptively sample the light field associated with a mediel. For example, the system may use one or more sets of data, such as a postulated BLIF, exitant direction of interest (e.g., camera viewpoint), or other data associated with a mediel under test, to adaptively sample the incident plenoptic light field at the mediel. Some embodiments of the invention may perform such calculations based on a target for the exitant plenoptic light field confidence (e.g., based on the observed light present at the mediel) or a computing budget (e.g., maximum number of radiometric elements (or radiels) that may be associated with a mediel). In some embodiments, the system may be configured to use spherical harmonics to represent a directional resolution. For example, in an embodiment where the system is characterizing the light field associated with a glossy paint surfel, such a surfel may have highly specular behavior in the real scene. In early processing, a search of candidate BLIF properties may indicate the surfel is likely to be more specular than diffuse. The system may then be configured to instantiate higher-order spherical harmonic coefficients to produce a tighter specular lobe in directions of high incident radiance coming from other scene regions. The spherical harmonic may be defined in a coordinate frame that rotates with the postulated normal vector. With materials with a granular appearance (e.g., brushed metal), the system could be configured with a material grain tangent vector associated with an anisotropic BLIF.

Some embodiments of the invention may postulate that a surface exists within one or more mediels, as depicted in FIG. 2. By postulating that a surface exists within a voxel, the system may further postulate particular surface normal 203, a displacement of the surface within the mediel, and/or light interaction properties of the surface. The system may then calculate a set of predicted exitant radiance vectors, including based upon the postulated surface normal and/or light interaction properties, which may include one or more of a refractive index, a roughness, a polarized diffuse coefficient, an unpolarized diffuse coefficient, and/or an extinction coefficient, the latter of which may be particularly applicable to metallic materials. In some embodiments, the system may be configured to search one or more of the foregoing properties in a serial manner (e.g., by following a "waterfall" of testing based on most- to least-likely of correctness based on the applicable image data).

Some embodiments of the invention may calculate a "cost" for the existence of a surface. The cost for the existence of a surface with calculated properties may be represented in some embodiments as a difference between the predicted or calculated (i) surface normal, (ii) light interaction values, (iii) exitant radiance vectors, and/or (iv) other properties and corresponding observed values. In some embodiments, the system may have a specified or specifiable cost threshold, where a surfel is accepted as existing at a voxel when the cost is below the threshold. In such embodiments, when a voxel is determined to be matter and/or contain a surface, the surface may remain in the scene for subsequent iterations. In some embodiments, surface normal may be searched in a hierarchical manner matching the data structure storing the saels or radiels. In the case of a cube-shaped voxel, the system may perform calculations for each of the six faces. In addition, the system may be configured to divide the voxel into eight cube-shaped sub-voxels, creating a need to calculate surface normal for a total of 24 externally-facing faces, and 96 overall subradiels. For each direction, the system may be configured to calculate predicted exitant radiance vectors and the associated surface normal and/or light interaction properties. Such processing may be accomplished in a number of manners, including in a highly-parallelized or multi-threaded manner, using a GPU, AI, and/or ML, binary tree hierarchy, or other configuration to accelerate processing. In some embodiments, the system may determine a most likely, lowest cost, highest confidence, or other parent set of postulations and use those postulations as a starting point for the processing upon subdivision.

In some embodiments, the solving for the light field at a voxel 201 and/or the existence of a surface may use the calculated light field for one or more other voxels to calculated the postulated incident light to, exitant light from, and/or other radiance properties of voxel 201. Such calculations may be in addition to or calculated with the incident light field represented by a camera image or other set of image data. Thus, certain embodiments of the invention may update a postulation of the light field of one or more voxels 201 by using a projected one or more radiometric elements, or radiels, emitted from one or more other voxels by tracing the radiel(s)' impact through the scene and/or the radiel(s)' interaction with media in other voxels.

In some embodiments, the system may first compute a light field associated with a scene and provide information regarding the light field to inform the processing to detect the presence of a surfel. Upon computing the presence of media in the scene represented by the surfel, the system may use that presence as a factor in recomputing a light field associated with the scene. This process may be performed in any order, and may be performed iteratively to increase confidence or decrease a cost associated with the light and/or matter fields in the scene. In some embodiments, the system may perform this process before subdividing a mediel into multiple submediels. The system may further be configured upon subdivision of a mediel to perform similar testing of a light and/or matter field, which may be based in part on the parent mediel, and then perform the same processing as described above with regard to the parent.

In some embodiments, the foregoing processes may be continued until the system achieves some specific termination criteria, computation budget, or other threshold 363, including a light and/or matter field associated with the mediel. In such embodiments, the system may determine if the termination criteria, computation budget, or other threshold has been exceeded as discussed elsewhere herein. If the threshold has not been exceeded, the system may be configured to repeat the process iteratively and/or recursively, for example beginning at step 361. If the threshold has been exceeded, the system may determine if one or more mediel attributes have exceeded a confidence threshold 364. If the confidence threshold has been exceeded, the system may complete the process. If the confidence threshold has not been completed, the system may optionally subdivide the mediel into N children 365 as described below, except if a resolution budget or limitation has been reached.

Some embodiments of the invention may then use a confidence threshold or other metric to guide processing, and calculate an associated confidence or other metric associated with each mediel or other volumetric element within the scene. If a confidence threshold is used, the system may examine one or more mediels where the confidence is below the confidence threshold. In some embodiments, if the confidence is below the threshold, the system may then compare the characteristics of the mediel with various known light interaction characteristics, such as a bidirectional light interaction function (or BLIF) associated with different types of media. For example, in the example depicted in FIG. 14A, if the confidence threshold is 75, the system may be configured to perform further calculations on each of the four depicted mogels 1403 because the associated confidence is below 75. Some embodiments may use a waterfall, or sequential, order of comparison based upon what the system has calculated to be the most likely candidate characteristics for the particular mediel (e.g., most likely candidate BLIF). For example, for a particular mediel, the system may first test the mediel for containing air, then a general dielectric media, then a general metallic media, and so on.

Figure 14A:
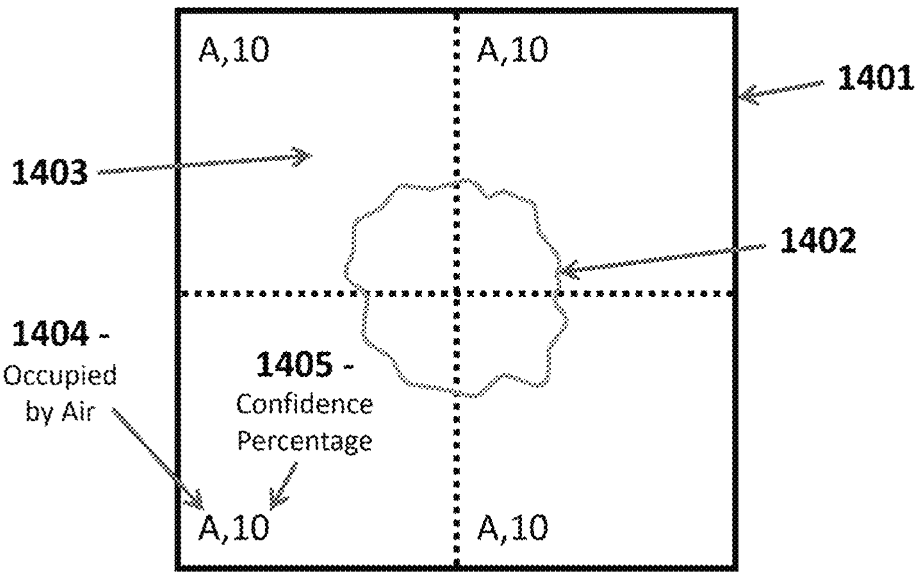
FIGS. 14A-14C illustrate an exemplary process for determining the presence and interaction of media within an area of a scene.

In some embodiments, such as depicted in FIG. 14A, a scene of interest may contain both homogenous transmissive media and opaque media. In embodiments where the region of interest includes empty space (e.g., air or otherwise homogenous space not containing media substantially interacting with light), the system may specify within the data structure that the scene is comprised of mediels comprising empty space (e.g., air). Empty mediels or mediels comprising air and other homogenous elements may be referred to as mogels. In some embodiments, even if a mediel 1401 contains an opaque surface 1402, the system may initially stipulate that the mediel 1401 is comprised of one or more mogels 1403 comprising empty space or air (or air mogel), with such initialization would allow the system to let light flow through the mediel 1401 and mogels 1403 rather than being postulated to be blocked by interacting media, such as 1402. Some embodiments of the invention may specify a low confidence 1405 associated with each of the air mogels, which can facilitate the system later determining the presence of other media within each air mogel. In FIG. 14A, the postulated contents 1404 and confidence 1405 are depicted, with contents "A" 1404 representing an initial postulation of the mogel 1403 containing air and confidence "10" 1405 representing a hypothetical confidence value associated with that postulation.

The system may determine the confidence (or cost) associated with a particular mediel in a number of manners. For example, for a mediel postulated to be empty or air, the system may anticipate that the difference between the radiels entering a the mediel should substantially equal the radiels exiting the mediel in an antipodal direction. Likewise, if the mediel is a surfel, the system may anticipate a particular relationship between an incident light field to the mediel and the exitant light field from the mediel based on the particular media characteristics comprising the surfel. The system may therefore be configured to determine a confidence associated with a particular mediel by calculating an error between anticipated and actual differences in incident and exitant light (e.g., antipodal errors of radiels for a mogel assumed to be air, or air mogel).

In some embodiments, the invention may make use of a machine learning (ML) and/or artificial intelligence component, as described elsewhere herein, to assist in determining the confidence (or cost) associated with radiel differences. For the example of an air mogel, the AI/ML model may be configured to determine the confidence in or cost of the mediel being an air mogel by comparing calculated results to antipodal radiel differences. In various embodiments, the AI/ML model may be configured to compare an average, median, minimum, maximum, and/or other difference between various calculated radiels. In some embodiments, the AI/ML model may be configured to throw out a selected or variable number or percentage of radiels (e.g., a particular percentage of the most inconsistent radiels) in performing confidence or cost determinations.

Some embodiments of the invention may perform the foregoing calculations in an iterative and/or recursive manner. For example, in some embodiments, the system may calculate scene data as described herein for a particular camera pose or set of image data, including discovery of any surfels 202 therein. Thereafter, the system may process subsequent camera images or sets of image data in a similar fashion. In a case where such iterative processing results in the discovery of more surfels 202 in the scene, the system can more accurately determine subsequent camera poses and/or orientations of sets of image data. Some embodiments of the invention may also update information relating to one or more previously-determined camera poses and/or orientations of sets of image data to fit the new observations better. In some embodiments, the camera data structure may be traversed hierarchically from a coarse level to a finer level as new camera images are positioned and/or image data from alternative viewpoints is accessed, and existing camera image positions and/or orientations of sets of image data are updated. As more camera images and/or sets of image data become available, the system may resolve the matter field present in the scene to finer levels of detail. In some embodiments, the invention may store such finer levels of detail in the matter field data structure, including by subdividing the matter field data structure. The outcome in certain embodiments of the invention is a set of camera images, camera poses, other image data, and/or information related to the orientation of any of the foregoing; a matter field calculated by the system; and a light field associated therewith. The foregoing outcome may preferably be the data that best explains the given images through light transport calculations and may be referred to as a reconstructed scene.

Figure 14B:
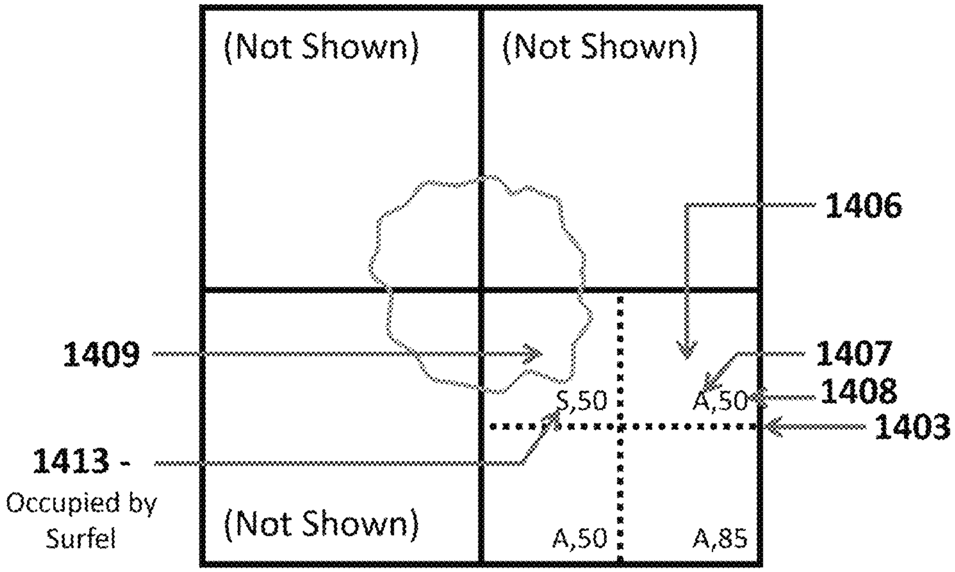

In some embodiments, the invention may perform the foregoing calculations for other mediels (or all mediels) within the region or scene of interest. The system may then compare the results for one or more of the mediels to the confidence threshold or other metric, for example based on predicted radiometric characteristic minus observed characteristics associated with exitant radiels of the mediel. For mediels where the confidence threshold or other metric is not achieved, the system may be configured to perform further processing related to such mediels. For example, FIG. 14B depicts a circumstances where the system has determined the bottom right mogel 1403 of mediel 1401 did not meet the appropriate threshold. In some embodiments, the system may subdivide such mediels not meeting the threshold or other metric into two or more child mediels, such as dividing a cube-shaped mediel into eight child cube-shaped mediels. In FIG. 14B, the system has subdivided mogel 1403 into four sub-mediels 1406, each of which having an associated content postulation 1407 and confidence 1408. In the embodiment depicted in FIG. 14B, the system has now postulated sub-mediel 1409 to contain a surface, as denoted at 1413, for example, an opaque dielectric surface that may be represented by a surfel, denoted by "S" with a confidence of 50. The remaining sub mediels remain postulated as containing air with varying degrees of confidence.

Figure 14C:
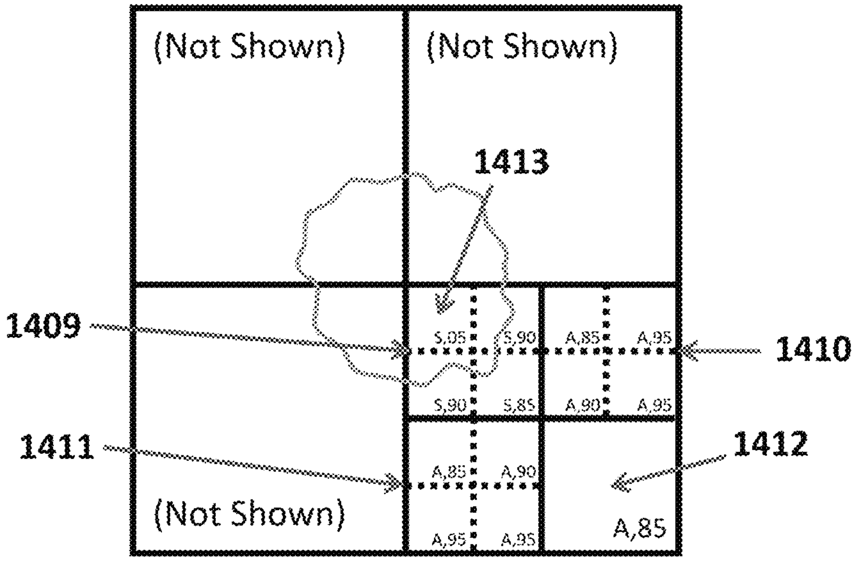

Upon such subdivision, the system may be configured to perform the foregoing processing to determine the BLIF or other characteristics associated with the region or scene of interest until reaching the confidence threshold, other metric, or a maximum computing threshold is reached. In some embodiments, the system may determine that the confidence level of a mediel is not changing substantially upon subdivision. In such cases, the system may be configured to determine a local minimum threshold, e.g., based on an asymptotic determination that may be determined in a traditional cost function minimization problem. For example with reference to FIG. 14C in a hypothetical circumstance where the confidence threshold was set to 75, the system has further subdivided submediels 1409, 1410, and 1411 because those submediels did not exceed the threshold, but did not further subdivide mediel 1412 because the confidence exceeded the threshold. Upon completion of processing depicted in FIG. 14C, all submediels have met the associated threshold, except for submediel 1413. Specifically, all submediels within submediels 1410, 1411, and 1412 have exceeded the confidence threshold as air. All submediels within submediel 1409 have exceeded the threshold as containing a surface, except that the system has determined that it cannot further resolve submediel 1413 because the matter within submediel 1413 is completely occluded by the remaining submediels within submediel 1409.

In some embodiments, the system may be configured to postulate a higher degree of confidence or lower cost for a particular mediel based on a confidence or cost associated with a neighboring mediel. For example, the system may be configured to postulate a higher degree of confidence or lower cost associated with the presence of a surface within a mediel if a neighboring mediel contains a surface, an even higher confidence or lower cost if two neighboring mediels contain a surface, etc. Similar postulations may be made for other types of media (e.g., a mogel comprising a particular type of media in a neighboring mediel or one or more empty or air mediels neighboring the mediel in question).

With reference to FIG. 3D, the system may be configured to incorporate new image data. In some embodiments, the system may initialize one or more new camera poses 331, which may be accomplished, for example, as described with reference to FIGS. 3B and 3F. Some embodiments of the invention may then place one or more new radiels into the scene at voxels containing one or more new viewpoints 332.

Some embodiments of the invention may select the position and orientation providing the lowest total cost for postulated surfels the best pose for the incoming camera at this iteration of the algorithm. For example, the system may assign a level of confidence (or conversely, a cost associated with a lack of confidence) to a particular position or orientation. Such level of confidence may optionally be associated with the presence or absence of a surface, a radiometric characteristic such as an incident or exitant light field, or another characteristic at the position or orientation. The system may determine the confidence or cost based on a number of factors, some of which include the proximity or lack thereof of a position to the orientation of a camera pose, consistency of the observation with data from other camera poses, or other information. By way of example, in an embodiment where the information is a radiel associated with a position in space, the assigned confidence may be higher, or the assigned cost may be lower, for positions directly associated with an observation from a camera. Similarly, the assigned confidence may be lower, or the assigned cost may be higher, for positions located less proximate to the position observed by a camera or depicted in image data. Some embodiments of the invention may use the confidence or cost as a weighting factor. In such a way, the system may be able to determine the positions, orientations, or other information in a scene where there is high consistency and/or low cost, low consistency and high cost, or somewhere in between.

In some embodiments, the results of the foregoing processing may result in one or more localized regions within the data structure storing information related to the matter and/or light field may be subdivided to much finer or deeper resolution. Such fine subdivision may be triggered by localized contrast, such as a sharp change and/or gradient in voxel occupancy, mediel type, BLIF, geometry, or other characteristic. A localized region of finer and/or deeper resolution can occur in the matter field (for example, at a particular position, voxel, location in the data structure) and/or in the light field (for example, in a particular direction, sad, location in the data structure). By way of example, such a localized region may happen in the matter field in the middle of a large solid-color wall where a small dot may be represented by finely subdivided surfels. As a second example, such a localized region may happen in the light field where direct sunlight is represented by finely subdivided radiels in the light field incident at a surfel of shiny chrome. After reflecting off the chrome surfel, the resulting exitant light field may have finely subdivided surfels in the mirror-bounce direction relative to the incident sunlight.

In some embodiments, a localized region (e.g., a subscene) may exist where extra computational energy may be applied in order to reconstruct certain scene characteristics to higher accuracy than in the rest of the scene. For example, the system may be applied to reconstruct an entire room, but there may be a single object of particular interest in the room. Extra computational energy may be applied to the object of interest. Some embodiments of the invention may apply extra computational energy in regions that are the same or similar to the areas where the data structure is subdivided into much finer and/or deeper resolution. For example, in the case of the solid-color wall with a small dot, it may be advantageous to reconstruct the position of wall surfels to 1 mm accuracy in the direction perpendicular to the wall, but the wall surface may have a homogeneous BLIF and may be represented as surfels 10 cm across.

Those of skill in the art will recognize that the processes described herein may be used in conjunction with, as part of, or to enhance various scene reconstruction techniques known in the art. For example, various methods for performing scene reconstruction are taught in U.S. Pat. No. 10,521,952 to Ackerson, et al. The processes described herein, for example with regard to FIGS. 3A-3G and 14A-14C, may incorporated, in whole or in part, at various points of the processes described in U.S. Pat. No. 10,521,952, including as part of the processes discussed with regard to FIG. 3 thereof (e.g., at steps 309, 311, and/or 313), FIG. 14 thereof (e.g., at step 1403), FIG. 16 thereof (e.g., at step 1609), FIG. 18A thereof (e.g., at steps 1811, 1813, 1815, and/or 1819), FIG. 18B thereof (e.g., with regard to step 1819), and FIG. 18D thereof (e.g., at step 1880). Some embodiments of the inventions described herein are thus intended to be fully compatible with the processes taught in U.S. Pat. No. 10,521,952 and other scene reconstruction techniques.

Figure 21:
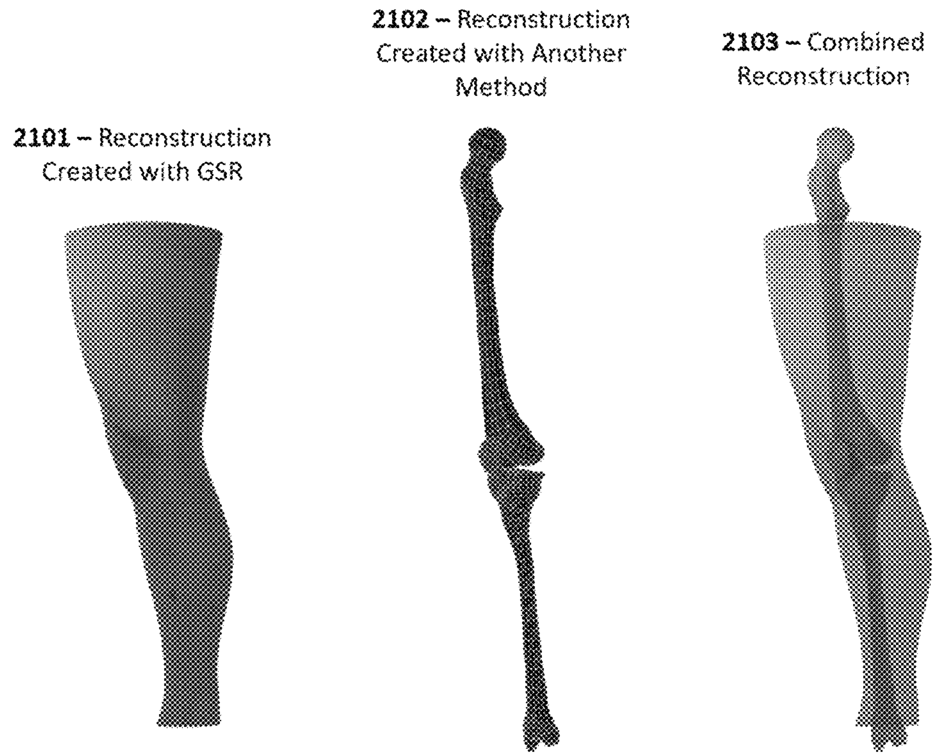
FIG. 21 is an illustration of a combination of a reconstruction performed with the methods described herein and a reconstruction created with another method.

In addition, in some embodiments of this invention, reconstructions of the opaque external structures of an object or scene could be combined with reconstructions of the internal structures of the same object or scene (including internal reconstructions created with a different method, such as X-ray imaging or MRI scanning), such as shown in FIG. 21. Internal structures could be nested within external structures to form a more complete model of the object or scene. In some embodiments, if the method used to reconstruct the internal structures lacks BLIF information, BLIF information could be automatically generated using a method such as machine learning based on the BLIFs of the external structures.

Certain embodiments of the invention may be used to represent tubular structures, 3D corners, or other surfaces. In some embodiments, surfaces may be determined to be curved, based on a priori knowledge, or a posteriori segment (regional) data, each of which may optionally be represented by a surfel. In some embodiments, surfels may have maps aligned to a tangent vector. Such maps may optionally represent various properties, e.g., roughness (bump maps), color (texture maps), material, and/or other properties of the surface. In some embodiments, the material gradient along the normal can be a step function, or can be more complex (e.g., a “frizzy” surface or a multi-layer surface, like a clear-coated automobile), or otherwise represented.

Figure 6:
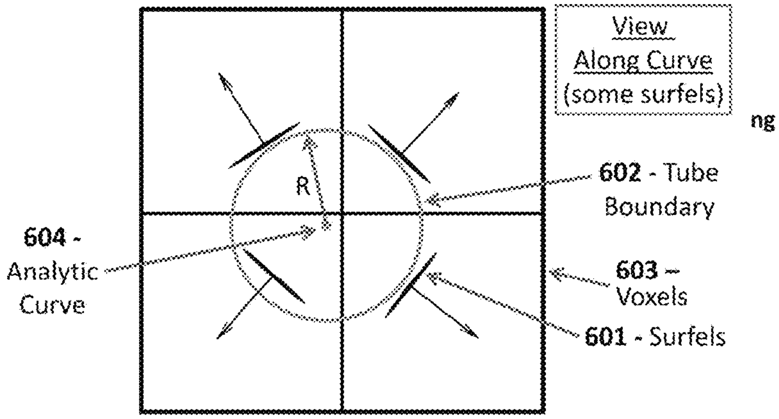
FIG. 6 illustrates an end view of surfels representing a curve.
Figure 7:
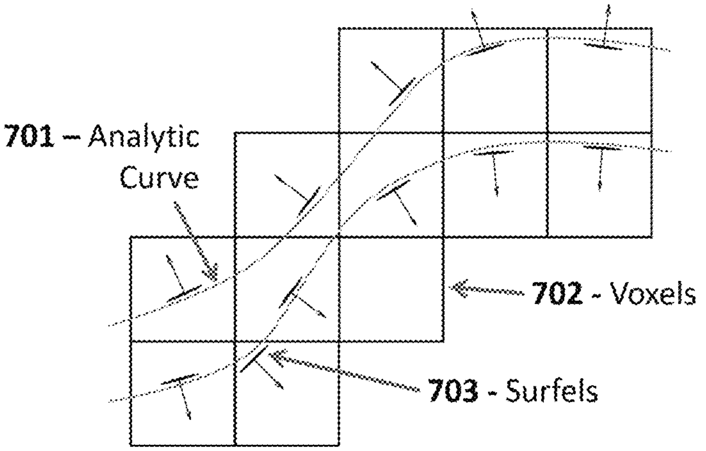
FIG. 7 illustrates a side view of surfels representing a curve.
Figure 8:
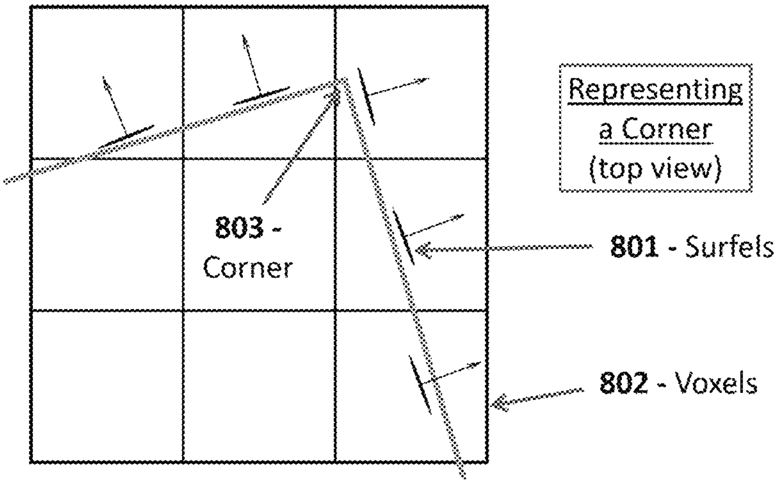
FIG. 8 illustrates surfels representing a corner.

FIG. 6 and FIG. 7 exemplarily depict a solid tube-like structure (e.g., a tree branch) represented using surfels. As depicted in FIG. 6, which shows a view along a curve with some surfels 601, the surfels 601 within voxel 603 are shown as planes but are stored as normal and tangent vectors. The boundary of the tube 602 can be represented by an analytic curve 604. FIG. 7 depicts a side view of an analytic curve 701 of curved object with representative surfels 703 depicted in voxels 702. In such a manner, the surfels may be recognized as planes, but not necessarily as planes. FIG. 8 exemplarily depicts the use of surfels 801 within voxels 802 to represent a corner 803. A corner 803 may be a single, point-like feature, which may be typical of analytic features that can be discovered during a bundle initialization process.

Some embodiments of the invention may retain data relating to a surfel or mediel in an order of priority designed to optimize performance of the system. For example, certain embodiments of the invention may retain information in descending priority order of images or other digital imaging information, point-like features and/or features of orientation, media primitives, exitant and incident light fields (which themselves may be exact in observed directions, interpolated, or only interpolated in non-observed direction), and geometry, bump maps, and textures. Other embodiments of the invention may use alternative orders of priority, omit one or more categories of the foregoing information, and/or include one or more other categories of information. In some embodiments, the present invention may retain all the foregoing information, may discard higher-level information if lower-level information is available or explainable, or some combination of the two.

In certain embodiments of the invention, the system may be able to capture, receive, process, use, and/or represent certain analytic primitives within a scene. Analytics primitives may optionally include one or more of the following types of data, or other types of information obtained from or provided about a scene: points, vectors, lines, planes, spheres, rectangles, parallelepipeds, meshes, other CAD-like models or features, including constructive solid geometry (CSG) and/or boundary representation (B-rep), and/or other information.

In the context of generalized scene reconstruction, plenoptic information and analytical information may be processed independently, together, or some combination of the two. In some embodiments of the invention, plenoptic information and analytical information may be processed in a common workspace, preferably in an “on-demand” fashion to achieve reconstruction of the scene or another goal. The present invention includes manners for examining, processing, storing and using such information, including, for example, spatial elements, data structures, and related processing functions. In some embodiments, some of the spatial, plenoptic, and other processing operations may be selectively performed with improved efficiency using parallel computing elements, specialized processors, and the like, including in arrays of the foregoing. An example of such improved efficiency is the transport of light field radiance values between mediels in a scene. For example, the system may process an incident and/or exitant radiel using a group of FPGA cores, CPUs, CPU cores, or using hardware acceleration (HWA) by one or more graphics processing units (GPU), neural processing units (NPU), tensor processing units (TPU), and/or other specialized processing units, including with such HWA managed by one or more CPUs or other computing devices. When processing many mediels and/or incident radiels, the FPGA-based example embodiment can run the light transport computations for tens, hundreds, thousands, or more of radiels in parallel. In some embodiments, if a scene is divided into segments or subscenes, the system may provide for parallel processing of radiels, mediels, or groups thereof within each of one or more subscenes.

In certain embodiments, the present invention may use segments or subscenes, which may comprise sets of one or more plenoptic elements, each of which may contain one or more associated mediels and radiels. Segments can have subsegments, which may comprise a subset of the one or more plenoptic elements in a segment, and super-segments, which may comprise one or more plenoptic elements from one or more segments.

Certain scenes may comprise one or more objects, which, in some embodiments, represent one or more segments characterized by a human or computer is a material thing present in a scene (e.g., a basketball, bird, or person). Although a grass lawn or even a blade of grass may not be colloquially referred to as an object, such matter may be represented as a segment and referred to as such, or as an object in the context of some embodiments of the invention.

In certain embodiments, generalized scene reconstruction may be implemented as a non-parametric process. In some embodiments, non-parametric modeling denotes that the modeling of a structure of segments is not completely predetermined. Rather, in such embodiments, at least some of the parametric information used to represent the segments is derived from sensed data itself.

Some embodiments of the invention may use plenoptic elements that are spatially sorted, hierarchical and/or multi-resolution, or any combination of the foregoing. In some embodiments of the invention, localized curvature constraints, for example b-splines, may be used to regularize surfels, or surface elements, in one or more segments, subsegments, or super-segments. Such a process may be used a priori to specify or a posteriori to discover where discontinuous derivatives exist within a scene.

Some embodiments of the invention permit distinguishing between different segments or collections of segments (super-segments), which, in some embodiments, may represent different objects, materials, or other characteristics of a scene. In some embodiments, such distinguishing may use, at least in part, certain information attached to plenoptic elements, collectively referred to as properties and which may be represented in one or more nodes or areas within a data structure. Such information may include, but is not limited to, characteristics such as color, normal, gradient, or tangent vectors, material, the associated bi-directional light interaction function, density, transparency, radiance, and/or other factors. In embodiments where plenoptic datasets are spatially sorted, the present invention may be implemented in a computationally efficient manner by, for example, simultaneously traversing an aligned data structure to visit identical or corresponding volumetric or directional regions of space in a structure. In some embodiments, the ability to spatially sort datasets may facilitate the maintenance of multiple datasets representing disparate information in the same scene and allows for colocation of properties. In such a manner, an exemplary implementation of the present invention may maintain one or more characteristics for a scene in multiple structures and making available and/or processing a subset thereof relevant to a particular operation.

Certain embodiments of the invention may use data structures to represent segments of plenoptic information. Subsets of plenoptic data may be represented in multiple ways, depending on the requirements of a particular application. In some embodiments, a plenoptic data structure may include a segment identifier, for example as part of the core structure used to identify the type or a property attached to the segment within the data structure. Such implementations may be particularly advantageous where a small number of segments is needed or desired for representation.

In an embodiment where data may be included in multiple segments, an identifier may preferably provide for multiple segment memberships. Such identification may be accomplished in some embodiments directly with properties, in other embodiments by using a table pointer property with the membership situation in a table, and in other embodiments using a combination of the foregoing or an alternative method.

In some embodiments, a segment may be represented implicitly based on a type, property, or other characteristic or variable. For example, a segment could be defined as the portion of a plenoptic data structure that match some set of inclusion or exclusion properties (e.g., density within specified limits).

In certain embodiments, separate shadow plenoptic data structure may be defined. A shadow plenoptic data structure may be a plenoptic data structure that represents the portions of data of at least a subset of another one or more plenoptic data structures but represent alternative information (e.g. membership in a selection set or property deviations). Shadow plenoptic data structures may be advantageous when larger numbers of segments are need or are desired to be represented. For example, a data structure that is binary (e.g., data is marked as included or not included in a selection set) could represent the data in another plenoptic data structure that belong to a specific segment. In such embodiments, multiple such segments could be combined with set operations simultaneous with the associated plenoptic data structure, which may create a super-segment. Such super-segments could have overlapping data.

In some embodiments of the invention, it may be desirable to duplicate a structure at one or more places within a scene. This preference may be particularly useful with analytic items. Graph structures may be used to eliminate duplication of identical data, to avoid the need to make any changes in multiple places, some combination of the two, or for other purposes. In certain embodiments, before used in an operation such as display of a scene or portion thereof, a graph may be evaluated or "flattened" into a simpler data structure where all the transformations that apply to individual elements are combined into single transformations. By way of non-limiting example of use of a graph structure in a scene, consider an assembly comprising multiple bolts. The foregoing process may be used to change a bolt type, location, orientation, or other feature. The present invention may thereby be used to effectuate the transformation of all relevant bolts in the scene by means of a single transformation or a reduced number of transformations based upon set or determined parameters.

In some embodiments, the system may provide for sampling to determine a function that may represent a surface. In certain embodiments, the sampling may include sampling of polarimetric data, such that the function can represent an intensity over a surface, polarimetric information over a surface, a light source, an exitant light field or output, or any combination of foregoing. Where the system assigns a function over a surface, the resulting function may provide a dataset that can represent the surface. For example, the function may provide a fitted model for a certain voxel, which may permit the determination of how the voxel will respond in different conditions. Such a function may be used to determine a response in a particular light field, or to determine how to project how a response in a single light field may translate to other light fields. Such a representation may also be used, for example, in circumstances where the system has not (or has not yet) separated a matter field from a light field.

The foregoing plenoptic representations may be used in certain embodiments of the invention to perform generalized scene reconstruction. For example, certain of the foregoing plenoptic representations may be space-filling (of 3D volumetric space or direction space) and may support more powerful processing operations than the exemplary surface, line, or point representations described herein in detail. Certain embodiments of the invention may combine, process, analyze, or perform other operations to enable and facilitate scene reconstruction with functions that are difficult or impossible with lower-dimensional representations. Exemplary categories of operations that may be performed as part of scene reconstruction or other processes described herein include, but are not limited to, thresholding based on one or more properties; calculations of connectivity of one or more elements or objects; calculating mass properties (volume, mass, center of mass, etc.); identifier marking (e.g., identification of regions of volumetric or direction space); performing set operations, transformations, and/or morphological operations (e.g., dilation, erosion, etc.); calculating directional projection and/or visibility; determining spatial and/or directional masking; determining internal fill; and performing clash and/or collision analysis; among others. In some embodiments, multiple operations may be used together to implement one or more compound operations, such as isolation of disjoint parts, region selection, and/or determination of a nearest neighbor (spatial or directional).

With reference to the various embodiments described herein, certain embodiments of the invention may make use of one or more of the modeling methods and processing tools described herein to perform reconstruction tasks and related operations to support multiple uses.

As a first example, the embodiments described herein may be used to reconstruct a scene including a tree and/or to view a tree from a distance. In this example, one or more images containing a static tree are taken from a great distance. In this example, a single pixel from the image may include one or many leaves, the background, or some combination of the two. In some embodiments of the invention, the information contained in this pixel may be represented by a sael with an origin at the viewpoint and enclosing planes intersecting the edges of the pixel. The information attached to the sael may include a color and a computed normal vector. Such a computed normal vector may be calculated from polarimetric analysis of the data, from a combination of images, or otherwise. The color may be the combined color of the leaves, branches, and background represented by the pixel. In this example, the normal vector would be the result of many surface reflections. Thus, for the example of a tree viewed at such a distance, the image information would not achieve a confidence level sufficient to indicate that the information is from a single surface.

In some circumstances, there may be multiple related pixels in a region of the image. If the number of related pixels is sufficient, certain embodiments of the invention may perform a statistical analysis of the texture. Such a statistical analysis may involve the application of a set of one or more filters to the region, and preferably would include clusters of the responses to the one or more filters assembled into a texture signature. In this example, a calculated texture signature may then be added as a property to the scene model and later used to insert synthetically generated textures into renderings to provide for realistic views.

Continuing the example of an image of a tree taken at a distance, the higher levels of the sael data may be computed from the individual pixels. Because of the relatively low resolution and/or high degree of objects represented in the single pixel, there is insufficient information to begin the construction of a spatial representation of the tree. Thus, in certain embodiments where the system may be implemented to reconstruct a 3D scene for 3D viewing, the image of the tree, and everything within such image, would be assumed to be beyond the parallax distance (i.e., reconstructable scene boundary) and used in some embodiments as a background.

If the proposed example system receives one or more additional images or other scene data of the same tree from a different viewpoint, the system may extract certain landmark points or radiographic information from the original image and the newly received images or data and, in a preferred embodiment, attempt to match such landmark points or radiographic information. If the system successfully matches such landmark points or radiographic information, the system may estimate the 3D location of the points. At this point, some embodiments of the invention may initiate a 3D model and the spatial region around the matched points may be given a color value or other characteristic(s) of the point from the pixels in the two images. The system may perform similar operations on the areas surrounding the matched point. If additional images from a closer range become available, the system may create higher-resolution spatial regions, and the system may optionally reevaluate the relevant upper, lower-resolution regions. This process may be executed on an on-demand basis such that the high-resolution information is processed only as needed to achieve an immediate goal. This goal could be, for example, reconstructing a particular object of interest, whereby the system may retain most or all imaging data would be retained for later use but not processed to a high level of detail unless needed. In some embodiments, the higher-resolution information may be processed immediately and/or stored for later processing. The system may then construct a 3D model using all or a subset of the data available. In some embodiments, the highest resolution of the spatial model would roughly correspond to the projected sizes of the pixels.

The system described herein may further generate lower-resolution regions of the spatial model using color information computed from the lower levels. In some embodiments, the color information contained in the higher-resolution areas of the data structure are processed to generate one or multiple colors represented in a parent node. The system may then compute an estimate of the fraction the area that the calculated color occupies in the lower resolution representations of the images based on the corresponding higher resolution information. The system may then use this calculation to compute a transparency estimate for spatial regions at multiple levels of resolution, wherein the transparency estimate may be the fraction of the spatial region that is estimated to contribute a color to the associated region in the images. In some embodiments, the remaining color or colors are assumed to be from matter at a greater distance, for example, in the background of the image. In some embodiments, the system may continue representing spatial regions of increasing sized with the inclusion of additional colors and transparency values, which in some cases may lead to added complexity. Colors representing different items in the scene may be separated into other spatial regions, limiting the need in individual nodes. The composite color and transparency value for a region could thus be computed as a single color and transparency value for the region based on the child values.

In certain embodiments of the invention, the system may permit display from a novel viewpoint. In such circumstances, the plenoptic representation may optionally be traversed in a front-to-back order from the viewpoint with pixel information accumulated from spatial regions roughly corresponding to the projected pixel size, wherein the spatial regions may increase with distance. In such embodiments, the system may accumulate a composite color value for a pixel based on the colors weighted by the encountered transparency values, which may continue as nodes of an appropriate size are encountered. In some embodiments, the system may include a threshold for a pixel, whereby when the accumulated transparency weights exceed the threshold for a pixel, the color is determined and plenoptic traversal is terminated.

As a second example, the embodiments described herein may be used to reconstruct a scene including a vase containing one or more flowers and removing a flower from the base. In this example, a plenoptic model of a vase with flowers has already been acquired from images. The system may use one or more 3D segmentation tools to generate a data structure to characterize segments, such as described herein. The system may then provide one or more segment identification numbers to one or more regions of the model, wherein the segment identification numbers may be based on the estimated similarity of mediels between one or more segments. For example, the system may base segment identification on the spatial smoothness of the outer surface of the vase, indicating that the individual mediels are related and belong together. In some embodiments, a priori information, with perhaps AI assistance, could be employed to guide the segmentation. Certain embodiments may connect individual segments that belong to identifiable structures like the vase, flowers, or other objects in the scene. Such an exemplary embodiment may be implemented with to store information that may optionally associate the segments that form a flower. The exemplary embodiment may further comprise a high-level data structure that may connect the various representations of various portions of the flower, for example, the petals, stem, and leaves. The exemplary embodiment may further comprise an even higher-level data structure that may represent the entire vase with flowers.

To extract a particular flower, an exemplary embodiment of the invention may then execute one or more operations, for example a transformation. In doing so, the system may then subject one or more associated segments to a transformation, and thereby manipulate the one or more associated segments and maneuver such segments away from the vase. The system may further engage in a collision analysis, which may guide the movement of the flower within the scene for a trajectory avoiding spatial intersections. In some embodiments, depending on the level of recognition and modeling achieved, sections of the flower model that were occluded and/or otherwise not reconstructed, may be interpolated, or inserted with analytic models.

As a third example, the embodiments described herein may be used to reconstruct a scene including water, objects submerged or partially submerged in water, one or more water drops entering a body of water, such as a swimming pool, or objects submerged in water or another liquid. In one such example, multiple water droplets and a nearby body of water may be reconstructed. In certain embodiments, the droplets may be modelled moving to and entering the water body according to the laws of physics or other characteristics that may be provided to or known by the system. In some embodiments, the droplets may be represented volumetrically, which provides a basis for the system to calculate the mass properties of each drop using known mass properties of water. The system then may, based in whole, in part, or otherwise, on the mass and/or center-of-mass of a drop, model the trajectory of each such drop to the water. In some embodiments, the system may optionally include an advanced modeling system, which may support deformations of one or more of the drops or of the swimming pool.

In some embodiments, the movement of a droplet may be modeled at discrete instances in time. At a point in time where a drop may first enter the larger segment representing the water body, an operation may be performed to determine the volume of water that is common between the swimming pool and the droplet. The system may then use the results of such an operation to compensate for a volume increase in the larger segment, which may optionally be accomplished using a morphological dilation operation. Upon such an operation, one or more volume elements on the larger segment surface (the swimming pool) that interface with movable material (a drop) may be extended incrementally to compensate for the displaced water volume and may be further modified to account for the dynamic reaction of the segment surface to the interaction with the movable material. The system may use such tools and similar tools to implement a more advanced displacement model. In some embodiments, the overall process may continue for additional water displacements until the droplet has become fully incorporated into the body of water.

As a fourth example, the embodiments described herein may be used to reconstruct a scene including a satellite, spacecraft, or other object in orbit around Earth or another body. Using a spacecraft as an exemplary object for reconstruction, one or more images of the spacecraft may be captured by an imaging device, such as a camera. The digital imaging device may be provided as part of the spacecraft itself (for example, on a boom, arm, or other structure to allow for the spacecraft to inspect itself), or may be provided on a separate spacecraft or object that may, for example, be operable to inspect the spacecraft. In some embodiments, the system described herein may provide for creating a plenoptic model of the spacecraft from already acquired image data. In some embodiments, the system described herein may provide for creating a plenoptic model of the spacecraft from image data as it is captured, or from a combination of previously acquired data and data as it is captured. Such a model may be used to assess the condition of the spacecraft, the presence or absence of damage to all or a portion of the spacecraft, the materials present on the spacecraft, instrumentation present on the spacecraft, or other information that may be useful in assessing the spacecraft, or any combination of the foregoing.

In some embodiments, the system may store one or more models in a database or other data structure. In addition to providing for storage of models, the database may provide access to the one or more models. In some embodiments, access may be provided by means of a search of one or more characteristics of the model, by means of an index, by a user interface providing for browsing one or more categories of models, or the like. Certain embodiments of the invention may provide for a data service permitting access to the one or more models. Such a data service may be personal (i.e., on a user-by-user basis allowing a user to access a subset of models associated with the user), available to a group of users (e.g., to a group, company, enterprise, business, or other group where there is limited access to such group), or even available to the general public. Some embodiments may provide the data service as an interface to other systems or applications. For example, the system may provide access to or information on the models to applications or systems that may use the models for other purposes (e.g., a third-party metaverse application could use one or more models of furniture provided by the system to recreate a house). In some embodiments, the system may store models created by the system itself, by third-party model creation systems or software, or some combination of the two.

The system may use one or more 3D segmentation tools to generate a representative data structure of the segments, such as described herein. The system may then provide one or more segment identification numbers to one or more regions of the model, wherein the segment identification numbers may be based on the estimated similarity of mediels between one or more segments. For example, the system may base segment identification on the spatial smoothness of the outer surface of the spacecraft, or of the material present in the model (for example, classifying the materials from the spacecraft's solar arrays with a segment identification number), indicating that the individual mediels are related and belong together. In some embodiments, a priori information, with perhaps AI assistance, could be employed to guide the segmentation. Certain embodiments may use one or more high-level data structures to connect individual segments that belong to identifiable structures like the solar arrays, thermal management system, propulsion system, communications system, or other aspects of the spacecraft. Such an exemplary embodiment may be implemented with individual high-level data structures that may optionally associate the segments that form a particular system or subsystem of the spacecraft. The exemplary embodiment may further comprise an even higher-level data structure that may connect the various individual high-level data structures representing various portions of the spacecraft, for example, the subsystems that comprise a broader system observable on the spacecraft. The exemplary embodiment may further comprise an even higher-level data structure that may represent the entire spacecraft.

As a fifth example, the embodiments described herein may be used to reconstruct a scene including portions of the human body. As an example, embodiments of the inventions disclosed herein may be used for dental applications to reconstruct teeth, gums or other soft tissue, dental implants or products, or other objects in an individual's mouth, to reconstruct all or a portion of the human eye, or for other medical-related applications. For example, the system could be implemented to perform dental virtualization in a dentist or other provider's office, in a surgical center or hospital, or even a patient's home. In various embodiments, imaging could be performed using a handheld commercial device (e.g., mobile phone, tablet, or camera) or with specialized medical or dental equipment (e.g., dental scopes of other scopes known in the art). In some embodiments, the system may process captured images to virtualize the scene of interest within the patient's mouth, including optionally providing characterization of size/dimensions, color, reflectivity, translucency, and/or other optical characteristics of the objects in the scene (e.g., teeth). Such virtualized scene may include a model, such as a plenoptic model, that may have utility in numerous applications, such as design and sizing for braces or alignment devices, dental implants or other appliances, mouth guards, retainers, and the like. Although provided in the context of a dentistry-related application, the system could be used in an analogous manner for medical-related applications (e.g., diagnosis, surgery and operating rooms, treatment, etc.), analysis of body size and/or composition for athletic training, sizing for apparel, and numerous other applications. For example, the system may create models that could be used to validate the accuracy and completeness of surgical equipment, medications, or other objects before entering an operating environment to perform a surgery; to model an area of interest in or on the human body before, during, and/or after surgery; for training purposes; or numerous other applications.

In addition to the foregoing examples, the system described herein may be used in multiple other contexts, including circumstances where reconstruction of both light and matter in a scene may be advantageous compared with existing systems. Such circumstances include, but are not limited to, advanced driving support systems, traffic solutions (e.g., speeding or license plate detection), human body scanning (e.g., for the health, medical, dental, and/or fashion industries), object classification and/or identification, inspections where UAVs may be used for area access, battery inspection, robotics (e.g., bin picking or indoor mapping), logistics (e.g., packing trucks or dimensioning objects to be packed), automotive applications (e.g., car body inspection), sorting applications (e.g., food sorting or recycling), or in connection with infrared scanners (long or short wave).

One of the advantages of embodiments of the inventions disclosed herein is the ability to configure embodiments of the inventions to reconstruct a light field, a matter field (which may be a relightable matter field), or both, either in conjunction or separately. Those of skill in the art will recognize that various applications of embodiments of the inventions may require only one or both a light field and matter field reconstruction, and furthermore that a relightable matter field may have advantages in particular circumstances and may not be necessary in other circumstances. In addition, embodiments of the inventions described herein may be configured to perform certain of the foregoing reconstruction techniques for all of a scene, or alternatively perform the techniques in various configurations for different regions or objects within the scene. Moreover, the foregoing reconstruction techniques may be paired with other techniques for characterizing a scene (e.g., photogrammetry, NeRF, and others described herein), either to reconstruct all or the same regions of a scene, or by using different techniques to characterize different regions or objects of interest in the scene. For example, embodiments of the invention may be configured to determine which technique may provide the fastest, most computationally efficient, lowest power, etc. alternative to reconstruct a scene (or some or all separate portions thereof), and combine various reconstruction techniques.

Several of the advantages of light and matter field reconstruction are illustrated, by way of example, with regard to FIG. 73 and the related discussion in U.S. Patent Pub. 2021/0133929A1 to Ackerson, et al. FIG. 73 highlights a circumstance where a representation of the matter and light fields, and their interactions that result in images, can be complex and difficult to analyze and understand, particularly if such understanding is attempted to be gathered from the image itself. In some embodiments, the inventions described herein my tailor the information displayed to the immediate needs of the view, for example by specifying the types of scene elements and the viewing characteristics (e.g., scale factor) and how elements are to be rendered (e.g., wireframe versus shaded).

Referencing FIGS. 1C-1E, in some embodiments, the inventions disclosed herein may be configured to allow customization of the nature of the relightability characteristics present in models. For example, a user, calling process, higher level reconstruction goals (manually or automatically determined), or other feature may specify desired relightability characteristics of any given scene. In some embodiments, a scene may be considered relightable if mediels within a scene have associated characteristics (e.g., one or more BLIFs) capable of predicting a responsive radiance in one or more (or any) exitant direction of interest given an incident light field. In some embodiments, a scene may be considered fully relightable if all mediels within the scene have the foregoing characteristics and the model has removed external illumination (i.e., responsive radiance is based only on emissive light within the scene, except in circumstances whether the model is being reconstructed with a specified incident light field). For example, FIG. 1D depicts a matter field 120 where all external illumination (e.g., light flowing in 112) has been removed. A fully relightable matter field may be configured to be responsive to an emissive light field from an emissive object 114 and/or a fenestral light field 112. A fenestral light field 112 may represent light incident on the scene from its larger enclosing environment (frontier 117). Having a fenestral light field 112 may be desirable for lighting or relighting the scene under the original light field present during the capture or measurement from the associated image data and/or for characterizing the scene in an alternative lighting condition (e.g., the model is of a room, the fenestral light field may permit characterizing the room in daylight and night conditions). Characterizing the original fenestral light field 112 may be less important if characteristics of the original light field are not desired for reconstruction, though some embodiments may reconstruct a near equivalent in the process of reducing the scene to a form represented primarily by the physics of light interaction in a field of plenoptic elements. An example of a circumstance where a fenestral light field may be less important is if the reconstruction goal is to obtain a size & shape of a foot for a shoe order. In that circumstance, the reconstruction goal is the intrinsic matter field of foot surfels and the light field is less important.

In some embodiments, the invention may reconcile or balance incident and exitant light fields at fenestral boundaries 111 between subscenes or regions. For example, at a fenestral boundary element 111, radiance computed to be incident should match radiance computed to be exitant at the fenestral boundary 111 of another subscene in that given direction. Such a configuration may allow the system to be configured to implement varying techniques for reconstruction between subscenes or regions in the scene. For example, a single scene could contain separate subscenes reconstructed using each of the various techniques described herein (e.g., using physics-based light transport, NeRF, etc.), each of which could coexist within the overall reconstructed scene. The various subscenes could be reconciled or balanced relative to each other by querying each subscene for predicted exitant light in a specified query direction at each subscene fenestral boundary element 111, and optionally querying for predicted incident light could also be important. Having such balance may allow for varying degrees of relightability between subscenes or regions by providing a transition at the boundary, which may be thought of as analogous, though potentially coarser, to the manner of balancing incident and exitant light through mediel BLIFs within a subscene.

FIGS. 1C-1E illustrate various embodiments of a scene model. The scene model may be an externally illuminated scene model, as depicted in FIGS. 1C and 1E, meaning an incident light flow 112 is present at fenestral boundary 111, providing light to the scene. A scene model 110 may optionally contain one or more emissive objects 114, as depicted in FIG. 1C, wherein an emissive object emits a light flow to the scene independent of the incident light flow 112. The model may therefore represent media in the scene based upon both the incident light flow 112 and the emissive light flow from the emissive object 114, as applicable. A scene model 110 may optionally contain one or more responsive objects 113, as depicted in FIG. 1C, wherein a responsive object provides a responsive, or exitant, light flow in response to an incident light flow.

The scene model may be a unitary scene model, or relightable matter field 120, as depicted in FIG. 1D, for example if there is no incident light flow represented at the fenestral boundary 111 and no emissive light in the scene. The unitary scene model may therefore represent the scene in the absence of externally incident light. Where a unitary model 120 is completely absent of light, such as depicted in FIG. 1D, a source of light must be provided by the system to light the scene (e.g., when desired for purposes of predicting exitant light, such as rendering), either fenestral or emissive. In such embodiments, as depicted in FIG. 1D, the unitary model 120 would represent the scene's light interaction properties without inherent lighting, such that eventual rendering represents interaction with the provided source of light. In some embodiments, where a unitary model 120 includes an emissive object 114, there is a potential source of light in the scene itself. In such embodiments, the unitary scene model may be reconstructed solely with the emissive light source or may be reconstructed with a combination of the emissive light source and another source of light.

In some embodiments, a unitary scene model 120 may be considered fully relightable (e.g., if the model can remove the influence of an incident light flow 112 present in the original image data from which the model was constructed), where such relightability may be facilitated by determining a relightable matter field characterizing volumetric, radiometric, and light interaction characteristics of the matter in the scene. Upon providing a given light field (e.g., lighting condition), the model may reconstruct the matter field as it would appear in such light field. In some embodiments, a scene model 110 may be considered non-relightable (e.g., if the incident light 112 is not separable from the matter field of the model), partially relightable (e.g., if the incident light 112 is partially separable from the matter field of the model), or fully relightable (e.g., if the incident light 112 is fully separable from the matter field of the model). The degree of relightability may be influenced by performing light and/or matter field reconstruction according to the various embodiments disclosed herein, including by executing such reconstruction to a particular level of detail or resolution based on needs or preferences.

The scene model may also be a light field model 130, as depicted in FIG. 1E. A light field model 130 may characterize the flow of light within a scene. For example, the light field model 130 may characterize the light flow into the scene 112 and/or the light flow out of the scene 116. In addition, the light field model 130 may characterize light interactions and flows within the scene including, for example, responsive light flows from light interaction with responsive media and emissive light flows from emissive objects.

Although embodiments of the inventions described herein may be applied in various circumstances to reconstruct both a light and a matter field in a scene and to output those reconstructions together, certain applications of embodiments of the inventions described herein may only require reconstruction of a light field in the scene. A reconstruction of a scene light field may permit views of the scene where the particular characteristics of matter in the scene are not needed. For example, if the processes described herein are used for detection of traffic signals by an autonomous vehicle, the primary goal of the application would be to determine the state of traffic signals in the particular lighting conditions. However, the particular characteristics of the matter field (e.g., size and shape of the traffic signal itself) may not be relevant to the ultimate application. There are, of course, numerous applications where a light field reconstructed according to embodiments of the inventions described herein may be used independently to achieve desired outcomes.

Similarly, applications of some embodiments of the invention may only require a reconstruction of a matter field in the scene without a corresponding light field. For example, consider the circumstance where the results of a reconstruction using the processes herein may be used for reverse engineering or additive manufacturing of a part or component. That application may only require information related to the matter field, and particularly a model of the size and shape of one or more objects in the scene or the scene itself. There are, of course, numerous applications where a matter field reconstructed according to embodiments of the inventions described herein may be used independently to achieve desired outcomes.

In addition, applications of some embodiments may be enhanced by reconstruction of a relightable matter field. The term relightable may be understood to provide certain light interaction properties of matter in the scene, non-limiting examples of which include properties relating to a transparency, refractivity, roughness, a polarized diffuse characteristic, an unpolarized diffuse characteristics, and/or an extinction coefficient, among others. Characterization of these and/or other properties may permit modeling of how matter would interact with light fields other than those present in the image data from which the model was reconstructed. In addition, the light interaction characteristics of a relightable matter field may be used in conjunction with embodiments of the inventions described herein to characterize the composition or materiality of matter in the scene. For example, for applications where the reconstruction techniques described herein are implemented to create models for use in a metaverse, an accurate and usable model may preferably be capable of responding to the simulated lighting conditions in the metaverse scene, but the original light field may not be relevant. There are, of course, numerous applications where a relightable matter field reconstructed according to embodiments of the inventions described herein may be used independently to achieve desired outcomes. Embodiments of the inventions described herein may further be configured to provide for multiple or varying degrees of relightability within a single scene. For example, in certain embodiments, it may be desirable for certain portions of a scene to have a higher degree of relightability (e.g., the reflective pot depicted in FIG. 73 of U.S. Patent Pub. 2021/0133929A1 to Ackerson, et al.), whereas other areas of a scene may only need a lower degree of relightability (e.g., the wall, tree, or other features closer to the parallax or boundary of the scene depicted in FIG. 73 of U.S. Patent Pub. 2021/0133929A1 to Ackerson, et al.).

Figure 9:
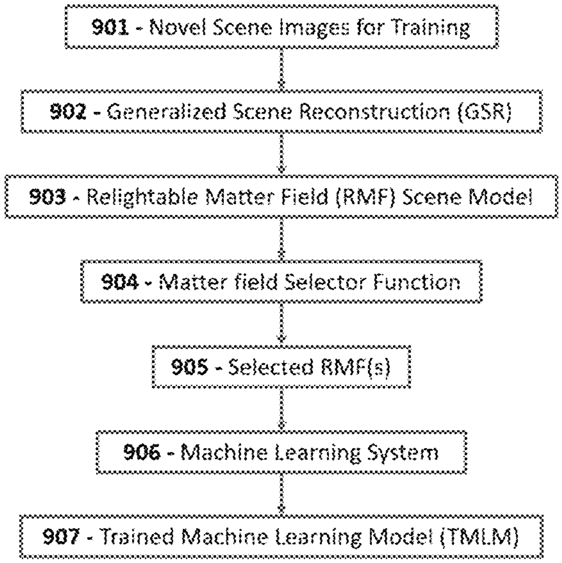
FIG. 9 illustrates an exemplary method for generation of a trained machine learning model (TMLM).

The use of ML in Generalized Scene Reconstruction (GSR) is exemplarily illustrated in FIGS. 9 and 10. FIG. 9 shows the process of generating a fully trained machine learning system, which may be referred to as a Trained Machine Learning Model or TMLM. A first step 901 is providing novel scene images for training. Images for training may be taken of objects of interest in many scenes and/or under a variety of conditions. The exemplary GSR system may analyze this information and/or other information in step 902 to generate a light field model for each scene and/or reconstruct one or more matter fields of the scenes in step 903. A Matter Field Selector Function may be employed in step 904 to extract the objects of interest from the scenes. In some embodiments, such processing may result in a Relightable Matter Field (RMF) model or models containing both geometry (e.g., shape) and BLIF information in step 905. Such model(s) may be used as examples in the training of a machine learning system in step 906. Although not shown, in certain embodiments, BLIF parameters may be varied to create multiple training examples from a single RMF model. The result in step 907 is a TMLM.

An illustration of an exemplary production use of a TMLM is shown in FIG. 10. In step 1001, images may be provided of a novel scene. In step 1002, a GSR system may process the images and create a new light field model and reconstruction a new RMF in step 1003. In some embodiments, the Matter Field Selector Function may be used to extract the parts of this matter field to be processed, such as for identification, in steps 1004 and 1005. Finally, in steps 1006 and 1007, the previously trained TMLM may then be used to test the new RMF to generate a useful output.

In some embodiments, the system may train and use a TMLM using one or more of: one or more matter fields, one or more source light fields, one or more fenestral light sources, and one or more captured images, each of which may optionally have associated pose information. Such training could be accomplished as discussed herein, including with the use of one or more neural networks, to calculate the light field for a scene or subscene. In some embodiments, the TMLM may be trained with one or more models, where such models include plenoptic fields, neural reconstructions of colors, intensities, or other radiometric information related to the scene, or models containing other information. Some embodiments of the TMLM may apply a physics-based modeling approach to perform light field reconstruction, either alone or in combination with one or more neural networks. The foregoing embodiments may permit a TMLM to create, reconstruct, or otherwise generate one or more images based on the input to the TMLM, including, in some embodiments, a pose associated with the one or more images.

In some embodiments, multi-dimensional scenes may be stored using voxel grids or polygon meshes, but other embodiments may avoid using either of the foregoing. Specifically, voxels can be expensive to store in terms of data size or required processing and polygon meshes often can only represent hard surfaces. The system may use one or more fields that define a set of spatial and/or temporal coordinates. In embodiments using a neural network to model one or more fields, the fields may be called neural fields or, in the case of modeling 3D spaces, a neural graphics primitive.

In some embodiments, a light field physics module may be used to model interaction between one or more mediels and radiels entering and/or exiting one or more of the mediels. Some embodiments of the invention may use a neural network to represent the light interaction in lieu of or in conjunction with a parametric function. In some embodiments, the system may use sinusoidal representation networks (SIREN) to incorporate the high frequency (textured layouts).

Although the system described herein may use parameterized functions to represent light interactions in a scene, the system may be configured in alternative manners. The light interaction function may be complex and the parameter space is often high dimensional. The system may optionally select ML models that try to learn and approximate a light interaction function. One facet that may improve the successful training of such ML models is ensuring compliance with the laws of physics related to light interaction. Certain embodiments of the invention may use a physics-informed neural network to ensure such compliance. This approach may modify a loss function with the prior knowledge of the system and use a neural network to model unknown physics components or characteristics. These neural networks may be configured to use non-linear activation functions to increase the expressive power of the model. Using prior information, such as known physics of light interaction discussed elsewhere herein, the system may incorporate additional constraints in accordance with the laws of physics.

There are numerous ways to incorporate physics-based modeling into neural networks, including, for example, physics-informed neural networks (PINNs), neural network architectures with physical constraints, incorporating physical priors into a loss function, hybrid modeling, and residual modeling.

Figure 16:
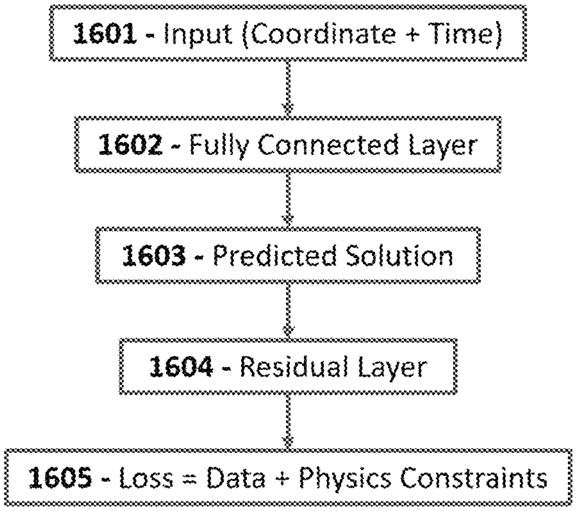
FIG. 16 is an illustration of a physics-informed neural networks (PINNs).

Referring to FIG. 16, in embodiments using a PINN architecture, the ML model may comprise two main parts: a fully connected neural network 1602 and a residual layer 1604, both of which may be designed to satisfy the underlying physics equations of the system being modeled. In some embodiments, the input to the PINN may be spatial and/or temporal coordinates 1601, which may be normalized to be between 0 and 1. The fully connected neural network 1602 may process the input to output a predicted solution 1603 for the system being modeled. The PINN may be composed of several hidden layers with a nonlinear activation function.

The residual layer 1604 may be applied to the predicted solution. The residual layer is optionally designed to ensure that the predicted solution satisfies the governing physics equations of the system. The residual layer may take partial derivatives of the predicted solution from the fully connected neural network with respect to the input coordinates and time, and enforce the physics equations governing the predicted solution 1603. The output of the residual layer 1605 may then be combined with a loss function that may include one or both of data constraints (such as known boundary conditions or initial conditions) and physics constraints (such as conservation laws or other governing equations). The loss function may be used to train the neural network to minimize the difference between the predicted solution and the observed data while still satisfying the underlying physics.

Some embodiments of the invention may use PINNs to enforce physical constraints such as object rigidity, object continuity, and/or object motion invariance during the reconstruction process. Incorporating these constraints into the neural network may result in an outputted model that is more accurate and/or robust. In some embodiments, the invention may use PINNs to improve the efficiency of the scene reconstruction process. For example, PINNs may be used instead of or in conjunction with computationally expensive algorithms (e.g., algorithms for solving partial differential equations (PDEs)).

A PINN may approximate the solution of one or more PDEs with a neural network, which may significantly reduce the computational time required for scene reconstruction.

Figure 20:
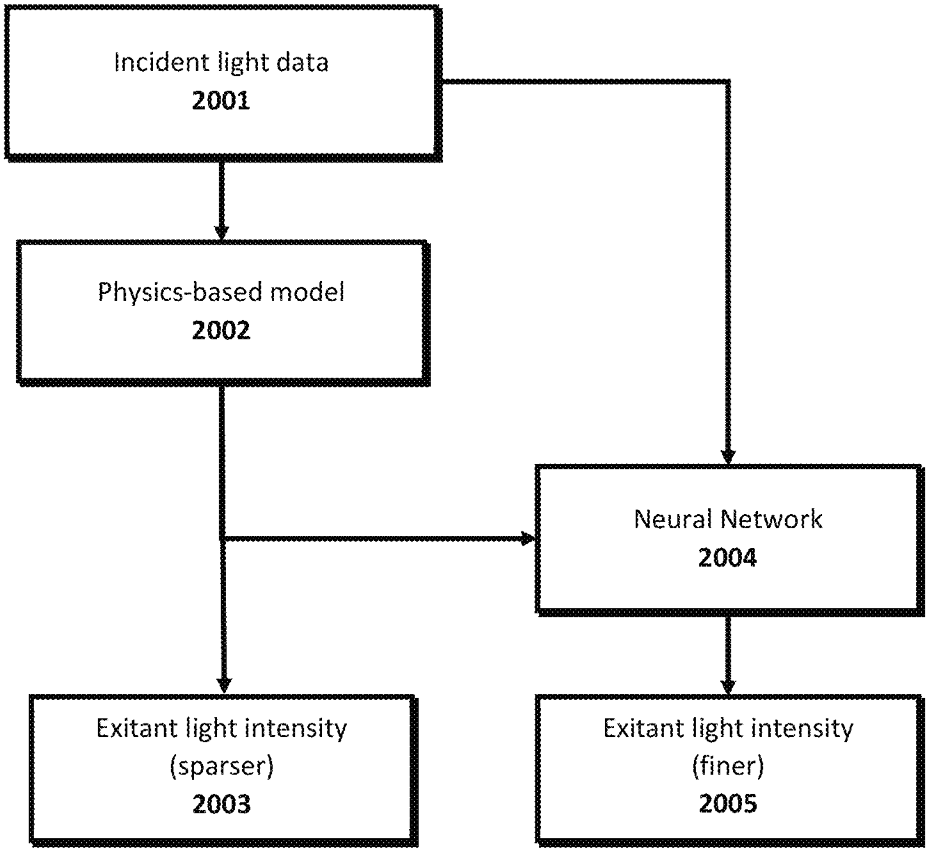
FIG. 20 is an illustration of a combination of a physics-based approach and a neural network.

Referring to FIG. 20, some embodiments of the invention may combine a physics-based approach (e.g., calculation of a BLIF and/or parameters thereof) with a neural network, which may perform residual modelling. In an exemplary embodiment, the input to the model is the incident data (e.g., light rays) 2001. The system may use a physics-based model 2002, such as calculating a BLIF to predict an exitant light intensity 2003. The physics-based calculations may be configured to be calculated up to a certain accuracy, which may reduce processing and/or power demands. The incident light field 2001 and/or the results of the physics-based calculations 2002 may be provided to a neural network 2004 to further refine the output to improve the prediction performance and/or resolution of the predicted light interaction 2005. In some embodiments, use of energy conservation constraints (e.g., incorporated into a loss function), may improve neural network training.

Figure 17:
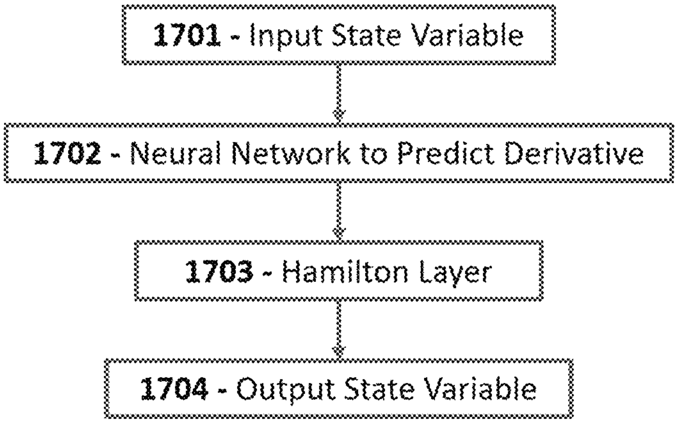
FIG. 17 is an illustration of a neural network architecture with physical constraints.

Referring to FIG. 17, some neural network architectures have been developed with built-in physical constraints. For example, the Neural Hamiltonian Network (NHN) architecture is designed to respect Hamiltonian dynamics and conserve energy in a system. The input to the NHN 1701 may be the state variables of the system (q, p), which could represent the position and momentum of a particle, for example. The neural network may be configured to predict the time derivatives of the state variables based on the input state variables 1702. This neural network may be a fully connected neural network with several hidden layers.

The output of the neural network may be passed through a Hamiltonian layer 1703, which can be configured to compute the Hamiltonian dynamics of the system based on the predicted derivatives. The Hamiltonian layer may compute the dot product of the predicted derivatives with a Jacobian matrix representing the underlying physics of the system. Such a configuration would ensure the NHN's predictions are consistent with the underlying physics of the system and energy is conserved over time.

The output of the Hamiltonian layer 1704 may be the predicted state variables at the next time step. These predicted state variables can be used to generate physically plausible trajectories for the system or for other downstream tasks such as control or optimization.

Figure 18:
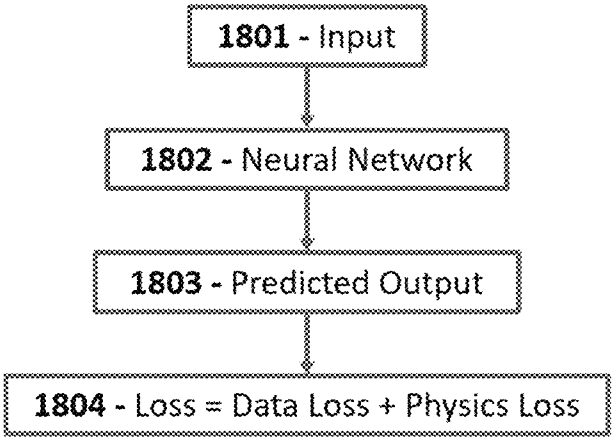
FIG. 18 is an illustration of incorporating physical priors into a loss function.

Referring to FIG. 18, the system may also be configured to incorporate physical priors into the loss function. The loss function of a neural network 1804 can be modified to include physical priors or constraints. For example, in image processing applications where the system is configured to receive an input 1801, process the input using a neural network 1802, and generate a predicted output 1803, the system can incorporate constraints on the physics of the imaging system, such as the point spread function, into the loss function.

Figure 19:
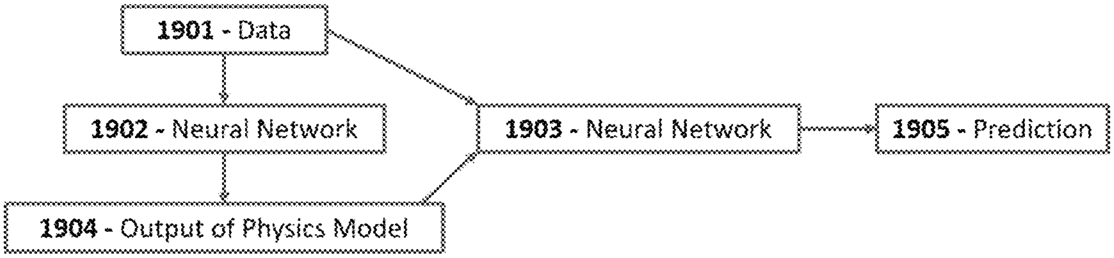
FIG. 19 is an illustration of residual modeling.

Referring to FIG. 19, another method to address the imperfection of physics-based models is residual modeling. Where the system is configured to use residual modeling, an ML model may learn to predict errors 1905, or residuals, made by a physics-based model 1902. Some embodiments may provide for input data 1901 to a physics model 1902 and a data model 1903. The system may be configured to learn biases of the physical model 1902 and the output thereof 1904 relative to observations and use predicted biases 1905 to make corrections to the physical model's predictions. Residual modeling may not enforce physics-based constraints because such approaches model the errors instead of the physical quantities in physics-based problems. For that reason, it may be advantageous to combine residual modeling with another form of modeling to ensure consistency with the laws of physics.

In some embodiments, the system may use a combination of physics-based modeling and data-driven modeling, or hybrid modeling. Hybrid models can take advantage of the strengths of both approaches to provide accurate predictions.

In some embodiments, the above-described neural networks may be designed by adding one or more known differential equations directly into the loss function when training the neural network. In some embodiments, the training may be accomplished by sampling a set of input training locations and passing the samples through the network. The network may calculate one or more gradients of the network's output with respect to its input at one or more of the sampled locations. In some embodiments, gradients can be computed using an autograd or similar feature, which is present in many ML libraries like PyTorch and TensorFlow. The system may then compute the residual of the underlying differential equation using one or more of the gradients, which residual may be added as an extra term in the loss function.

Some embodiments may use a similar approach to predict one or more surface normals in a scene, including based at least in part on an incident light field. The use of a trained ML model may be able to overcome sources of error present in a model. For example, even for volumes with air or empty space, it may be difficult to model errors in a model, and such issues may be even more complicated for volumes with complex or uneven media. In such circumstances, the system may be configured to use a neural network to approximate a loss function and then use the known light physics properties to add additional constraints in the loss function.

In some embodiments, the inventions described herein may utilize Structure from Motion (SfM) techniques. SfM is a technique for 3D scene reconstruction may estimate a 3D structure of a scene from a set of 2D images. SfM systems may match points in the images and then use this information to estimate data such as camera poses and/or 3D scene structure. SfM can be used to reconstruct scenes from a variety of sources, including photographs, videos, and LiDAR data.

Some embodiments of the invention may utilize Multi-View Stereo (MVS) techniques. MVS is a technique for 3D scene reconstruction that may estimate depth of a scene from multiple 2D images. MVS systems may find correspondences between points in different images and use this information to estimate the 3D structure of the scene. MVS can be used to reconstruct scenes from photographs and videos.

Those of skill in the art will understand that SfM and MVS are sometimes referred to as photogrammetry. Some embodiments of the invention may be configured to use photogrammetry to reconstruct scenes from aerial photographs, satellite images, and ground-based photographs.

Certain embodiments of the invention may utilize data from LiDAR systems. LiDAR is a technique for 3D scene reconstruction where laser pulses are emitted and may be used to estimate object position by calculating the time taken for the light to bounce back to the source from objects in the scene. By measuring the time of flight and the angle of the laser pulse, LiDAR can generate a point cloud of the scene, which can be used to reconstruct the 3D structure of the scene.

In some embodiments, the current invention may use other data to initialize the data structure before making initial postulations, where such image data may be 2D information and/or 3D information. In some embodiments, the invention may use 3D datasets, such as datasets from 3D sensing components such as the Kinect RGB-D (RGB and depth) camera system, structured light, multi-view stereo, stereo camera, LiDAR, radar, and/or infrared sensors, photogrammetry software, laser scanners, and other devices that provide 3D image information, simultaneous location and mapping (SLAM), and other technologies, software, and techniques. Such embodiments may receive input information in 3D where, for example, depth information determines a 3D location for each pixel relative to the camera, in addition to the color information. Such information may be represented as a 3D point cloud, voxel array, and/or other data storage structure.

In such embodiments, the system may use previously-captured and/or processed data to provide initial postulations as to the relative locations of media in a scene and associate a corresponding confidence value with such data. Providing such data may provide advantageous processing results by lowering the initial processing associated with populating the scene, perhaps providing for faster performance By way of example, the system may be operated in conjunction with photogrammetry or other techniques to provide a sparse mesh model of an object, subscene, or scene at relatively low processing cost, and thereafter perform the plenoptic processing techniques described herein. The combination of embodiments of the invention with such systems may permit other visualization of the relative locations of light and/or media in the scene. In some embodiments, the ML model may be trained on light field information, such as incident and/or exitant radiel trees, as a means to accelerate the identification of media and/or surfaces within a scene. As a non-limiting example, certain exitant light fields for Lambertian surfaces may have an artifact in the shape of a disc. This artifact may represent a cosine falloff around the surface normal of a particular surface, which may accelerate the identification of the applicable surface normal.

In certain embodiments, the present invention may be used in conjunction with, in parallel with, be supplemented by, or otherwise implemented using in whole or in part artificial intelligence (AI), machine learning (ML), and neural networks, including neural radiance networks, such as Neural Radiance Fields, or NeRFs, volumetric scene methods such as PlenOctrees or Plenoxels, Deep Signed Distance Functions (SDF), and Neural Volumes. or in other technology. Such methods may be used for scene reconstruction, novel view synthesis (NVS) and other uses to model radiance, density, or other information as a continuous function in a 3D space such as a volumetric space using a multilayer perceptron (MLP) or voxels such as voxel arrays. For example, given a location in space with 3D coordinates (x, y, and z) and a viewing direction, the representation will return a color (red, green, and blue) and density at that location. Deep SDF systems may be configured to learn a signed distance function in 3D space whose zero level-set represents a 2D surface. Neural Volumes systems may be configured as neural graphics primitives that may be parameterized by fully connected neural networks. NeRF systems may be configured to model the color and density of a scene. Other embodiments operate with alternative input and return information. In certain embodiments, the returned density may be a differential opacity value which includes, in part or in whole, an estimate of the radiance and other information such as color that could be accumulated by a ray in the specified direction through the specified point.

In some embodiments, such representations may be initialized with random values. At the start, any specified point and direction may return meaningless values. The exemplary system may then be trained using calibrated images from various known viewpoints (e.g., a few hundred images from random locations on a hemisphere above a real or simulated scene) or other image-related information. In some embodiments, the process may be initiated by selecting one or a set of pixels in the training images. For each pixel, the network may fire a ray from the viewpoint into the scene. The network may then execute a query or other process for some number of points along the ray (e.g., 50, 100, 200 points, or any other number of points chosen for the query). The points may be selected in various ways. In some embodiments, the network or portion thereof may perform an "integral rendering" operation to calculate a returned color or other values along the projected ray and integrate such values in some fashion to compute an estimated color or other information for the pixel. In some embodiments, for example, when the network is initialized with random values, such color values will have no relation to the ground-truth color. In certain embodiments, the network may calculate a characterization of the difference between the estimated color and the ground-truth (e.g., sum of squared color component differences). That difference may be used to modify the MLP weights or volumetric information using back propagation. In some embodiments, the foregoing process may be iterative to permit increasingly accurate estimated color or other values.

In some embodiments, the foregoing process may generate novel viewpoints with a high degree of realism after some level of "learning." For example, this may be through AI, such as converging on estimated color values within a scene. In certain processes known in the art, the use of neural radiance networks or volumetric representations to generate novel-viewpoint images can require significant processing and/or time. Certain queries may require perhaps 500,000 to 1,000,000 multiplication and/or other operations for each point on the ray. Certain prior systems may require 30 seconds or more to generate a single 800-pixel by 800-pixel image on a powerful graphics processing unit ("GPU"), such as an Nvidia V100.

Several methods have been developed to reduce the time, computations, cost, and power required to generate images using these methods. In some embodiments, a partly trained system may be used to generate an octree know as a PlenOctree, which is a different data structure than "plenoptic octrees." In such embodiments, a system may generate pixel values by sampling the PlenOctree at points along the ray rather than through use of an MLP. Such embodiments may improve performance by two, five, or more orders-of-magnitude. The present invention may be implemented to reduce further the computation and hardware required to generate pixel values from an octree data structure while increasing performance.

In some NeRF architectures, a single neural network may be used to predict both the color and density of a 3D point in the scene. In some architectures, separate networks may be used to predict different properties. For example, a separate network may be used to learn material properties, such as reflectance, roughness, or transparency. These networks may be configured to predict the material properties of different parts of a scene, and optionally may be combined with color and density predictions to render images of a scene. In some embodiments, the system may be configured using a two-stage approach with separate networks to predict the shape and material characteristics of a scene, which may be combined to produce the final rendering.

However, NeRF-based architectures may have certain limitations. For example, such networks may have limited scalability, requiring a large amount of training data to capture the variations in appearance and lighting of real-world scenes; limited generalization, where the method may rely heavily on the quality and diversity of the training data and may not generalize well to scenes that differ significantly from the training data; limited accuracy, where there may be errors and/or artifacts, particularly in regions of the scene that are occluded or poorly lit; and limited control over output due to the implicit nature of NeRF, which may result in difficulty controlling specific properties of the output, such as the exact position or orientation of objects in the scene. Use of NeRF-based approaches with the systems described herein may address one or more of these limitations.

In some embodiments, the present invention may generate surface normal vectors by fitting planes to neighboring surface elements. Such surface normal vectors may be used in processing operations, optionally with spatial and color information.

Certain embodiments of the invention may use ML to reconstruct the light field in a scene, including, in some circumstances, constructing a physics model of the interactions of light and a matter field in the scene. In such embodiments, the system may decouple components that may contribute to the light sensed by camera pixels or another imaging device. This data may be used to determine the characteristics of the matter and objects in the scene, including non-Lambertian surfaces (e.g., human skin, cloth, mirrors, glass, and water). In some embodiments, certain surface information may be represented in a Bidirectional Light Interaction Function (BLIF) for one or more sensed locations on an object, and optionally all sensed locations on an object. The sensed locations may include locations captured by individual pixels of a camera or imaging device. The present invention may use the BLIF, and modeling based on BLIFs, to extend concepts such as a Bidirectional Reflectance Distribution Function (BDRF) and/or cosine lobe reflectance models to develop a greater level of sophistication by include light/matter interactions involving color, material, roughness, polarization, and so on.

In some embodiments, this processing may be used in conjunction with other data regarding the relative location of matter in the scene. For example, numerous technologies are known in the art to provide crude, refined, or highly-accurate three-dimensional information, including photogrammetry (e.g., through software packages like COLMAP or Metashape), structured light, multi-view stereo, LiDAR, radar, infrared, laser scanners, simultaneous location and mapping (SLAM) and other technologies and techniques. The ML model may be configured to use the combination of image data with the other data to make postulations about the nature of media in the scene, such as information not readily apparent from image data alone or better information than is available from image data alone. Such postulations may then be used to accelerate processing of the plenoptic field for the scene. For example, such postulations may allow the system to predict the light interaction characteristics associated with media in the scene, with such postulations provided as an assumption to the processor before performing reconstruction of the light in the scene, provide an updated set of assumptions underlying the light interaction, or reorder the processing workflow to match predicted media in the scene.

In some embodiments, the system may be configured to classify a 3D scene/object using the raw point cloud data, such as may be provided by LiDAR. For example, the system may use methods such as PointNet (global features) or PointNet++ (local features), which use raw cartesian point data for classification and segmentation tasks. The system may be configured to use MLP layers for each point and use symmetric functions to handle permutation variance. The system may also be configured to use relightable matter field (RMF) data, including in conjunction with global and/or local feature extractors.

Some embodiments of the invention may implement NeRF Self Supervised Object Segmentation (NeRF SOS) or an analogous processing regime to use a latent representation for downstream object recognition, object segmentation, and/or other tasks. In some embodiments, RMF data may be used as a latent representation of the scene and used for downstream tasks, such as object recognition and/or segmentation.

Certain embodiments of the invention may utilize AI and/or ML to perform activities such as object classification. Prior art systems often perform object classifications based on images as a training input, but performance of such systems often depends on the quality and scope of the training data. For example, traffic signal detection model trained under normal conditions may not have adequate robustness to resolve difficult lighting conditions (e.g., sun positioned behind or in front of a traffic signal) and/or adverse weather conditions (e.g., snow, rain, or fog).

Certain embodiments of the invention may comprise an ability to extract the BLIF parameters, either direct measurements or a mathematical model, for sensed surfaces. Such extracted BLIF parameters may be used to construct new light field models for novel situations, which, in some embodiments, may allow the system to model light interactions with a reconstructed matter field representing objects or material in a new scene with different lighting. Thus, in certain embodiments, the system may comprise an ability to generate a realistic rendering of a matter field under a variety of lighting conditions, and preferably under almost any lighting condition, which is known as "relighting." In such embodiments, the reconstructed matter field becomes a Relightable Matter Field (RMF), which may have greatly increased representational robustness and/or support improved levels of realism in applications.

Some embodiments of the invention may use sensed material "signatures" in the form of BLIFs at observed locations on the surfaces of objects in a scene in place of and/or in conjunction with sensed color information in 3D ML systems (Convolutional Neural Network (CNN), NeRF, etc.). In such embodiments, a training model for the ML system may contain information about the fundamental surface material and characteristics of the viewed objects with and/or without the interaction of scene lighting. In applying such training models, certain embodiments of the invention may permit reducing the number of lighting and scene situations that must be obtained from the real world for effective training, and/or allow synthetic generation of new training models by varying one or more BLIF parameters in a single object model to account for the variety characteristics (e.g., colors and/or surface conditions) that may be encountered with an object when in productive use. In some embodiments of the invention, such signatures may simplify the training and use of 2D ML systems. By obtaining 3D models of real-world objects with included BLIF information, 2D training datasets may be synthetically generated by rendering the models from various viewpoints and/or varying the lighting and BLIF parameters appropriately. In such embodiments, the system may be used to provide a vast number of training or synthetic datasets to the TMLM.

Figure 15:
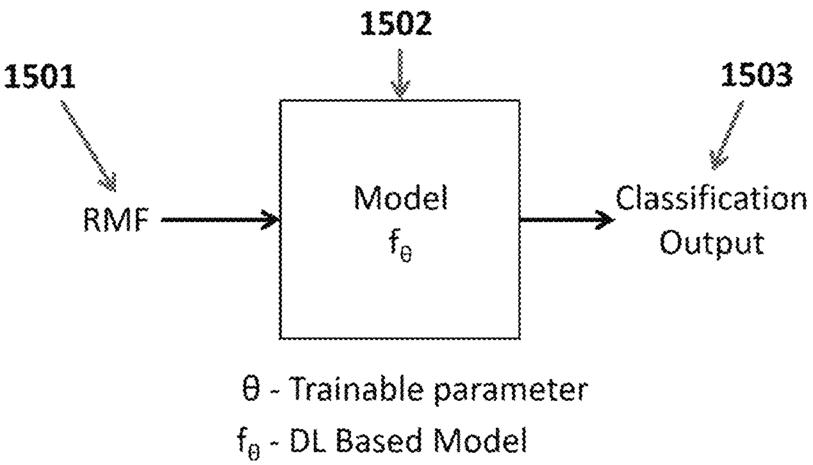
FIG. 15 is an illustration of a machine learning model.

In some embodiments, the system may use relightable matter field data for object type classification. In an exemplary structure, the system may use a CNN based architecture and/or transformer-based architecture. Nodes of the CNN could be treated as a sequence and fed into a self-attention-based model, as depicted in FIG. 15. In an embodiment as depicted in FIG. 15, a model of a relightable matter field 1501 may be used as an input to a model 1502. The model 1502 could include a deep learning based model $f_0$ that may be trained on parameter θ. Model 1502 could be sequential, convolution-based, or a multilayer perceptron. The model 1502 may be configured to create an output 1503 as a classification, shape completion (e.g., via a ShapeNet), or another output parameter. For embodiments where there are varying sizes, a transformer-based model may be an efficient approach (e.g., by dividing the volume into a plurality of voxels and treating the voxels as a sequence). For embodiments where the system is trained to perform shape completion, which may involve predicting volume of one or more objects in a scene, architectures based on a variational autoencoder (VAE) and/or generative adversarial networks (GANs) can also be utilized.

In some embodiments, the system may perform image inpainting and/or outpainting. Image inpainting may predict a state of damaged, occluded, or missing parts of an image. Outpainting is generating new image content that extends beyond the boundaries of the original image. The system may use any number of known methods associated with these techniques.

In some embodiments, the system may use Generative Adversarial Networks (GANs), including for image inpainting tasks. A GAN may learn an underlying distribution of image data and generate new images. GANs may use a generative and discriminative network to attain visually good results. The generator may be trained to fill in the missing pixels and the discriminator may be trained to distinguish between the generated and real images.

Some embodiments of the invention may use autoencoders. Autoencoders may comprise an encoder network and/or a decoder network. The encoder network may be configured to compress the input image into a lower-dimensional representation. The decoder network may be configured to reconstruct an image from a compressed representation. In image inpainting, the encoder network may be trained to encode the damaged image, and the decoder network may be trained to fill in the missing pixels in the encoded representation.

Certain embodiments of the invention may use a deep image prior. A deep image prior may initialize the weights of a deep neural network with random values and optimize the weights to minimize a reconstruction loss between a generated image and input image data. By optimizing the weights, the network may learn to generate plausible image completions that are consistent with input image data.

In some embodiments the system may perform various tasks to reconstruct missing or corrupted parts of a 3D point cloud. For example, in a similar way to use with images, a GAN can be trained to learn a distribution of point cloud data. One such approach is PCGAN, which uses a conditional GAN to generate missing points in the input point cloud. In other embodiments, an encoder-decoder architecture, such as U-Net or PointCNN may be used. A U-Net or Point CNN architecture may comprise an encoder that maps the input point cloud to a low-dimensional feature space and a decoder that maps the features back to a reconstructed point cloud. Some methods may also incorporate attention mechanisms into the encoder-decoder architecture to better capture local and global structures. Some embodiments may use a Conditional Invertible Neural Network or PI-NeRF (e.g., by using a point cloud inpainting network to fill in missing points in the input views, and then uses NeRF to reconstruct the scene from the completed views).

In cases where the missing parts of the scene are not evident from input image data, direct inpainting for the generated 3D scene may be more feasible. Some embodiments may be configured to learn a distribution of voxels in a scene and then predict occupancy values for missing/damaged parts. For example, a 3D-GAN may inpaint missing voxels by training a conditional GAN to generate completed voxel-based 3D scenes given incomplete or corrupted input.

In some embodiments, the system may predict material properties along with light properties for missing or corrupted parts. The system may be configured to learn two distribution functions: one for matter field and another for light field.

Some embodiments of the invention may use alternating optimization, i.e., an iterative procedure for optimizing some function jointly over all parameters by alternating restricted optimization over individual parameter subsets. For example, as described elsewhere herein, the system may be configured to calculate parameters related to a BLIF and/or surface normal. These calculations may be non-convex in nature, meaning convergence is not guaranteed and there may be risks of minimal effective processing in certain local minima In circumstances where joint optimization is not effective or in which it is otherwise advantageous to do so, the system may use alternate optimization to perform light and/or matter field reconstruction. Alternate optimization may improve optimization time in some cases and also may be better in bypassing local optima in some case as compared to joint optimization.

One problem with some ML models is such ML models may base processing or decision-making on learned statistics or patterns present in training data. Because training of an ML model and the inference is highly data driven, outputs may be adversely affected due to data inconsistency or inaccuracy. In some embodiments, the system may be configured to impose certain limitations, formulations, or other constraints on one or more ML models. For example, the system may impose some formulation of the laws of light-field physics that consistently obeys the natural law. Alternatively, the system may configure the ML model such that the system may perform parametric modeling using conventional light-physics in conjunction with processing via a neural network.

In some embodiments, the system may incorporate physical constraints into an ML model to improve explainability of the model. For example, if a model is designed to predict the trajectory of a ball incorporating physical laws of motion, it may assist in constraining the predictions of the model in a way that helps in making the system more explainable. A similar approach may be used with the models described herein by including constraints relating to or characterizing the laws of light physics.

Certain embodiments of the invention may interpret the ML model using physics-based models. For example, a physics-based model may be used to interpret the output of a neural network and/or explain why the neural network is making certain predictions. This physics-based model can help identify the key features or inputs that are driving a model's predictions. In the context of scene or light field reconstruction, a physics-based model may assist in identifying and providing characteristics of particular rays, nodes, or other data that is contributing to a particular reconstructed output or result.

Some embodiments of the invention may use physics-based simulations to validate ML models. Such embodiments may compare predictions of an ML model to the results of a physics-based simulation. These comparisons may assist in identifying areas where the model may be inaccurate or biased and/or improving the accuracy and/or reliability of the model. For example, the system may be configured to use the output of reconstruction methods unassisted or only partially assisted by ML as a comparison to a machine learning-based approach's output.

In some embodiments, the system may combine physics-based models with ML models. This combination may result in one or more hybrid models that are more explainable. For example, a physics-based model may be used to generate initial conditions or constraints for an ML model, or an ML model may be used to refine the predictions of a physics-based model.

One advantage of the current invention is that it may be configured in such a way to reverse engineer an existing model. Although legacy techniques, such as NeRF, can be used for reconstructing scenes, the reconstructions are not necessarily a "deconstructable" and/or "reconstructable" technique in the sense that such techniques cannot be used to reverse engineer an already existing 3D model.

In some embodiments, the invention may incorporate one or more non-light-physics-based techniques (e.g., LiDAR, MVS, SfM, photogrammetry, or others) in conjunction with a physics-based approach to achieve better deconstructability and/or reconstructability. In the example of a ML-based approach, the goal may be to learn the matter and/or light field in a scene. The system may be configured to generate high-resolution images with fine-grained control over various aspects of the image, such as the pose, expression, and appearance of the subject. For example, some embodiments of the invention may be configured to use StyleGANs configured to use a "style" vector. Such a vector may control the various properties of the generated image, may be learned during the training process, and may be manipulated to generate new images with different styles to enrich generation capacity to relight scenes. In similar ways, the current system may be configured to generate latent variables for light and material properties which can help improve deconstructability and/or reconstructability of a scene.

The system described herein may be configured to reconstruct scenes in a way that is deconstructable and/or reconstructable. For example, the system may be configured to decompose a scene (or subscene, object, etc.) into parts, which can be done manually or automatically using techniques such as segmentation or clustering. In some embodiments, one or more of the parts may be reconstructed separately using techniques such as stereo vision, structure from motion, or other techniques. The parts may be merged together to form a complete reconstruction. Some embodiments of the system may infuse physical properties to enhance the robustness of the process. For example, the system may identify core separate parts of an object and try to characterize basic properties of matter comprising such parts. Upon construction of a model of each part, each of the parts may still retain the deconstructable matter properties of the object.

Some embodiments of the invention may use hierarchical neural networks (HNNs) to achieve varying levels of accuracy. HNNs may have stacks of multiple layers of neural network. Each layer may be configured to learn increasingly complex features and patterns from the input data, allowing the HNN to achieve higher levels of accuracy. The initial layers can be used to learn low level features. Later layers may use a varying stack depending on the desired accuracy.

Another approach to HNNs is to use a tree-structured network, where each node in the tree corresponds to a different level of abstraction. Such a configuration may allow the network to selectively activate different parts of the network based on the complexity of the input data. Such structures may improve efficiency and/or reduce the amount of data required for training Each node in the network may correspond to a different level of a hierarchical data structure, with lower-levels representing smaller voxels and higher-level nodes representing larger voxels. The network can learn to selectively activate different parts of the data structure based on the complexity of the input data.

The system may also be configured to calculate a distance function to evaluate a surface model, including, for example, a polarimetric surface model. Such a distance function may have multiple uses including being used to test compatibility of a model (i.e., reconstruction of a scene or subscene) with a other model configurations (e.g., other models known in the industry such as through Unreal Engine® 5). The system may be configured to use a statistical comparison method to determine a consistency between the model and another model configuration.

In some embodiments, the distance function may also be used to develop one or more segments, or groups of media and/or light interactions modeled as described elsewhere herein. The distance function may also be used to compare multiple (e.g., two) different parameter spaces or the same parameter space, and may be done in a Euclidean manner (e.g., in the same parameter space), in a non-Euclidean manner (e.g., if in different parameter spaces), or some combination of the two. For example, the distance function may be used in a flat form space (e.g., using Unreal Engine® 5) to map between that space and different parameter space. For example, if a model was created using a plenoptic parameter space representing both a light field and a matter field in a scene, the distance function may facilitate translating to a flat form space by providing distances between relative points within each model.

In some embodiments, the inventions described herein may be operable to accomplish certain objectives, which may be set in the system, specified by a user, determined by the system during processing, made in response to a condition, or some other factor, including any combination of the foregoing. An illustrative embodiment is when the invention is operated to characterize the state of a traffic signal, as discussed elsewhere herein. In the context of an autonomous vehicle or advanced driver assistance system, such characterization may require both recognizing a traffic signal and understanding the state of the signal, all done far enough in advance for the system to make decisions about slowing, stopping, or not is a challenge. Those of skill in the art may recognize certain challenges associated with characterizing the state of a traffic signal. For example, there are very few standards for traffic signals, leading to significant variation in stacks and orientations (e.g., horizontal, vertical, side-by-side, and other variations), colors (e.g., variations within the colors used), types of bulbs (e.g., incandescent and LED), and other features of signals (e.g., a red light is not always positioned at the top of the signal). Color detection may be even more challenging because red and yellow are close in the color spectrum versus green in a narrow frequency band. Environmental factors may also pose a problem (e.g., if the sun is behind the traffic light, putting the traffic signal in shade and overwhelming capturing; if the sun is directly behind the observer washing out the light in the traffic signal). The challenges may become more complex when considering structures, light colors, extra components, and the light sequencing present in other countries through the world (e.g., locations in the U.S. generally use a sequence of green, yellow, red, and back to green, whereas the U.K. generally uses a sequence of green, yellow, red, yellow, and back to green).

Those of skill in the art may recognize certain known approaches such as narrowing the problem space by first analyzing one of the most common configurations in the U.S. (e.g., a three stack traffic signal with top to bottom lights of red, yellow, and green). The analysis may then continue to extend the dataset used to build the ML models to include as many variations as possible in angles, states of repair, light color ranges, light bulb types (e.g., incandescent may be white in the model, and then the proper color outside of that), and environmental variations as discussed above. The dataset may be augmented with synthetically generated images to simulate varying sun locations and address imbalances found when capturing in nature (e.g., fewer yellow lights due to yellow often being the shortest signal in time duration). Performing the foregoing operations may result in a large volume of data and/or high cost associated with creating a balanced properly varying set.

In some embodiments, the inventions described herein may provide models of traffic signals, for example as a voxel field with a boundary around the traffic signal object. Such models may comprise a relightable matter field such that the models have removed at least some portion of an incident light field associated with the signal. In some embodiments, the only light associated with the model may be light emitted by the signal itself. Such models may optionally be used in conjunction with a supervised training approach with plenoptic models labeled by emitted light state. The system may be configured to be operable to capture and reconstruct an unlit scene including a possible traffic signal in some state which may be used in an inference against the model.

In some embodiments, the inventions described herein may build a machine learning model using image-based machine learning. Image-based machine learning may comprise gather examples of the subject and capturing images of as many variations in as possible (e.g., for traffic signals, the variations may comprise each of the lighted states, type, and environmental conditions, such as lighting, weather, quality, position, etc.). Embodiments of the inventions may be configured to build models of the subject (e.g., traffic signal) using plenoptic scene reconstruction of the subject by itself in a relightable manner, remove any external effects such that the only light in the scene may be the light emitted from the subject itself (e.g., the illuminated light in the traffic signal). For example, the model may be a unitary subscene with a voxel boundary around a traffic signal with no light entering the subscene. In that case, the only light in the subscene may be light emitted by the traffic signal and downstream responsive light due to that emitted light.

The system may gather a varied collection of captured plenoptic subscene subjects (e.g., traffic signals), to allow an ML model to understand the shape and type of the subject (e.g., that it is a traffic signal, its light characteristics, its shape (three stack, five stack, etc.), the type and color of the traffic light lenses, emissive state of each bulb, and other features). In some embodiments, it may be advantageous to have a balanced number of subject objects in each of the possible states. Some embodiments of the invention may be operable to generate additional plenoptic subscene representations, for example by including changing surface qualities, positional aspects, and emissive characteristics.

Some embodiments of the invention may use supervised training of the machine learning model by providing one or more labels associated with each type of subject and its possible states. In the case of a traffic signal, the labels may characterize red light emitted objects, the yellow light emitted objects, green light emitted objects, etc. in various permutations. Labels may be done manually or may be generated at time of capture or generation. The machine learning model may be built after all subscene reconstruction objects are labelled. Alternatively, some embodiments may use self-supervised training approaches where, instead of generating labels, the machine learning training approach discovers the proper category or state of the subject. Self-supervised training may be more possible with a plenoptic subscene recapture approach. For example, in the case of a traffic signal, the color lens and which of the traffic light sources is emitted is for more computable than traditional methods from image sources.

Some embodiments may obtain a novel subject, process the subject into a plenoptic subscene object (e.g., relightable matter field), and apply the plenoptic scene object to the machine learning model. Such application may have a number of purposes, for example, inferring or determining a category or state occupied by the subject. In the case of a traffic signal, given a machine learning model built from relightable matter field training data, a novel relightable matter field characterizing a traffic signal may be categorized by which of its lights are illuminated.

There are several potential advantages to this approach, including, for example, addressing adverse environmental lighting issues (e.g., by calculating a relightable matter field removing the influence of external/incident light), better characterizing qualities of the emitted light source (e.g., by providing a model of the emissive light qualities of a signal to more closely match real world observations), detecting or characterizing traffic light lens material (e.g., determining a color associated with the lens), detecting light bulb emission (e.g., emission behind a light filter, which may help determine color), resolving emission source (e.g., determining the type of bulb among incandescent, LED, halogen, etc.), removing weather effects (e.g., water or ice on the signal, precipitation causing difficulty in imaging), and avoiding separate model classification categories (e.g., by resolving whether detected potential signals are actual signals or artifacts such as reflections).

More specifically, a potential advantage of the approach described herein is resolving different light sources present in subjects (e.g., the types of light bulbs in a traffic signal). In the case of a traffic signal, the light source may be an incandescent bulb behind a colored and/or textured lens, an LED light source optionally behind a lens, halogen light source behind a lens, etc. In some cases, the light may have one or both of an initial filter that diffuses the light source and a smooth or textured lens for protection and/or better light emission. Among the foregoing types of bulbs, there may be a wide range of frequency and quality of the color emitted due to reduced quality of the light source, lenses, or other variations. For example, with incandescent bulbs behind a colored lens, the light emitted in the center tends to be whiter and outside of that center the frequencies vary. This variation may introduce difficulty in differentiating between red and yellow traffic lights. Such variations may require larger machine learning models to be developed and/or additional categories of light types to handle accurate inferencing. Embodiments of the inventions described herein may address these shortcomings by using plenoptic subscene reconstruction to directly process the lens, any additional filtering, and the varying light sources, as well as the varying color range and quality of the emission. Embodiments of the inventions described herein may understand and/or process the lens and any filtering using plenoptic matter and light field reconstruction. For example, embodiments described herein may understand how and why the color of the light emitted can vary from the center, e.g., by encoding the physics of the emitted light through the light field processing.

More specifically, one potential advantage of the approach described herein is differentiating a traffic signal from a reflection of a traffic signal, such as a reflection in a window of a building or other vehicle, or from shiny surfaces like the side of a metal truck trailer. In known approaches to this problem, reflections may require new categories to be added to the machine learning model for traffic signals, of all varying states, reflected in various materials with a goal of sorting reflections from actual signals. This approach may be problematic and/or cost prohibitive. The approach described herein may substantially resolve these issues by understanding glass or other reflective materials as a reflective surface. Plenoptic reconstruction may allow the system to understand materials in the scene as glass on a building or shiny surface from a vehicle, etc., obviating the need to add categories to the machine learning model to handle reflections.

In addition, embodiments described herein where the invention provides a relightable model may be operable to create and/or provide a synthetic data set of images for training, including as a light independent model. Such synthetic datasets may be advantageous in differentiating an incandescent bulb behind a red or yellow glass or plastic cover, which may have similar light characteristics in some circumstances.

Some embodiments of the invention may optionally include a human-computer interface for performing generalized scene reconstruction (GSR) and/or other functions of the system.

In certain embodiments of the invention, reconstruction of a scene, including using GSR, could be performed via a graphical user interface, command line interface running, audio input (including voice recognition), or other input on a computing device, which could include a portable computing device, personal computer, server, mobile phone, augmented reality or virtual reality device, unmanned aerial or other vehicle, or other digital device. In some embodiments, the interface may offer the ability to import or build an approximation of the light and matter fields to be later reconstructed (hereafter referred to as a pre-scene). In such embodiments, this starting point could improve the speed of the reconstruction processing and/or avoid errors. Some embodiments of the invention may provide or otherwise make accessible primitive shapes, common objects, and digitally generated lights to construct the pre-scene. When using a mobile device, certain embodiments of the invention may provide user an option to place light and matter at locations corresponding to the physical location of the device while physically walking through a scene to be reconstructed as part of a pre-scene. In some embodiments, pre-scenes may also consist of prior reconstructions which may optionally be updated with new scene data. For example, pre-scenes could be entirely updated, updated only in the light field, updated only in the matter field, updated only in specified areas, or any combination of the foregoing.

In certain embodiments of this invention, the human-computer interface could offer control over the sensing devices used to obtain images. For example, users may be permitted change device settings and/or view potential image input in a preview video feed before capture begins. In some embodiments, the human-computer interface could show an overlay of a selected pre-scene and allow the user to begin capture only after the pre-scene is roughly aligned with the preview video feed. In such embodiments, the system may be configured to spatially snap to the preview of the reconstruction. During capture, the human-computer interface could also show an ongoing video feed from each input device. If input from the sensing device is paused, the human-computer interface could require and/or assist in alignment between the preview video feed and existing portion of the reconstruction preview before input resumes.

Figure 12A:
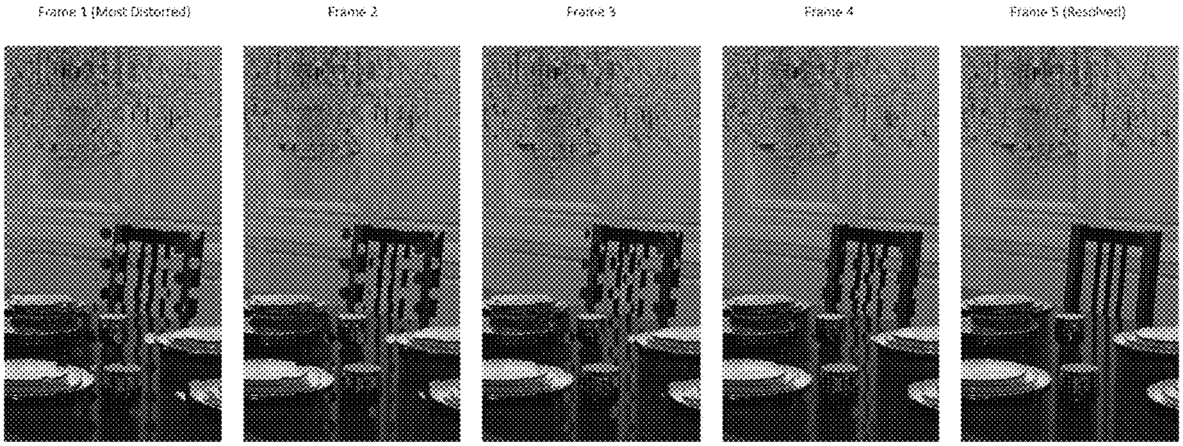
FIGS. 12A and 12B illustrate examples of a video feed interlaced with a reconstruction preview.
Figure 12B:
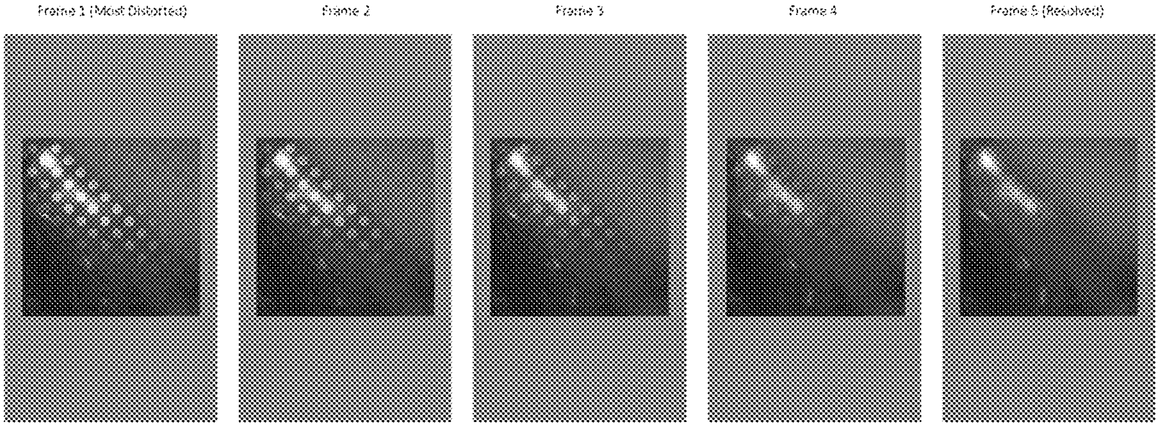

In certain embodiments of this invention, the human-computer interface could offer a live preview of the reconstruction during the capture process, updating with each incoming image or video frame. The reconstruction preview could include the pre-scene if a pre-scene is being used. Video feeds could be displayed in one or more regions of the screen, while the live preview could be displayed in one or more other regions of the screen, allowing the video feed and reconstruction preview to be compared. The live preview could display the entire light and matter field as shown in FIG. 12A, or only a portion of the light and/or matter field (such as the BLIF in a small region) as shown in FIG. 12B. Analytical information could be overlayed on the camera feed display and/or on the live preview display, including false coloring related to a set parameter (such as resolution) and/or information regarding the BLIF associated with one or more areas on the screen. In certain embodiments of this invention, the live preview of the reconstruction could be navigated at will by rotating, panning, and/or zooming.

Figure 11:
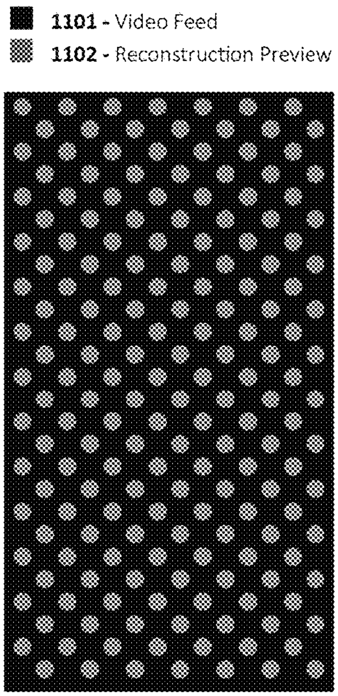
FIG. 11 illustrates a dot mesh example of a reconstruction preview.

Some embodiments of the invention may arrange the video feed 1101 and reconstruction preview 1102 in one or more configurations. In some embodiments, the video feed 1101 and preview 1102 may comprise a clipping mask of dots, checkers, or other shapes optionally of adjustable size and optionally arranged into a regular grid, showing the reconstruction preview above a background layer showing the video feed, where the two are spatially aligned and rendered to the same viewing angle, as depicted in exemplary FIGS. 11 and 12. In some embodiments, the video feed and preview may comprise a clipping mask of irregular shapes of adjustable size, optionally arranged at random, showing all or a portion of the reconstruction preview and/or above a background layer showing the video feed, where the mask and layer are spatially aligned and rendered to the same viewing angle. In some embodiments, the video feed and preview may comprise an adaptive clipping mask showing specified features of the reconstruction preview above a background layer showing the video feed, where the mask and layer are aligned to the greatest extent possible. In some embodiments, the video feed and preview may comprise a rectangular window showing a reconstruction preview above a background window showing the video feed, where the preview and background window are aligned to the greatest extent possible.

In some embodiments, such as depicted in FIGS. 12A and 12B, reconstruction previews and video feeds may be designed to allow users to navigate the reconstruction process without prior training in using 3D software. Certain embodiments of the invention may make difference between the reconstruction preview (optionally including the pre-scene) and a current camera feed highly apparent, such as by using a checkerboard, dot pattern, or other interleaving between the preview and live capture. In some embodiments, this implementation may make reconstruction errors and lag more noticeable. In such embodiments, users may be able to notice regions of a scene which have changed since a prior reconstruction, wherein the prior reconstruction may comprise or include a pre-scene. In some embodiments, the invention may provide information about errors and lag, which may provide users feedback regarding the rate of capturing all or a portion of a scene, view a region of the scene from multiple angles, or perform another action to obtain additional information about all or a portion of a scene. In some embodiments, the system may facilitate a user's understanding of whether a reconstruction will be sufficiently accurate before completing the capture process. For example, as depicted in FIGS. 12A and 12B, the preview may be designed such that, as the fidelity of the reconstruction improves during capture, the differences between live capture and preview diminish, including to the point where there is little or no noticeable difference between the live capture and preview.

Figure 13:
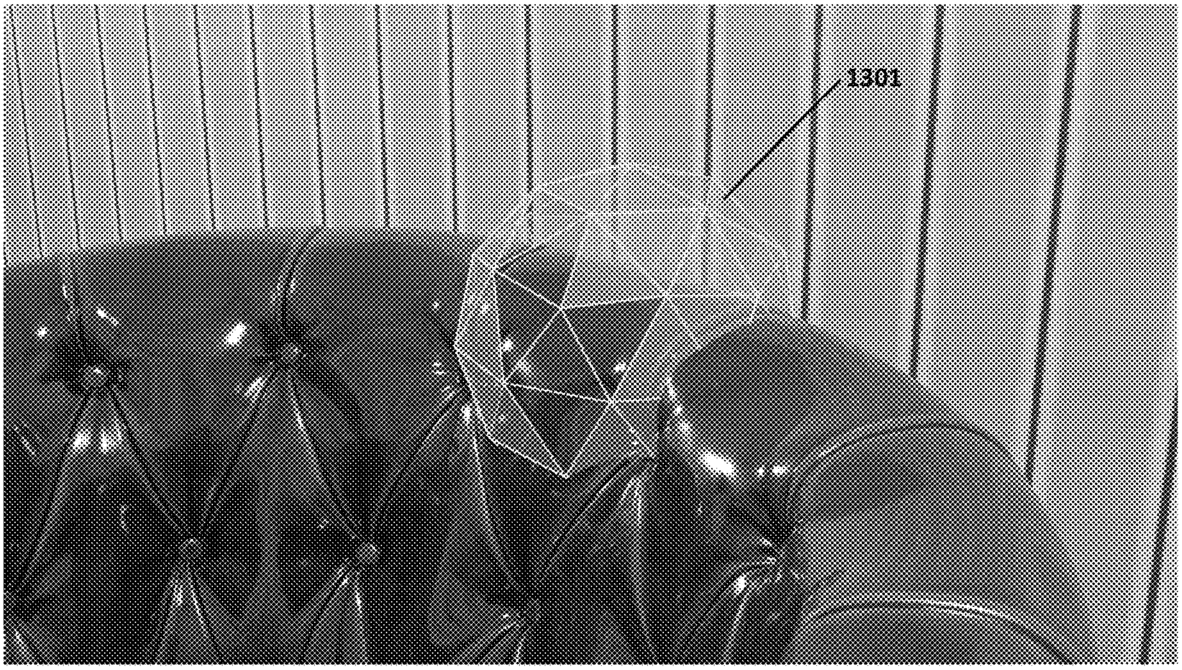
FIG. 13 illustrates a scene capture guide.

In certain embodiments of this invention, users may receive feedback to guide 1301 a process of refining bidirectional light interaction function, or BLIF, reconstructions by capturing a selected mediel from as many angles as possible. An exemplary embodiment of such a BLIF capture guide 1301 is depicted in FIG. 13. In some embodiments of this invention, the BLIF capture guide 1301 would display a spherical augmented reality overlay on the video feed and/or reconstruction preview. Sections of this spherical overlay may optionally change (e.g., by disappearing, changing color, or undergoing other visible alterations) as a user moves around the mediel's corresponding location in real space, viewing it from a variety of angles. The overlay may thereby assist the user in determining the number of angles already viewed.

In certain embodiments of this invention, a human-computer interface could offer a means to create programs to be read during capture, which may optionally guide the behavior of users and/or automated devices. For example, the programs could include goals for the reconstruction process, such as a desired resolution of the light field and/or the matter field, a desired certainty threshold for reconstruction, and/or goals for the elimination of gaps in the captured information. The programs could also include functions for responding to triggers encountered during the input capture process. Triggers could include specified matter field and/or light field structures, a passage of time, and/or as a change in the level of uncertainty in the model generated by incoming information. When these triggers are encountered, the software could alter its display configuration, add an overlay to its display which may be positioned using augmented reality, play audio cues or verbal instructions, change reconstruction goals, and/or alter the settings of any connected devices. In some embodiments of this invention, users could link the triggers to their corresponding functions using a node-based program editor in the graphical user interface. In some embodiments of this invention, users could also create a path to be used to guide future capture processes by drawing lines in a pre-scene or by moving a capture device along the desired path in physical space. In some embodiments, the triggers may be designed in such a way to enhance usability or accessibility of the system for users.

In certain embodiments of this invention, the human-computer interface is capable of rendering and displaying a finished reconstruction. In some embodiments, displays may include analytic visualizations in addition to realistic views. In some embodiments, one or more mediels, radiels, voxels, and saels could be rendered as small, primitive shapes centered on one or more locations. False coloring could be applied in correspondence with any property which might vary by mediel or radiel, which may include z-depth, ambient occlusion, and/or segmentation. BLIFs could be rendered in correspondence with the exitant light produced, or replaced with a default BLIF to offer a uniform view of a particular geometry in a scene. In some embodiments, the paths of radiels could be traced back a specified number of bounces and optionally visualized as an overlay. In some embodiments, users could move the render camera's viewpoint through the scene in a manner corresponding to their device, such as scrolling and clicking on a desktop or walking in a VR headset.

In certain embodiments of this invention, all or portions of data captured or reconstructed by the system could be fully concealed from users and/or automatically deleted. Such processes may include data that may reveal a user's location or other personal information, sensitive information, images captured to perform reconstruction, or reconstruction data itself. Such data may include all or portions of either the light or matter field, or both. For example, in some embodiments, the remaining matter field, complete with all light interaction properties, could be rendered and displayed in a generic light field, and/or a new light field selected by the user. Alternatively, the matter field discovered during reconstruction could be fully concealed from users and/or automatically deleted. The remaining light field could be used to light a generic matter field, and/or a new matter field selected by the user. Alternatively, the light field and the matter field discovered during reconstruction could be fully concealed from users and/or automatically deleted. The remaining light interaction properties could be applied to a generic matter field, and/or a new matter field selected by the user, which could be rendered and displayed in a generic light field, and/or a new light field selected by the user. In some embodiments, the system may use AI/ML to identify and remove information of concern or otherwise identified for deletion or concealment.

In certain embodiments of this invention, the human-computer interface would allow users to edit light and matter field reconstructions. In some embodiments, a user could transform, deform, or relight all or any portion of the reconstruction. In some embodiments, a user could alter the light interaction properties of BLIFs and assign one or more BLIFs to different areas of the matter field. In certain embodiments of the invention, the user may manipulate the scene by dragging on anchor points, by typing keyboard shortcuts, or by sculpting and painting on the reconstruction using brush tools. In some embodiments of the invention, a user could insert new matter fields and light fields into the reconstruction, and/or relight matter fields (in whole or in part) to match a specified light field. In some embodiments, the user may delete light and matter fields in whole or in part.

In certain embodiments of the invention, the human-computer interface may allow users to select mediels and radiels. For example, segments could be selected, mediels and radiels could be selected individually or together, or machine learning could be used to create selections based on semantic descriptors. In some embodiments, a user may group mediels and radiels, and/or may select groups. In some embodiments, groups and segments could be hidden and/or shown.

In certain embodiments of this invention, the human-computer interface could allow users to perform metrological analysis upon the reconstruction. For example, a user may take one or more measurements of matter field structures and optionally use all or a portion of such measurements to calculate geometric properties, such as volume. In some embodiments, measurements and calculations may be saved and exported. In some embodiments, the invention may permit a user to spatially search the scene to obtain one or more of a count, selection, or group of light field and/or matter field structures sufficiently matching the query. In certain embodiments of the invention, the query could be provided as a selected region of light and/or matter, presented as a descriptive word generating a response based on machine learning, or some combination of the two. Characteristics evaluated to determine a match could include matter field shape, light field structure, radiometric intensity, size, and BLIF.

In some embodiments, the system may be designed to use information, including information related to the light and/or matter fields in a scene to support procedural generation activities. For example, the system may be used to create repetition or extension of a reconstructed light and/or matter field to vary sizes or shapes of the reconstructions. In addition, the system may adapt the lighting conditions associated with generated data based on the original lighting conditions in the scene or a calculated light field.

Further aspects and embodiments of the inventions will be apparent from the following listing of embodiments:

1. A method for reconstructing a scene comprising: accessing image data characterizing light in the scene; processing the image data to provide: a light field model; and a matter field model, wherein the matter field model comprises a representation of media in the matter field including a function characterizing an interaction of the media with light at positions in the matter field; storing the light field model and the matter field model in a data structure, wherein data representing the light field model is separately accessible; and data representing the matter field model is separately accessible and configured to be reconstructed using the function with light as represented in the light field model and with characteristics of light differing from the light as represented by the light field model; and outputting at least a part of the matter field model.
2. The method of embodiment 1 further comprising outputting at least a part of the light field model.
3. The method of embodiment 1 wherein the function is a bi-directional light interaction function.
4. The method of embodiment 1 wherein the function characterizes an absorption, a transmission, a reflection, a scattering, a refractive index, a roughness, a polarized diffuse coefficient, an unpolarized diffuse coefficient, and an extinction coefficient associated with the media.
5. The method of embodiment 1 wherein the matter field model comprises a plenoptic field represented by at least three dimensions characterizing the position, size, and shape of media in the scene and at least two dimensions characterizing the interaction of the media with light.
6. The method of embodiment 1 wherein the processing includes using a machine learning model to perform at least part of the processing.
7. The method of embodiment 6 wherein the machine learning model comprises one or more of a physics-informed neural network (PINN), neural network architecture with physical constraints, an incorporation of physical priors into a loss function, hybrid modeling, and residual modeling.
8. The method of embodiment 6 wherein the machine learning model provides additional information characterizing size, shape, position, or interaction of the media with light.
9. The method of embodiment 6 wherein the processing comprises finding parameters of the light field model, the matter field model, or both using neural networks and non-neural networks.
10. The method of embodiment 1 further comprising accessing data providing additional information regarding the light field and/or media field in the scene; and wherein the processing further comprises using the additional information to inform the processing.
11. The method of embodiment 10 wherein the additional information comprises one or more of information characterizing size, shape, relative position, or light interaction characteristics of the media in the scene.
12. The method of embodiment 1 wherein the models are one or more of decomposable, recomposable, and explainable.
13. The method of embodiment 1 wherein the matter field model is configured to permit extraction of one or more segments of media in the scene.
14. The method of embodiment Error! Reference source not found.13 further comprising placing the extracted segments in a different location of the scene or a different scene.
15. The method of embodiment 1 wherein the processing permits localized regions of higher resolution or where additional computational energy is applied to reconstruct certain scene characteristics to a higher accuracy than other regions.
16. A method of using neural networks to represent surface light fields in various regions of a scene, which scene model includes at least one plenoptic field.
17. The method of embodiment 16 wherein the method is implemented to support an autostereoscopic screen or mesospace.
18. A method of using neural networks to represent entities in scene including one or more of a bidirectional light interaction function, a light field in two dimensions, four dimensions, or both, and a relightable matter field.

19. A method of building a relightable matter field (RMF) from a light field model.

20. A method of optimizing parameters of neural networks and conventional equations simultaneously, wherein conventional equations may be understood in the domain of physics or otherwise.

21. An optimization method that includes simultaneously finding parameters of neural networks and non-neural networks.

22. A method for reconstructing a scene comprising: accessing image data comprising one or more images of the scene; using a data structure representing a plurality of volumetric elements representing the scene in a memory; reconstructing radiometric characteristics of each of the plurality of volumetric elements using the image data, wherein the radiometric characteristics characterize a light field associated with each of the volumetric elements and an interaction of one or more of the light fields with media in the volumetric elements, and wherein a collection of the reconstructed radiometric characteristics is sufficient to reconstruct a viewpoint of the scene from a viewpoint other than the one or more viewpoints; populating the data structure with the reconstructed radiometric characteristics; and outputting at least a portion of the data structure representing the viewpoint of the scene from a viewpoint other than the one or more viewpoints.

23. The method of embodiment 22 wherein the radiometric characteristics comprise one or more of exitant light from the volumetric element, intensity of a color at the volumetric element, a level of transparency associated with the volumetric element, a level of transmissivity associated with the volumetric element, or a level of opacity associated with the volumetric element.

24. The method of embodiment 22 wherein the data structure comprises a hierarchical, multi-resolution, spatially-sorted data structure and the populating the data structure comprises populating one or more of an empty data structure, a partially-populated data structure, or a data structure populated with previously-calculated radiometric characteristics.

25. The method of embodiment 22 wherein the reconstructing the radiometric characteristics comprises using the image data by selecting a viewpoint and calculating the radiometric characteristics associated with each volumetric element along one or more corridors extending from the viewpoint.

26. The method of embodiment 25 wherein the one or more corridors are represented by a ray extending outward from the viewpoint and determining the one or more volumetric elements through which the ray passes.

27. The method of embodiment 22 wherein the light field represents one or more of light flowing into the volumetric elements and light out of the volumetric elements and interaction with the media is represented by calculating one or more of a transmissivity, an opacity, a transparency associated with the volumetric elements, and a surface present in one or more volumetric elements.

28. The method of embodiment 27 further comprising using the interaction of the media to relight all or a portion of the scene.

29. The method of embodiment 22 wherein the reconstructing the radiometric characteristics uses one or more of spherical harmonics, interpolation, machine learning, or machine intelligence.

30. The method of embodiment 22 wherein the reconstructing the radiometric characteristics comprises optimizing the reconstructed radiometric characteristics by iteratively performing the reconstruction until the reconstructed radiometric characteristics have exceeded a threshold level of accuracy, certainty, confidence, or another factor.

31. A system for reconstructing a scene comprising: a storage medium configured to store image data from one or more viewpoints of the scene and a model of radiometric characteristics of the scene; a processor configured to: access at least a portion of the image data; create a model comprising radiometric characteristics associated with a plurality of volumetric elements; reconstruct the radiometric characteristics of each of the volumetric elements of the scene using the image data, wherein a collection of the reconstructed radiometric characteristics are sufficient to allow a view of the scene from a viewpoint other than the one or more viewpoints associated with the image data; populate the model with the reconstructed radiometric characteristics; and at least temporarily store the model in the storage medium; and an output circuit configured to output the model.

32. The system of embodiment 31 wherein the radiometric characteristics comprise one or more of exitant from the volumetric element, intensity of a color at the volumetric element, a level of transparency associated with the volumetric element, a level of transmissivity associated with the volumetric element, or a level of opacity associated with the volumetric element.

33. The system of embodiment 31 wherein the storage medium comprises a hierarchical, multi-resolution, spatially-sorted data structure and the processor is configured to at least temporarily store the model in the data structure.

34. The system of embodiment 31 wherein the processor is configured to create the model from one or more of an empty model, a partially-populated model, or a model populated with previously-calculated radiometric data.

35. The system of embodiment 31 wherein the processor is configured to reconstruct the radiometric characteristics using the image data by selecting a viewpoint and calculating the radiometric characteristics associated with each volumetric element along one or more corridors extending from the viewpoint.

36. The system of embodiment 35 wherein the one or more corridors are formed by extending a ray outward from the viewpoint and determining the one or more volumetric elements through which the ray passes.

37. The system of embodiment 31 wherein the reconstructed radiometric characteristics comprise a reconstruction of a light field in the scene, wherein the light field represents light flowing into and out of one or more of the volumetric elements.

38. The system of embodiment 37 wherein the model further comprises a reconstruction of a matter field in the scene, wherein the matter field represents one or more surfaces present in one or more of the volumetric elements.

39. The system of embodiment 38 wherein the matter field is represented by one or more of a refractivity, polarimetric characteristic, presence of one or more holes, transmissivity, an opacity, or a transparency associated with the volumetric elements.

40. The system of embodiment 38 wherein the matter field is a relightable matter field.

41. The system of embodiment 31 wherein the processor is further configured to use one or more of spherical harmonics, machine learning, or machine intelligence to reconstruct the radiometric characteristics.

42. The system of embodiment 31 wherein the processor iteratively performs the reconstruction until the processor determines the model has exceeded a threshold accuracy level.

43. A method of training a machine learning model comprising: providing image data to the machine learning model, wherein the image data comprises information characterizing light in a scene; processing the image data to generate a relightable model of the scene, wherein such processing comprises dividing the scene into a plurality of volumetric elements, analyzing the image data to generate a model of the light field in at least a portion of the volumetric elements, predicting the interaction between the light in the scene and media in one or more of the volumetric elements, and providing information for characterizing the appearance of the media in lighting conditions other than the light in the image data; and outputting the model.

44. The method according to embodiment 43, wherein the scene comprises one or more objects of interest.

45. The method according to embodiment 44 further comprising extracting one or more objects of interest from the model and inserting the one or more extracted objects of interest in a second scene.

46. The method according to embodiment 43, wherein the processing further comprises determining shape information associated with media in the scene and wherein the predicting comprises calculating a bidirectional light interaction function associated with the media.

47. The method according to embodiment 46, wherein the processing further comprises generating a model of media in the scene as a matter field characterizing the media in the scene in at least three dimensions.

48. The method according to embodiment 43, wherein the image data comprises one or more relightable models.

49. The method according to embodiment 48 further comprising: varying bidirectional light interaction function associated with the outputted model to create a modified model; inputting the modified model into the machine learning model; and repeating the processing to further train the machine learning model.

50. A method according to embodiment 43 further comprising: receiving a second set of image data; using the trained machine learning model to generate a second model by processing the second set of image data; and outputting the second model.

51. A system for reconstructing one or more objects in a scene comprising: a processor for processing digital scene data; an interface for receiving input related to a scene to be captured; wherein the input comprises digital scene data in the form of image data representing a scene from an orientation; wherein the processor processes the digital scene data and input to generate a three-dimensional model of at least part of the scene comprising matter comprising at least one surface; wherein the processor processes the image data by visiting one or more volumetric elements in the matter field represented by the image data; and wherein the processor processes the image data by determining if matter represented in each of the one or more volumetric elements comprises a surface.

52. The system of embodiment 51 wherein the image data is captured by a camera.

53. The system of embodiment 51 wherein the orientation is the pose of a camera.

54. The system of embodiment 51 wherein the image data comprises data related to electromagnetic radiation.

55. The system of embodiment 54 wherein the data related to electromagnetic radiation comprises one or more of radiance values for visible, infrared, and/or polarized or unpolarized light and/or radar.

56. The system of embodiment 51 wherein the digital scene data comprises image data representing a scene from at least two orientations.

57. The system of embodiment 56 wherein the processor processes the image data from the at least two orientations sequentially.

58. The system of embodiment 51 wherein the matter represented in a volumetric element is represented by a surfel.

59. The system of embodiment 58 wherein data related to the surfel comprises one or more of an exitant light field and an incident light field.

60. The system of embodiment 51 wherein the processor processes the image data by postulating the orientation of the digital scene data.

61. The system of embodiment 51 wherein the processor processes the image data by: postulating that a surface exists in a volumetric element; postulating one or more of a surface normal, a light interaction property, an exitance radiance vector, and an incident light field of the surface; calculating a cost for the existence of the surface in the volumetric element based on the postulated one or more of a surface normal, a light interaction property, an exitance radiance vector, and an incident light field of the surface; comparing the cost to a cost threshold; and accepting a surfel as existing at a volumetric element when the cost is below the cost threshold.

62. The system of embodiment 61 wherein, when the system has accepted a surfel as existing at a volumetric element, the surface remains in the scene in subsequent processing of the scene.

63. The system of embodiment 61 further comprising updating the postulation of a light field for one or more other volumetric elements based on the accepted existence of the surfel.

64. The system of embodiment 61 wherein the processor performs the process iteratively for more than one volumetric element.

65. The system of embodiment 61 wherein the processor performs the process iteratively for more than one set of image data.

66. The system of embodiment 63 wherein the light field is not delivered to a user.

67. The system of embodiment 63 wherein the matter field is not delivered to a user.

68. The system of embodiment 63 wherein the light field and the matter field are not delivered to the user and light interaction properties of the matter field are delivered to a user.

69. A method of training a machine learning model comprising: providing image data to the machine learning model, wherein the image data comprises one or more objects of interest; processing the image data to generate a model, wherein such processing comprises analyzing the image data to generate one or more of a light field model of a scene or a reconstruction of one or more matter fields in a scene; selecting an object of interest in the model of the scene; extracting the object of interest in the model of the scene; and outputting a relightable matter field model of the object of interest in the scene.

70. The method according to embodiment 69, wherein the image data comprises relightable matter field data.

71. The method according to embodiment 69, wherein the image data comprises one or more of objects of interest in a plurality of scenes and objects of interest under a variety of conditions.

72. The method according to embodiment 69, wherein the relightable matter field is constructed from a plurality of images of two dimensions or higher.

73. The method according to embodiment 69, wherein the relightable matter field model comprises one or more of shape information and bidirectional light interaction function (BLIF) information.

74. The method according to embodiment 69, wherein the light field information is used to compute the light reflectance characteristics of locations in the matter field.

75. The method of embodiment 69 wherein the light field is not delivered to a user.

76. The method of embodiment 69 wherein the matter field is not delivered to a user.

77. The method of embodiment 69 wherein the light field and the matter field are not delivered to the user and light interaction properties of the matter field are delivered to a user.

78. The method according to embodiment 69, further comprising: varying BLIF information of a model; inputting the model with varied BLIF information into the machine learning model; and performing one or more of the foregoing steps on the model with varied BLIF information to further train the machine learning model.

79. A method of using a machine learning model comprising: identifying one or more objects of interest in a model of a scene; accessing a relightable matter field of the scene; selecting the portions of the matter field to be processed; processing the selected portions of the matter field to extract at least a portion of the relightable matter field; and outputting the extracted portions of the relightable matter field.

80. The method according to embodiment 79, further comprising testing the utility of the portion of the relightable matter field output by the machine learning model.

81. A system for reconstructing one or more objects in a scene comprising: a processor for processing digital scene data; an interface for receiving input related to a scene to be captured; wherein the processor processes the digital scene data and input to generate a three-dimensional model of at least part of the scene; wherein processor the input directs at least a portion of the processing of the digital scene data; and wherein the processor provides an output comprising the three-dimensional model of at least part of the scene.

82. The system of embodiment 81 wherein the input comprises at least one of an approximation of at least a portion of the light field in the scene, an approximation of at least part of the matter field in the scene, one or more shapes present in the scene, one or more objects in the scene, or information related to one or more light sources in the scene.

83. The system of embodiment 81 wherein the input controls one or more sensing devices providing digital scene data.

84. The system of embodiment 81 wherein the system provides a feedback regarding one or more objects to be reconstructed within the scene.

85. The system of embodiment 84 wherein the feedback comprises a preview of one or more objects to be reconstructed within the scene.

86. The system of embodiment 85 wherein the system updates the preview as one or more objects are reconstructed with results from such reconstruction.

87. The system of embodiment 86 wherein the preview further comprises one or more indications regarding one or more parameters of the reconstruction.

88. The system of embodiment 85 wherein the preview comprises one or more masks representing data related to the generated model and information received from a digital scene data capture device.

89. The system of embodiment 84 wherein the feedback comprises one or more of information related to a rate of capture of digital scene data, a position for capturing digital scene data, a sensor angle for capturing digital scene data, an aspect of a light field in the scene, or an aspect of the matter field in the scene.

90. The system of embodiment 81 wherein the input is data that permits the alignment of the digital scene data with newly-received digital scene data.

91. The system of embodiment 81 wherein the system further includes a set of instructions for accomplishing one or more goals for the generation of the three-dimensional model.

92. The system of embodiment 91 wherein the one or more goals include one or more of a desired resolution of a light field, a desired resolution of a matter field, a desired certainty threshold for reconstruction, a threshold for elimination of gaps in captured digital scene information, and a trigger for an event encountered during capture of the digital scene information.

93. The system of embodiment 92 wherein the trigger comprises one or more of a specified matter field structure, a specified light field structures, a passage of time, and a change in the level of uncertainty in the model.

94. The system of embodiment 92 wherein the system is configured to take an action in response to the trigger.

95. The system of embodiment 94 wherein the response includes one or more of altering a display configuration, adding an overlay to a display, providing an audio cue, providing a visual cue, changing a reconstruction goal, and altering a setting of a device connected to the system.

96. The system of embodiment 81 wherein the system is configured to alter one or more features of the model.

97. The system of embodiment 96 wherein the altering includes one or more of editing a light field reconstruction, editing a matter field reconstruction, transforming the model, deforming the model, relighting all or any portion of the model, altering one or more light interaction properties of BLIFs, assigning one or more BLIFS to different areas of a matter field, manipulating the model by dragging on anchor points, by typing keyboard shortcuts, or by sculpting and painting on the model using brush tools, inserting new matter fields, inserting new light fields, relighting one or more matter fields (in whole or in part), deleting a light field in whole or in part, and deleting a matter field in whole or in part.

98. The system of embodiment 81 wherein the system is configured to spatially search the model using a search query comprising one or more parameters.

99. The system of embodiment 98 wherein the spatial search includes obtaining one or more of a count, selection, or group of light field structures, or obtaining one or more of a count, selection, or group of matter field structures, matching the one or more parameters of the search query.

100. The system of embodiment 98 wherein the search query is provided as a selected region of light.

101. The system of embodiment 98 wherein the search query is provided as a selected region of matter.

102. The system of embodiment 98 wherein the search query is presented as a descriptive word generating a response based on machine learning.

103. The system of embodiment 98 wherein the one or more parameters includes one or more of matter field shape, light field structure, radiometric intensity, size, and BLIF.

104. The system of embodiment 81 further comprising a display used to capture digital scene information, wherein during capture information from a plurality of sources are spatially interleaved layers shown in three or more adjacent regions of the display.

105. The system of embodiment 104 wherein at least one of the regions is a live reconstruction preview.

106. The system of embodiment 104 wherein all layers on the display are substantially aligned to the same viewpoint.

107. The system of embodiment 104 wherein all layers on the display contain information about the scene.

108. The system of embodiment 104 wherein one of the layers on the display is a pre-scene rendering aligned to substantially the same viewpoint as the other layers.

109. The system of embodiment 81 further comprising a display used during capture to indicate how many angles around a certain BLIF have been captured already.

110. The system of embodiment 109 wherein the indication is provided by displaying a spherical or semi-spherical overlay centered on a selected mediel which includes the BLIF.

111. The system of embodiment 110 wherein at least one section of the spherical overlay changes in response to viewing the mediel from a variety of angles relative to the mediel's corresponding location in real space.

112. The system of embodiment 111 wherein the change to the at least one section of the spherical overlay comprises one or more of disappearing, changing color, or undergoing other visible alteration.

113. A method for reconstructing one or more objects in a scene comprising: accessing digital scene data and an input related to a scene; processing the digital scene data to generate a three-dimensional model of at least part of the scene, wherein the processing includes responding to the input to direct a manner of processing at least a portion of the processing of the digital scene data; and outputting the three-dimensional model of at least part of the scene.

114. The method of embodiment 113 wherein the input comprises at least one of an approximation of at least a portion of the light field in the scene, an approximation of at least part of the matter field in the scene, one or more shapes present in the scene, one or more objects in the scene, or information related to one or more light sources in the scene.

115. The method of embodiment 113 further comprising using the input to control one or more sensing devices providing the digital scene data.

116. The method of embodiment 113 further comprising providing a feedback regarding one or more objects to be reconstructed within the scene.

117. The method of embodiment 116 wherein providing the feedback comprises providing a preview of one or more objects to be reconstructed within the scene.

118. The method of embodiment 117 further comprising updating the preview as one or more objects are reconstructed with results from such reconstruction.

119. The method of embodiment 118 further comprising providing the preview with one or more indications regarding one or more parameters of the reconstruction.

120. The method of embodiment 117 further comprising providing the preview with one or more masks representing data related to the generated model and information received from a digital scene data capture device.

121. The method of embodiment 116 wherein providing the feedback comprises providing one or more of information related to a rate of capture of digital scene data, a position for capturing digital scene data, a sensor angle for capturing digital scene data, an aspect of a light field in the scene, or an aspect of the matter field in the scene.

122. The method of embodiment 113 further comprising using the input to align the digital scene data with newly-received digital scene data.

123. The method of embodiment 113 further comprising accessing a set of instructions and executing the set of instruction to accomplish one or more goals for the generation of the three-dimensional model.

124. The method of embodiment 123 wherein the one or more goals include one or more of a desired resolution of a light field, a desired resolution of a matter field, a desired certainty threshold for reconstruction, a threshold for elimination of gaps in captured digital scene information, and a trigger for an event encountered during capture of the digital scene information.

125. The method of embodiment 124 wherein the trigger comprises one or more of a specified matter field structure, a specified light field structures, a passage of time, and a change in the level of uncertainty in the model.

126. The method of embodiment 124 further comprising taking an action in response to the trigger.

127. The method of embodiment 126 wherein the taking an action comprises one or more of altering a display configuration, adding an overlay to a display, providing an audio cue, providing a visual cue, changing a reconstruction goal, and altering a setting of a device connected to the system.

128. The method of embodiment 113 further comprising altering one or more features of the model based on the input.

129. The method of embodiment 128 wherein the editing includes one or more of editing a light field reconstruction, editing a matter field reconstruction, transforming the model, deforming the model, relighting all or any portion of the model, altering one or more light interaction properties of BLIFs, assigning one or more BLIFS to different areas of a matter field, manipulating the model by dragging on anchor points, by typing keyboard shortcuts, or by sculpting and painting on the model using brush tools, inserting new matter fields, inserting new light fields, relighting one or more matter fields (in whole or in part), deleting a light field in whole or in part, and deleting a matter field in whole or in part.

130. The method of embodiment 113 further comprising spatially searching the model using a search query comprising one or more parameters.

131. The method of embodiment 130 wherein the spatial searching includes obtaining one or more of a count, selection, or group of light field structures, or obtaining one or more of a count, selection, or group of matter field structures, matching the one or more parameters of the search query.

132. The method of embodiment 130 wherein the search query is provided as a selected region of light.

133. The method of embodiment 130 wherein the search query is provided as a selected region of matter.

134. The method of embodiment 130 wherein the search query is presented as a descriptive word generating a response based on machine learning.

135. The method of embodiment 130 wherein the one or more parameters includes one or more of matter field shape, light field structure, radiometric intensity, size, and BLIF.

136. The method of embodiment 113 further comprising providing a display for capturing digital scene information, wherein during capture information from a plurality of sources are spatially interleaved layers shown in three or more adjacent regions of the display.

137. The method of embodiment 136 wherein at least one of the regions is a live reconstruction preview.

138. The method of embodiment 136 wherein all layers on the display are substantially aligned to the same viewpoint.

139. The method of embodiment 136 wherein all layers on the display contain information about the scene.

140. The method of embodiment 136 wherein one of the layers is a pre-scene rendering aligned to substantially the same viewpoint as the other layers.

141. The method of embodiment 113 further comprising providing a display and using the display during capture of digital image data to indicate how many angles around a certain BLIF have been captured already.

142. The method of embodiment 141 wherein the indication is provided by displaying a spherical or semi-spherical overlay centered on a selected mediel which includes the BLIF.

143. The method of embodiment 142 wherein at least one section of the spherical overlay changes in response to viewing the mediel from a variety of angles relative to the mediel's corresponding location in real space.

144. The method of embodiment 143 wherein the change to the at least one section of the spherical overlay comprises one or more of disappearing, changing color, or undergoing other visible alteration.

145. The method of the foregoing embodiments wherein the reconstruction of opaque external structures is combined with a reconstruction of internal structures to form a more complete reconstruction.

146. The method of the foregoing embodiments wherein the internal structures do not yet include BLIF information, and BLIF information is automatically generated based on the external structures.

147. A method for operating a machine learning model comprising: creating a training set comprising models of objects, wherein the models comprise a relightability characteristic permitting reconstruction of the models in an incident lighting condition other than lighting conditions associated with the image data from which the model was created, wherein the relightability characteristic includes a function characterizing an interaction of media within the model with light at positions in a matter field; accessing the training set using the machine learning model; using the training set to train the machine learning model, wherein the training comprises configuring the machine learning model to perform one or more of object classification, surface resolution, light field reconstruction, matter field reconstruction, and material signature identification; and using the trained machine learning model to characterize a new object.

148. The method of embodiment 147 wherein the relightable model comprises data that represents one or more emissive solid angle elements at a plurality of volumetric elements.

149. The method of embodiment 147 wherein the machine learning model comprises one or more of a physics-informed neural network (PINN), neural network architecture with physical constraints, an incorporation of physical priors into a loss function, hybrid modeling, and residual modeling.

150. The method of embodiment 147 wherein the function is comprised of one or more bi-directional light interaction functions (BLIFs).

151. The method of embodiment 150 wherein the one or more BLIFs are processed using a neural network or a sampled data function.

152. The method of embodiment 150 wherein the at least one of the BLIFs is spatially varying.

153. The method of embodiment 150 wherein the BLIFs represent one or more light interaction phenomena including absorption, transmission, reflection, and scattering.

154. The method of embodiment 147 wherein the function represents properties including a refractive index, a roughness, a characterization of holes in the media, a polarized diffuse coefficient, an unpolarized diffuse coefficient, and an extinction coefficient.

155. The method of embodiment 147 wherein classification comprises one of characterizing the state of a traffic light.

In the examples described herein, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details described herein. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general-purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions. Although databases may be depicted herein as tables, other formats (including relational databases, object-based models, and/or distributed databases) may be used to store and manipulate data.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the technology, and does not imply that the illustrated process is preferred. Moreover, process steps, algorithms, or the like described as a recursive process may be performed iteratively, and iteratively described process steps, algorithms, or the like may be performed recursively.

Processors, memory, network interfaces, I/O interfaces, and displays noted above are, or include, hardware devices (for example, electronic circuits or combinations of circuits) that are configured to perform various different functions for a computing device.

In some embodiments, each or any of the processors is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). In some embodiments, each or any of the processors use an instruction set architecture such as x86 or Advanced RISC Machine (ARM).

In some embodiments, each or any of the memory devices is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors). Memory devices are examples of non-volatile computer-readable storage media.

In some embodiments, each or any of network interface devices includes one or more circuits (such as a baseband processor and/or a wired or wireless transceiver), and implements layer one, layer two, and/or higher layers for one or more wired communications technologies (such as Ethernet (IEEE 802.3) and/or wireless communications technologies (such as Bluetooth, WiFi (IEEE 802.11), GSM, CDMA2000, UMTS, LTE, LTE-Advanced (LTE-A), 5G and 5G New Radio (5G NR) (including, but not limited to, IEEE 1914.1 and 1914.3), Enhanced Mobile Broadband (eMBB), Ultra Reliable Low Latency Communications (URLLC), Massive Machine Type Communications (mMTC), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of display interfaces in I/O interfaces is or includes one or more circuits that receive data from the processors, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device, which displays the image data. Alternatively or additionally, in some embodiments, each or any of the display interfaces is or includes, for example, a video card, video adapter, or graphics processing unit (GPU).

In some embodiments, each or any of user input adapters in I/O interfaces is or includes one or more circuits that receive and process user input data from one or more user input devices that are included in, attached to, or otherwise in communication with the computing device, and that output data based on the received input data to the processors. Alternatively or additionally, in some embodiments each or any of the user input adapters is or includes, for example, a PS/2 interface, a USB interface, a touchscreen controller, or the like; and/or the user input adapters facilitates input from user input devices such as, for example, a keyboard, mouse, trackpad, touchscreen, etc.

Various forms of computer readable media/transmissions may be involved in carrying data (e.g., sequences of instructions) to a processor. For example, data may be (i) delivered from a memory to a processor; (ii) carried over any type of transmission medium (e.g., wire, wireless, optical, etc.); (iii) formatted and/or transmitted according to numerous wired or wireless formats, standards or protocols, such as Ethernet (or IEEE 802.3), ATP, Bluetooth, and TCP/IP, TDMA, CDMA, 3G, etc.; and/or (iv) encrypted to ensure privacy or prevent fraud in any of a variety of ways well known in the art.

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor execute instructions that may be tangibly stored on a computer readable storage medium.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

When it is described in this document that an action "may," "can," or "could" be performed, that a feature or component "may," "can," or "could" be included in or is applicable to a given context, that a given item "may," "can," or "could" possess a given attribute, or whenever any similar phrase involving the term "may," "can," or "could" is used, it should be understood that the given action, feature, component, attribute, etc. is present in at least one embodiment, though is not necessarily present in all embodiments.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A scene reconstruction and machine learning system comprising:

- a machine learning model trained using one or more first relightable matter fields related to one or more first scenes, the trained machine learning model having an architecture configured to utilize a second relightable matter field as an input;
- a storage medium configured to store image data, one or more scene models, one or more second relightable matter fields, information related to the machine learning model, and an output of the machine learning model;
- an input circuit configured to receive image data characterizing light in a second scene,
- wherein the second scene is occupied by matter including an object;
- a processor configured to:
  - reconstruct a scene model representing the second scene using the image data,
  - wherein the scene model represents a volumetric region in the second scene occupied by the matter interacting with the light,
  - extract the one or more second relightable matter fields from the scene model representing the object, wherein the one or more second relightable matter fields characterize a light interaction with the object,
  - store the scene model including the one or more second relightable matter fields representing the object in the storage medium,
  - input the one or more second relightable matter fields to the machine learning model, and generate an output from the machine learning model using the inputted one or more second relightable matter fields in an inference against the machine learning model, whereby the inputted one or more second relightable matter fields supports one or more of improved reliability, efficiency, prediction performance, light transport modeling, or optimization of the machine learning model, or accuracy, explainability, deconstructability, reconstructability, or
  - realism of the output of the machine learning model; and
- an output circuit configured to output the generated output.

2. The system of claim 1 wherein the relightable matter field characterizes the light interaction with data that represents parameters of a neural network.

3. The system of claim 1 wherein the processor is further configured to compute solid angle elements of light in an exitant light field given solid angle elements of light in an incident light field.

4. The system of claim 1 wherein the relightable matter field represents properties including at least one of a refractive index, a roughness, an absorption, a transmission, a reflection, a scattering, a characterization of holes in the media, a polarized diffuse coefficient, an unpolarized diffuse coefficient, and an extinction coefficient.

5. The system of claim 4 wherein the properties are represented as at least one bi-directional light interaction function.

6. The system of claim 5 wherein at least one of the bi-directional light interaction functions is spatially varying.

7. The system of claim 1 wherein the output is one or more of a classification, regression, clustering, prediction, pattern recognition, determination of a state of a traffic light, detection of a surface anomaly, characterization a feature of an object, and estimation of a cost to repair a hail-damaged object.

8. A method for using a machine learning model and relightable matter field data to serve a purpose:

- training a machine learning model using one or more first relightable matter fields related to one or more first scenes, wherein the trained machine learning model has an architecture configured to utilize a second relightable matter field as an input;
- accessing image data characterizing light in a second scene, wherein the second scene is occupied by matter including an object;
- reconstructing a scene model representing the second scene using the image data, wherein the scene model represents a volumetric region in the second scene occupied by the matter interacting with the light;
- extracting one or more second relightable matter fields from the scene model representing the object, wherein the one or more second relightable matter fields characterize a light interaction with the object;
- storing the scene model including the one or more second relightable matter fields representing the object in a storage medium;
- inputting the one or more second relightable matter fields to the machine learning model; and
- generating an output from the machine learning model using the inputted one or more second relightable matter fields in an inference against the machine learning model, whereby the inputted one or more second relightable matter fields supports one or more of improved reliability, efficiency, prediction performance, light transport modeling, or optimization of the machine learning model, or accuracy, explainability, deconstructability, reconstructability, or realism of the output of the machine learning model.

9. The method of claim 8 wherein the relightable matter field characterizes the light interaction with data that represents parameters of a neural network.

10. The method of claim 8 wherein the method further comprises using the data related to the light interaction to compute solid angle elements of light in an exitant light field given solid angle elements of light in an incident light field.

11. The method of claim 8 wherein the relightable matter field represents properties including at least one of a refractive index, a roughness, an absorption, a transmission, a reflection, a scattering, a characterization of holes in the media, a polarized diffuse coefficient, an unpolarized diffuse coefficient, and an extinction coefficient.

12. The method of claim 11 wherein the properties are represented as at least one bi-directional light interaction function.

13. The method of claim 12 wherein at least one of the bi-directional light interaction functions is spatially varying.

14. The method of claim 8 further comprising using the output for one or more of classification, regression, clustering, prediction, pattern recognition, determining a state of a traffic light, detecting a surface anomaly, characterizing a feature of an object, and estimating a cost to repair a hail-damaged object.

15. A machine learning system for use with relightable matter field data comprising:

a machine learning model trained using one or more first relightable matter field data related to one or more first scenes;

a storage medium configured to store the one or more first relightable matter field data, information related to the machine learning model, and an output of the machine learning model;

an input circuit for receiving the one or more first relightable matter field data representing one or more of objects, wherein at least some the one or more first relightable matter field data characterizes a light interaction with the one or more objects;

a processor configured to:

train the machine learning model using the one or more first relightable matter field data as a training set, whereby the training using the relightable matter field supports one or more of improved reliability, efficiency of the training, efficiency of output generation, prediction performance, light transport modeling, or optimization of the machine learning model, or accuracy, explainability, deconstructability, reconstructability, or realism of an output of the machine learning model, receive a request for second relightable matter field data related to a novel object as input to the machine learning model, and generate the output in response to the input, wherein the output includes the second relightable matter field data representing at least a portion of the novel object; and an output circuit configured to output the generated output.

16. The system of claim 15 wherein the relightable matter field data characterizes the light interaction with properties of the objects including at least one of a refractive index, a roughness, an absorption, a transmission, a reflection, a scattering, a characterization of holes in the media, a polarized diffuse coefficient, an unpolarized diffuse coefficient, and an extinction coefficient.

17. The system of claim 16 wherein the light interaction properties represent parameters of a neural network.

18. The system of claim 17 wherein the light interaction properties are represented as at least one bi-directional light interaction function.

19. The system of claim 18 wherein at least one of the bi-directional light interaction functions is spatially varying.

20. The system of claim 15 wherein the output is one or more of a classification, regression, clustering, prediction, pattern recognition, determination of a state of a traffic light, detection of a surface anomaly, characterization a feature of an object, and estimation of a cost to repair a hail-damaged object.

21. The system of claim 15 wherein;

the storage medium is further configured to store one or more scene models;

the input circuit is further configured to receive the one or more scene models, wherein the one or more scene models represent a volumetric region in the scene occupied by matter interacting with light; and the processor is further configured to extract relightable matter field data from the one or more scene models, wherein the relightable matter field data represents an object and wherein at least some the relightable matter field data characterizes a light field exitant from the object given a light field incident to the object.

22. A method for training a machine learning model with relightable matter field data comprising:

gathering the relightable matter field data representing one or more first scenes comprising one or more objects, wherein at least some the relightable matter field data characterizes a light interaction with the one or more objects; and training the machine learning model using the relightable matter field data as a training set, whereby the training using the relightable matter field supports one or more of improved reliability, efficiency of the training, efficiency of output generation, prediction performance, light transport modeling, or optimization of the machine learning model, or accuracy, explainability, deconstructability, reconstructability, or realism of an output of the machine learning model, and wherein the trained machine learning model is configured to receive a request for second relightable matter field data related to a second scene including a second object as input and thereby generate an output in response to the input that includes the relightable matter field of at least a portion of the novel object.

23. The method of claim 22 wherein the relightable matter field data characterizes the light interaction with properties of the objects including at least one of a refractive index, a roughness, an absorption, a transmission, a reflection, a scattering, a characterization of holes in the media, a polarized diffuse coefficient, an unpolarized diffuse coefficient, and an extinction coefficient.

24. The method of claim 23 wherein the light interaction properties represent parameters of a neural network.

25. The method of claim 23 wherein the light interaction properties are represented as at least one bi-directional light interaction function.

26. The method of claim 25 wherein at least one of the bi-directional light interaction functions is spatially varying.

27. The method of claim 22 wherein the output is used for one or more of classification, regression, clustering, prediction, pattern recognition, determining a state of a traffic light, detecting a surface anomaly, characterizing a feature of an object, and estimating a cost to repair a hail-damaged object.

28. The method of claim 22 wherein the gathering further comprises:

accessing one or more scene models representing a scene, wherein the scene model represents a volumetric region in the scene occupied by matter interacting with light; and extracting a relightable matter field from the one or more scene models, wherein the relightable matter represents the object.

29. The scene reconstruction and machine learning system of claim 1 wherein the machine learning model was trained by one or more of:

applying modified light interaction parameters to the one or more first relightable matter fields, applying modified geometric characteristics to the one or more first relightable matter fields, or using a training set generated by applying a plurality of augmentations to the one or more first relightable matter fields.

30. The method of claim 8 wherein the training of the machine learning model comprises one or more of:

applying modified light interaction parameters to the one or more first relightable matter fields, applying modified geometric characteristics to the one or more first relightable matter fields, or using a training set generated by applying a plurality of augmentations to the one or more first relightable matter fields.

31. The machine learning system of claim 15 wherein the machine learning model was trained by one or more of:

applying modified light interaction parameters to the one or more first relightable matter fields, applying modified geometric characteristics to the one or more first relightable matter fields, or using a training set generated by applying a plurality of augmentations to the one or more first relightable matter fields.

32. The method of claim 22 wherein the training of the machine learning model comprises one or more of:

applying modified light interaction parameters to the one or more first relightable matter fields, applying modified geometric characteristics to the one or more first relightable matter fields, or using a training set generated by applying a plurality of augmentations to the one or more first relightable matter fields.

* * * * *